United States Patent
Li

(10) Patent No.: US 12,392,900 B2
(45) Date of Patent: Aug. 19, 2025

(54) DISTANCE MEASURING DEVICE

(71) Applicant: Hangzhou Great Star Industrial Co., Ltd., Hangzhou (CN)

(72) Inventor: Yueming Li, Hangzhou (CN)

(73) Assignee: Hangzhou Great Star Industrial Co., Ltd., Hangzhou (CN)

( * ) Notice: Subject to any disclaimer, the term of this patent is extended or adjusted under 35 U.S.C. 154(b) by 107 days.

(21) Appl. No.: 18/133,823

(22) Filed: Apr. 12, 2023

(65) Prior Publication Data

US 2023/0296775 A1 Sep. 21, 2023

Related U.S. Application Data

(63) Continuation-in-part of application No. 18/098,636, filed on Feb. 15, 2023, which is an application for the reissue of Pat. No. 11,156,444, filed as application No. PCT/CN2016/103242 on Oct. 25, 2016.

(51) Int. Cl.
| | |
|---|---|
| *G01B 3/1041* | (2020.01) |
| *G01B 3/1069* | (2020.01) |
| *G01B 3/1092* | (2020.01) |
| *G01S 17/86* | (2020.01) |

(52) U.S. Cl.
CPC ............ *G01S 17/86* (2020.01); *G01B 3/1069* (2020.01)

(58) Field of Classification Search
CPC .. G01B 3/1041; G01B 3/1092; G01B 11/026; G01S 17/08
See application file for complete search history.

(56) References Cited

U.S. PATENT DOCUMENTS

| | | | |
|---|---|---|---|
| 5,182,863 A | 2/1993 | Rando | |
| 5,760,392 A | 6/1998 | Hisamoto et al. | |
| 5,777,899 A | 7/1998 | Kumagai | |
| 5,815,251 A | 9/1998 | Ehbets et al. | |
| 6,093,928 A * | 7/2000 | Ohtomo | G01D 5/36 250/231.13 |
| 6,209,219 B1 * | 4/2001 | Wakefield | G01C 15/008 33/227 |
| 6,928,029 B2 * | 8/2005 | Rickman | G01S 17/86 33/760 |
| 7,036,241 B2 | 5/2006 | Williams et al. | |

(Continued)

FOREIGN PATENT DOCUMENTS

| | | |
|---|---|---|
| CN | 1123573 A | 5/1996 |
| CN | 2350725 Y | 11/1999 |

(Continued)

OTHER PUBLICATIONS

Decision of Refusal for JP-2019522486, dated Feb. 2, 2010, 3 pgs.

(Continued)

*Primary Examiner* — Deandra M Hughes
*Assistant Examiner* — Christina Y Leung
(74) *Attorney, Agent, or Firm* — Blank Rome LLP

(57) ABSTRACT

A distance measuring device, including a first housing having an accommodating space; and a laser ranging device provided in the accommodating space of the first housing; a tapeline structure, the tapeline structure integrated with the laser ranging device into one piece, wherein the laser ranging device is arranged along a radial direction or an axial direction of the tapeline structure.

8 Claims, 29 Drawing Sheets

(56) References Cited

U.S. PATENT DOCUMENTS

| | | | |
|---|---|---|---|
| 7,119,533 B2 | 10/2006 | Tamura et al. | |
| 7,454,840 B2 | 11/2008 | Delfini et al. | |
| 7,456,936 B2* | 11/2008 | Gogolla | G01C 15/002 356/5.01 |
| 7,690,124 B1 | 4/2010 | Henry | |
| 8,094,291 B2* | 1/2012 | Zimmermann | G01S 7/4818 356/4.01 |
| 8,269,951 B1* | 9/2012 | Courchesne | G01C 15/002 356/5.01 |
| 8,356,419 B2* | 1/2013 | Lord | G01D 7/00 33/763 |
| D680,888 S * | 4/2013 | Ranieri | D10/72 |
| D726,043 S * | 4/2015 | Cook | D10/72 |
| 9,046,340 B2* | 6/2015 | Li | G01S 17/88 |
| D787,347 S * | 5/2017 | Wortelboer | D10/72 |
| D788,611 S * | 6/2017 | Anderson | D10/72 |
| 11,143,494 B2* | 10/2021 | Li | G01S 7/4813 |
| 11,156,444 B2* | 10/2021 | Li | G01C 3/00 |
| 11,460,284 B1* | 10/2022 | Reed | G01B 3/1069 |
| 2004/0040170 A1* | 3/2004 | Sanoner | G01B 3/11 33/762 |
| 2004/0223164 A1* | 11/2004 | Gogolla | G01C 15/002 356/601 |
| 2005/0111301 A1 | 5/2005 | Rickman | |
| 2006/0010706 A1 | 1/2006 | Williams et al. | |
| 2006/0021244 A1 | 2/2006 | Oura | |
| 2007/0101593 A1 | 5/2007 | Jang | |
| 2007/0107248 A1* | 5/2007 | Jones | G01B 3/1041 33/760 |
| 2008/0007711 A1 | 1/2008 | Liu | |
| 2009/0273771 A1 | 11/2009 | Gittinger et al. | |
| 2010/0088914 A1 | 4/2010 | Cerwin | |
| 2010/0103406 A1 | 4/2010 | Zimmermann | |
| 2014/0090264 A1* | 4/2014 | Li | G01B 3/10 33/760 |
| 2016/0069658 A1* | 3/2016 | Klein | G01B 3/1003 33/760 |
| 2019/0234723 A1* | 8/2019 | Li | G01B 3/1043 |

FOREIGN PATENT DOCUMENTS

| | | |
|---|---|---|
| CN | 2779424 Y | 5/2006 |
| CN | 101713826 A | 5/2010 |
| CN | 202837547 U | 3/2013 |
| CN | 203012137 U | 6/2013 |
| CN | 203224628 U | 10/2013 |
| CN | 103412312 A | 11/2013 |
| CN | 203287522 U | 11/2013 |
| CN | 105627857 A | 6/2016 |
| CN | 205484804 U | 8/2016 |
| CN | 206274346 U | 6/2017 |
| CN | 107976682 A | 5/2018 |
| DE | 20-2014005479 U1 | 10/2014 |
| DE | 2015101446 A1 | 8/2016 |
| JP | H-08327737 A | 6/2001 |
| JP | 2004-233106 A | 8/2004 |
| JP | 2005148037 A | 6/2005 |
| JP | 3185168 U | 7/2013 |
| TW | M447982 U1 | 3/2013 |

OTHER PUBLICATIONS

International Search Report and Written Opinion for PCT/CN2016/103242, dated Jul. 26, 2017.
Decision of Refusal and English-language Translation for JP-2021105032, dated May 11, 2023, 7 pgs.
Chinese Office Action Issued in Corresponding Chinese Patent Application No. 201610938229.9, mailed on Nov. 27, 2024, 20 pages.

* cited by examiner

DISTANCE MEASURING DEVICE

RELATED APPLICATIONS

This application is a Continuation-In-Part of reissue application Ser. No. 18/098,636 (our ref. 164830.00102), filed Jan. 18, 2023, which is a reissue of Ser. No. 16/334,648, filed Mar. 19, 2019, now U.S. Pat. No. 11,156,444, issued Oct. 26, 2021, which is a national phase application of PCT/CN2016/103242, filed Oct. 25, 2016. The disclosures of these applications are hereby incorporated by reference.

FIELD OF THE INVENTION

The present invention relates to the field of distance measuring tools and in particular to a distance measuring device.

DESCRIPTION OF THE PRIOR ART

Tapelines and laser ranging devices are common distance measuring tools, which can be used in construction, interior decoration, handling of traffic accidents and other fields. In the prior art, when a tapeline is in use, the tape end part and the measuring terminal end of the tape need to be respectively leveled with the starting end and the terminal end of the object to be measured, so the measurer needs to use his/her hands or other auxiliary equipment to keep the tape to be fitted onto the object to be measured. Under certain circumstances, a regular tapeline is not convenient to operate and has lower measurement accuracy. For example, in the field of measurement in danger zone, the applicability of a regular tapeline is poor.

Again, in the construction industry for example, tapelines are often used to measure the length of a transverse object hung up from the ground or the distance from the object to a vertical object of reference. Since there is no attaching point for the tapeline, the measurement can only rely on ocular estimation of the start point or the terminal point to be measured from a distance. Therefore, the error of the measured value is large and the measurement accuracy is poor, which will adversely affect the following construction work. If more accurate data of measurement at a height are desired to be acquired by using a tapeline, the measurer needs to establish a supporting frame or use a long ladder to climb high up, to attach the tapeline onto the object to be measured to complete the measurement. If the object to be measured has a great length, two or more workers are then needed to climb high up to complete the measurement, which is troublesome and expensive in labor cost while it is dangerous due to the risk of falling of the measurer from high up.

Moreover, due to the limit of the length of the tapeline, the applications are limited thereby, and the measurement range is relatively limited which can only be used in scenes of smaller space rather than scenes of larger space. The measurement range of a regular tapeline is generally around 5 meters, 7.5 meters or 10 meters. Some specially made tapelines may even have a measurement range up to 15 meters or 20 meters. However, the larger the measurement range of the tapeline is, the larger the volume thereof is and thus the tapeline is inconvenient for carrying and use by the measurer.

Although laser ranging devices in the prior art have higher measurement accuracy, they have larger volumes and higher cost, and are inconvenient for carrying and use. Some of the portable laser ranging devices have smaller volumes and are easy for carrying, but after being used over a long time, the light emitting surface of the laser source and the light receiving surface of the light sensor device will experience relatively large abrasions, such that the light feedback sensitivity and distance measurement accuracy are affected. Moreover, the laser ranging devices have larger errors when detecting short distances, and are quite limited in the field of interior decoration and are difficult to achieve large-scale applications.

SUMMARY OF THE INVENTION

It is an object of the present invention to provide a distance measuring device which solves the technical problems residing in the prior art, such as inconvenience of operation, low measurement accuracy, inconvenience for carrying, etc.

In order to solve the above technical problems, the present invention provides a distance measuring device, including a shell, and a laser ranging device provided at the inside and/or the outer surface of the shell. The laser ranging device comprises a laser generating means, a photoelectric conversion means, a circuit board and a power supply. The laser generating means is used for emitting measurement beam to the object to be measured; the object to be measured reflects the measurement beam, generating reflected light; the photoelectric conversion means is used for capturing all or part of the reflected light and converting the optical signal of the captured reflected light into at least one feedback electrical signal; the power supply is connected to the laser generating means, the photoelectric conversion means and the circuit board. At least one processor is provided on the circuit board; the processor is connected to the laser generating means for controlling the laser generating means; the processor is connected to the photoelectric conversion means for acquiring the feedback electrical signal and calculating a distance from the object to be measured to the distance measuring device.

Further, the laser generating means comprises a light emitting surface; the photoelectric conversion means comprises a light receiving surface provided beside the light emitting surface; the light emitting surface and the light receiving surface are disposed in a side by side arrangement or in an up and down arrangement on the outer surface of the shell. Or, the laser generating means comprises a light emitting surface; the photoelectric conversion means comprises a light receiving surface provided beside the light emitting surface; the outer surface of the shell is provided with a laser beam emitting port directly facing the light emitting surface and a light receiving hole directly facing the light receiving surface and provided beside the laser beam emitting port; the laser beam emitting port and the light receiving hole are disposed in a side by side arrangement or in an up and down arrangement; the light emitting surface emits the measurement beam through the laser beam emitting port; and the light receiving surface captures the reflected light through the light receiving hole.

Further, the center point of the light receiving surface is located on the same straight line as the center point of the light emitting surface; and the area of the light receiving surface is 3 to 10 times the area of the light emitting surface.

Further, the distance measuring device also includes a tapeline structure disposed within the shell.

Further, the laser generating means and the photoelectric conversion means are both located above or below the tapeline structure; and the power supply is provided on the left or right side of the tapeline structure.

Further, the power supply, the laser generating means and the photoelectric conversion means are all located in front of or behind the tapeline structure; and the laser generating means and the photoelectric conversion means are both located above or below the power supply, or on the left or on the right side of the power supply.

Further, the power supply is located in front of or behind the tapeline structure; and the laser generating means and the photoelectric conversion means are located on the left or on the right side of the tapeline structure.

Further, the circuit board is disposed horizontally above the tapeline structure; or the circuit board is vertically disposed on the left or right side of the tapeline structure.

Further, the tapeline structure comprises a tapeline wheel, a tape, a tape outlet, a pressure piece and a locking key. The tapeline wheel is disposed within the shell; all or part of the tape is wound on the tapeline wheel; one end of the tape is fixedly connected to the tapeline wheel and the other end is provided with a tape end portion; the tape outlet is provided at the lower end of the outer side wall of the shell, and the tape end portion extends out of the shell through the tape outlet; the pressure piece is provided in the shell and adjacent to the tape outlet, for pressing the tape so that the length of the tape outside the shell remains unchanged; and the locking key is provided on an outer surface of the shell, for controlling the pressure piece to press or loosen the tape.

Further, the distance measuring device also includes a second tapeline structure disposed within the second shell; and the second shell is detachably connected to the shell.

Further, the shell is L-shaped; the shell includes a horizontal portion located at an upper portion of the shell and a vertical portion located at a lower portion of the shell; wherein the second shell is detachably connected to the lower left of the shell.

Further, the shell includes at least one first snap slot recessed on a left side face of the vertical portion of the shell; the second shell includes at least one first strip protruding from a right side face of the second shell; when the second shell is connected to the shell, the first strip is snap-fitted to the first snap slot.

Further, the shell includes at least one connecting member, each of which projects downwardly from a bottom surface of the horizontal portion of the shell, the connecting member is adjacent to a left side face of the shell, each connecting member is provided with a nut in the horizontal direction, and the nut faces a left side of the shell; the second shell includes at least one connecting through hole, at least one screw hole and at least one screw, each connecting though hole extends perpendicularly through a top surface of the second shell, the position thereof is corresponding to the position of the connecting member; the screw hole horizontally extends through a left side face of the second shell; when the second shell is connected to the shell, the connecting member passes through the connecting through hole, each nut corresponds to a screw hole, and the corresponding nut and screw hole are located on the same straight line; and each screw passes through a screw hole and is fixed on a nut corresponding to the screw hole.

Further, the second tapeline structure includes a second tapeline wheel, a second tape, a second tape outlet, a second pressure piece and a second locking key. The second tapeline wheel is disposed within the second shell; all or part of the second tape is wound on the second tapeline wheel; one end of the second tape is fixedly connected to the second tapeline wheel, and the other end is provided with a second tape end portion; and the second tape outlet is provided at a lower end of the outer side wall of the second shell, the second tape end portion extends out of the second shell through the second tape outlet. The second pressure piece is provided in the second shell and adjacent to the second tape outlet, for pressing the second tape so that the length of the second tape outside the second shell remains unchanged; and the second locking key is provided on an outer surface of the second shell, for controlling the second pressure piece to press or loosen the second tape.

Further, the second shell includes a rectangular through hole vertically extending through a top surface of the second shell and positioned above the second tapeline wheel. The shell includes an arcuate groove recessed on a bottom surface of the shell and located above the rectangular through hole; when the second shell is connected to the shell, an upper portion of the second tape wound on the second tapeline wheel passes through the rectangular through hole and is disposed within the arcuate groove.

The distance measuring device further includes an outer casing of shell, which is a transverse U-shape; when the second shell is connected to the shell, the outer casing of shell is coated on an outer surface of the shell and the second shell.

The shell includes at least one second snap slot recessed on a front side face and a back side face of the vertical portion of the shell; the outer casing of shell includes at least one second strip protruding from an inner side face of the outer casing of shell and corresponding to the second snap slot; when the outer casing of shell is coated on the outer surface of the shell, the second strip is snap-fitted to the second snap slot.

The outer casing of shell comprises a first outer casing through hole, a second outer casing through hole, a third outer casing through hole, a first outer casing notch and a second outer casing notch. The first outer casing through hole extends through a top surface of the outer casing of shell, corresponding to the display means; the second outer casing through hole extends through a right side face of the outer casing of shell, corresponding to the power supply; the third outer casing through hole extends through a bottom surface of the outer casing of shell, corresponding to the locking key; the first outer casing notch is provided on a left side face of an upper portion of the outer casing of shell; and the second outer casing notch is provided on a left side face of a lower portion of the outer casing of shell.

Further, the distance measuring device also includes a display means connected to the processor, for displaying the distance from the object to be measured to the distance measuring device. The display means is provided on the outer surface of the shell, preferably, an upper surface, a front surface or a rear surface of the shell.

Further, the distance measuring device also includes an operating means connected to the processor, for transmitting at least one control instruction to the laser ranging device. The operating means comprises an operation panel and an operation circuit board, the operation panel is provided on an upper surface, a front surface or a rear surface of the shell, for inputting at least one control action, and each of the control actions corresponds to a control instruction; and the operation circuit board is disposed below the operation panel and is connected to the processor, for converting the at least one control action into at least one electrical signal and transmitting the electrical signal to the processor; each of the electrical signals corresponds to a control instruction; and the control instructions comprise, but are not limited to, start instructions, close instructions, and store instructions.

Further, the circuit board is provided with a memory connected to the processor, for storing the distance from the object to be measured to the distance measuring device.

Further, the laser generating means comprises, but is not limited to, a laser tube; the photoelectric conversion means comprises, but is not limited to, a photoelectric sensor; the power supply comprises, but is not limited to, a button battery, a rectangular battery or a cylindrical battery.

In order to improve assembly efficiency, of the distance measuring device of the present invention, simplify its structure and impart to it other functions than long distance ranging and short distance ranging, the present invention provides another distance measuring device comprising:
  a first housing having an accommodating space; and
  a laser ranging device provided in the accommodating space of the first housing;
  a tapeline structure, the tapeline structure integrated with the laser ranging device into one piece,
  wherein the laser ranging device is arranged along a radial direction or an axial direction of the tapeline structure.
Further, the laser ranging device comprises:
  a laser generating means for emitting a measurement beam to an object to be measured;
  a photoelectric conversion means for receiving a reflected beam reflected from the object to be measured and converting it into at least one feedback electric signal;
  a circuit board provided thereon with at least one processor; and
  a power supply connected to the laser generating means, the photoelectric conversion means and the circuit board.

Further, the power supply is a rechargeable battery, the laser ranging device is provided thereon with a charging port, the first housing provided therein with a through hole matching the charging port.

Further, the tapeline structure is provided in the first housing, a laser module made up of the laser generating means, the photoelectric conversion means and the power supply is provided at an edge in the radial direction or on an end face in the axial direction of the tapeline structure.

Further, the tapeline structure comprises:
  a tapeline wheel provided in the first housing;
  a tape entirely or partially wound on the tapeline wheel, one end of the tape fixedly connected to the tapeline wheel, the other end thereof provided with a tape end portion;
  a first tape outlet provided in a side wall of the first housing, the tape end portion extending out of the first housing through the first tape outlet;
  a pressure piece for pressing the tape so that a length of the tape outside the first housing is kept constant; and
  a locking key provided on an outer surface of the first housing and used to control the pressure piece to press or loosen the tape.

Further, the tapeline structure further comprises a tapeline casing, which is provided in the first housing, and in which the tapeline wheel is provided;
  the tape successively passes through a second tape outlet in the tapeline casing and the first tape outlet;
  the pressure piece is provided near the second tape outlet or the first tape outlet.

Further, the first housing is provided therein with a locating post, the locating post connected to the tapeline casing so that the tapeline casing is located within the first housing.

Further, the tapeline structure further comprises:
  a locating member, which is located in the first housing, and to which a rotating shaft of the tapeline wheel is connected;
  the locating member comprising at least one locating portion, the locating portion provided at a circular circumferential edge of the tapeline wheel.

Further, the locating member comprises a first locating portion and a second locating portion.

Further, the locating member comprises an engagement portion, the engagement portion engaged in the rotating shaft of the tapeline wheel.

Further, the locating member comprises three locating portions.

Further, the housing is provided therein with a shaft shank, the shaft shank located at the middle of the locating member, the tapeline wheel is rotatably connected to the shaft shank.

Further, the shaft shank is integrally formed with the first housing.

Further, one end of the shaft shank is restricted in position by a stepped shaft with respect to the first housing, the other end of the shaft shank is fixedly connected to the locating member.

Further, the laser ranging device further comprises:
  a display means and an operating means, the display means and the operating means both disposed on the end face in the axial direction or at the edge in the radial direction of the tapeline structure.

Further, the laser ranging device further comprises a display means, the display means provided on a side wall of the first housing, one end of the display means rotatably connected to the first housing through a first rotating shaft, the other end of the display means defining a push end;
  the pressure piece is provided near the first tape outlet; the push end is connected to the pressure piece through a transmission mechanism.

Further, the transmission mechanism comprises a first rotating element and a connecting rod, the first rotating element rotatably connected to the first housing through a second rotating shaft, one end of the first rotating element connected to the push end so as to move with the push end, the other end connected to one end of the pressure piece through the connecting rod;
  the pressure piece rotatably connected to the first housing through a third rotating shaft, the other end of the pressure piece configured to press the tape or loosen the tape.

Further, the first housing comprises a first housing portion and a second housing portion, the first housing portion joined to the second housing portion to form the first housing defining the accommodating space.

Further, the distance measuring device further comprises a second housing; the tapeline structure is provided in the second housing;
  the first housing is detachably connected to the second housing through a connecting structure.

Further, the first housing is provided on a side thereof facing toward the second housing with an arcuate recessed portion, the second housing is provided on a side thereof facing toward the first housing with an arcuate raised portion in engagement with the arcuate recessed portion.

Further, the connecting structure comprises a connecting protrusion provided on the side of the first housing facing toward the second housing and a connecting recess provided on the side of the second housing facing toward the first housing, the connecting protrusion inserted in the connecting recess.

Further, a first side surface of the first housing facing toward the second housing is a flat surface, a second side surface of the second housing facing toward the first housing is a flat surface.

Further, the connecting structure comprises a connecting slide channel provided on the first side surface and a fin which is provided on the second side surface and slidable into the connecting slide channel.

Further, the distance measuring device comprises a laser module, one end of the laser module provided with the laser ranging device, the other end of the laser module provided with a second device, wherein the second device is any one or more selected from a laser spot projector, a laser line projector, a laser cross projector and a temperature measuring device.

Further, the laser module is provided on the end face in the axial direction of the tapeline structure, the first housing is provided with a raised portion, the raised portion defining a second accommodating space, the laser module is located within the second accommodating space.

Further, the tapeline structure comprises a sensing component, the sensing component configured to detect a displacement distance of the tape in the tapeline structure.

Further, the distance measuring device further comprises a display means, the display means configured to display a measurement of the laser ranging device and/or a measurement of the tapeline structure.

Further, the display means is configured so that, when the distance measuring device is switched to distance measuring by the laser ranging device, the display means displays the measurement of the laser ranging device, and when the distance measuring device is switched to distance measuring by the tapeline structure, the display means displays the measurement of the tapeline structure.

Further, the display means is configured so that, when the tape in the tapeline structure is moving, the display means displays a measurement of the tapeline structure, and when the distance measuring device is switched to distance measuring by the laser ranging device, the display means displays the measurement of the laser ranging device.

Further, the display means is configured to display both the measurement of the laser ranging device and the measurement of the tapeline structure.

Further, the distance measuring device comprises a communication component, the communication component configured to communicate with a terminal to transmit measurement data.

Further, the sensing component comprises a Hall sensing device, a sensing component of the Hall sensing device is always in contact with the tape.

Further, the Hall sensing device comprises a roller, a connecting member and a resilient member, the roller disposed at one end of the connecting member and located at a radial edge location of the tapeline structure, the roller kept in contact with the tape wound on the tapeline wheel in the tapeline structure, the other end of the connecting member connected to the resilient member, the resilient member configured to apply a torque to the connecting member to bias the roller toward the tapeline structure.

Further, the sensing component comprises a marking code identification component, the tape is provided thereon with marking codes, the marking code identification component configured to identify the marking codes.

The present invention is advantageous in providing a distance measuring device, which is effectively improved over conventional laser ranging devices to have an extended service life and not show degraded light feedback sensitivity or measurement accuracy even after long-term use. Combining a tapeline with a laser ranging device, the present invention provides both short distance ranging and long distance ranging functions and a range of advantages including ease of operation, convenience of carrying, low cost and high measurement accuracy. It is suitable to be widely promoted and applied in building and construction, interior decoration, measurement in dangerous areas and other fields. The present invention modularizes the tapeline and thereby allows it to be conveniently mounted within the single housing along with a laser ranging device, resulting in increased assembly efficiency. Alternatively, the tapeline and the laser ranging device may be provided in separate housings. Moreover, the two can be conveniently integrated, or separated for individual use, achieving convenience of both carrying and use. Further, the present invention extends the functionality of the laser ranging device. In addition to laser-based long distance ranging, laser spot projection, line projection, temperature measuring and other functions can be imparted to it as actually needed. According to the present invention, the sensing component may be provided to sense a displacement length of the tape, from which a numerical measurement of the tapeline can be derived. Compared with manual measurement reading of the tapeline, higher accuracy can be achieved. Furthermore, the present invention allows the distance measuring device to communicate with the terminal and store data in the terminal, facilitating data analysis and storage.

Figure 1:
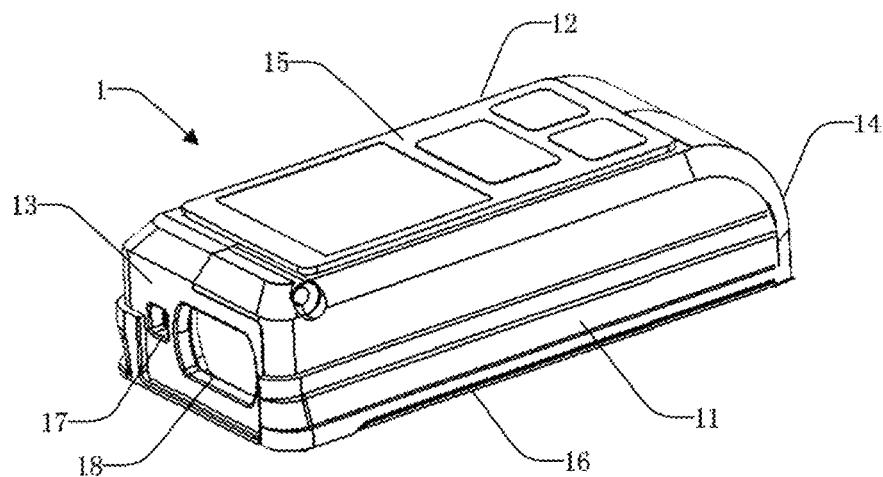
FIG. 1 is an overall schematic structural view of Embodiment 1 of the invention.

LIST OF REFERENCE NUMERALS IN DRAWINGS 1 shell, 2 laser ranging device, 3 tapeline structure, 4 second shell, 5 second tapeline structure, 6 outer casing of the shell, 7 clip;

11 front side face, 12 back side face, 13 left side face, 14 right side face, 15 top face, 16 bottom face, 17 laser beam emitting port, 18 light receiving hole;

21 laser generating means, 22 photoelectric conversion means, 23 circuit board, 24 display means, 25 operating means, 26 power supply;

31 tapeline wheel, 32 tape, 33 tape outlet, 34 pressure piece, 35 locking key, 36 tape end portion;

51 second tapeline wheel, 52 second tape, 53 second tape outlet, 54 second pressure piece, 55 second locking key, 56 second tape end portion;

101 horizontal portion, 102 vertical portion, 103 first snap slot, 104 connecting member, 105 nut, 106 arcuate groove, 107 second snap slot;

211 light emitting surface, 221 light receiving surface, 231 processor, 232 memory;

251 operation panel, 252 operation circuit board, 253 press button;

401 first strip, 402 connecting through hole, 403 screw hole, 404 screw, 405 rectangular through hole;

601 second strip, 602 first outer casing through hole, 603 second outer casing through hole, 604 third outer casing through hole, 605 first outer casing notch, 606 second outer casing notch;

610 housing, 611 accommodating space, 612 first housing portion, 613 second housing portion, 614 first tape outlet, 615 second tape outlet, 616 first through hole, 617 locating post, 620 third tapeline structure, 621 tapeline casing, 20 laser module, 631 charging port, 632 battery;
720 fourth tapeline structure, 721 locating member, 722 first locating portion, 723 second locating portion, 724 rotating shaft, 725 engagement portion;
810 housing, 811 first side wall, 812 second side wall, 820 fifth tapeline structure, 821 pressure piece, 822 third rotating shaft, 823 resilient element, 830 display means, 831 push end, 832 first rotating shaft, 833 transmission line, 840 transmission mechanism, 841 first rotating element, 842 connecting rod, 843 extension, 844 second rotating shaft;
910 first housing, 911 second housing, 912 arcuate recessed portion, 913 arcuate raised portion, 920 sixth tapeline structure, 930 connecting structure, 931 connecting protrusion, 932 stud, 934 connecting slide channel, 935 fin, 936 first connecting sheet, 937 second connecting sheet;
1001 laser ranging device, 1002 second device;
1110 housing, 1111 raised portion, 1112 second accommodating space, 1113 light receiving hole, 1114 laser beam emitting port, 1115 battery hatch, 1120 seventh tapeline structure, 1121 spacer, 1122 base portion, 1123 annular portion;
1210 housing, 1211 tape exit port, 1220 eighth tapeline structure, 1221 support frame, 1222 tapeline wheel, 1223 tape, 1224 tape locking button, 1225 pressure piece, 1230 sensing component, 1231 connecting member, 1232 roller, 1233 resilient member;
241 laser ranging measurement, 242 tapeline-based distance measuring measurement, 1240 terminal;
1330 marking code identification component, 1331 marking code;
1420 ninth tapeline structure, 1421 locating member, 1422 locking means, 1423 locating portion, 1424 body, 1425 screw, 1426 shaft shank.

DETAILED DESCRIPTION OF THE PREFERRED EMBODIMENTS

Five preferred embodiments of the present invention will be described more fully hereinafter with reference to the accompanying drawings, in which preferred embodiments of the invention are shown, for the purpose of clarity and better understanding of the techniques. This invention may be embodied in various different forms and the invention should not be construed as being limited to the embodiments set forth herein.

In the description, elements with identical structure are marked with the same reference numerals, and like elements with similar structure or function are marked throughout with like reference numerals, respectively. The dimension and thickness of each element in the accompanying drawings are arbitrarily shown, and the invention does not define the dimension and thickness of each element. Certain parts may be shown somewhat exaggerated in thickness in the interest of clarity.

Directional terms described by the present invention, such as upper, lower, front, back, left, right, inner, outer, side, etc., are only directions by referring to the accompanying drawings, and are thus used to explain and describe the present invention, but the present invention is not limited thereto.

It will be understood that when an element is referred to as being "on/above" another element, it can be directly placed on the other element, or there may be an intermediate element on which it is placed, and the intermediate element is placed on the other element. When an element is referred to as being "mounted to" or "connected to" another element, either one can be understood as being directly "mounted" or "connected", or via an intermediate element to be indirectly "mounted to" or "connected to" the other element.

Embodiment 1

Figure 2:
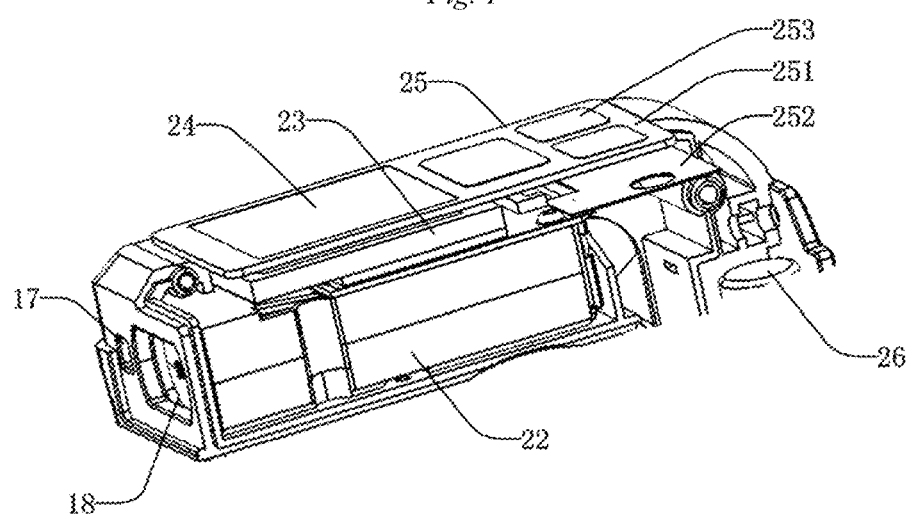
FIG. 2 is a schematic structural view of Embodiment 1 of the invention after the front side face of the shell is opened.
Figure 3:
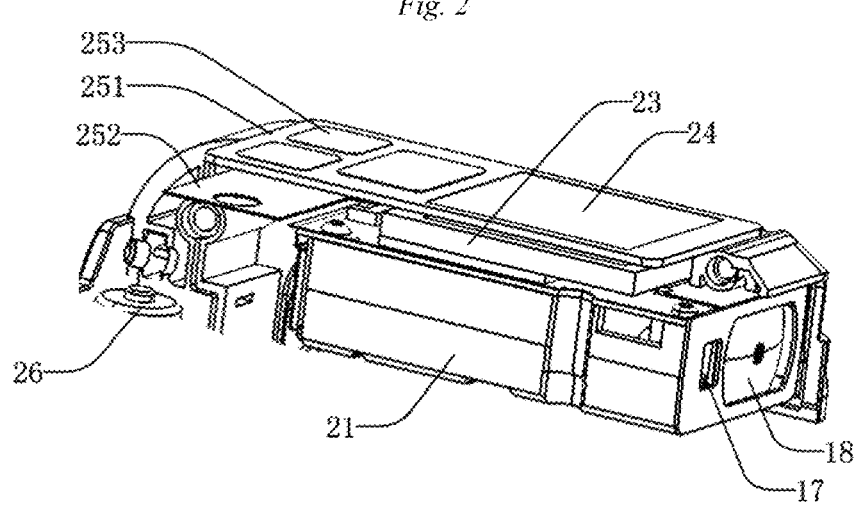
FIG. 3 is a schematic structural view of Embodiment 1 of the invention after the back side face of the shell is opened.

As shown in FIGS. 1-3, Embodiment 1 provides a distance measuring device that can independently implement laser ranging, which includes a shell 1 and a laser ranging device 2. The laser ranging device 2 is provided in the interior of the shell and/or on the outer surface thereof.

As shown in FIG. 1, the shell 1 is an irregular cuboid having the width thereof equal to or approximately equal to the height thereof, and the thickness thereof is about 25% to 40% of the width thereof. The shell 1 has six faces, namely the front side face 11, the rear side face 12, the left side face 13, the right side face 14, the top face 15, and the bottom face 16.

As shown in FIGS. 2 and 3, the laser ranging device 2 includes a laser generating means 21, a photoelectric conversion means 22, a circuit board 23, a display means 24, an operating means 25, and a power supply 26. The laser generating means 21 is preferably a laser tube, that is, a glass sealed-off $CO_2$ laser, but is not limited to a laser tube, and may be other means for generating a laser beam. The photoelectric conversion means 22 is preferably a photoelectric sensor, but is not limited to a photoelectric sensor, or may be other means for capturing light and converting the optical signal into an electrical signal. The laser generating means 21 and the photoelectric conversion means 22 may be arranged in a side by side arrangement or in an up and down arrangement. In this embodiment, the laser generating means 21 is integrated with the photoelectric conversion means 22.

Figure 4:
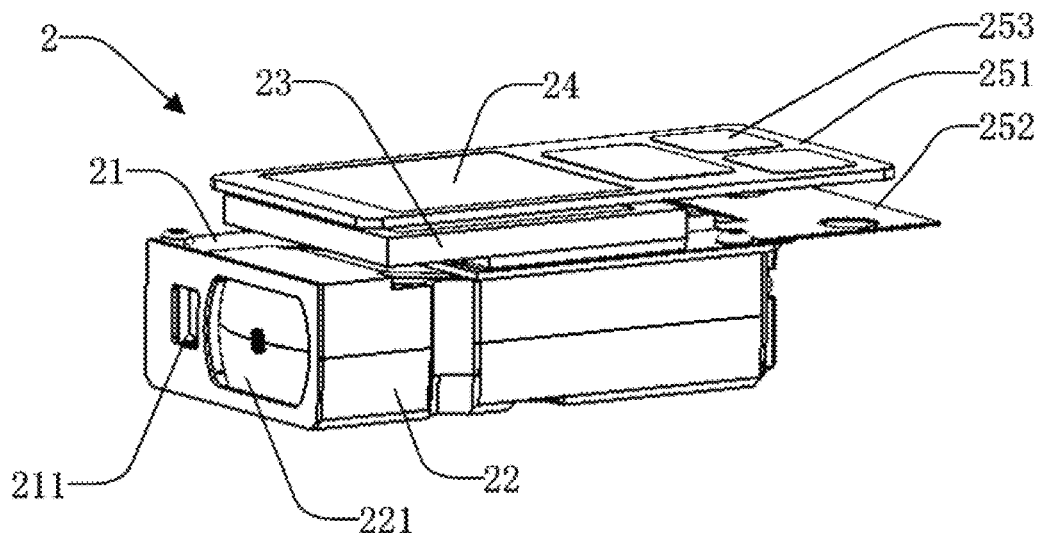
FIG. 4 is a schematic structural view of Embodiment 1 of the invention after the shell is removed.

As shown in FIG. 4, the laser generating means 21 includes a light emitting surface 211, and the photoelectric conversion means 22 includes a light receiving surface 221. The light receiving surface 221 is disposed beside the light emitting surface 211 and is adjacent to the light emitting surface 211. The two may be provided in a side by side arrangement or in an up and down arrangement.

Figure 5:
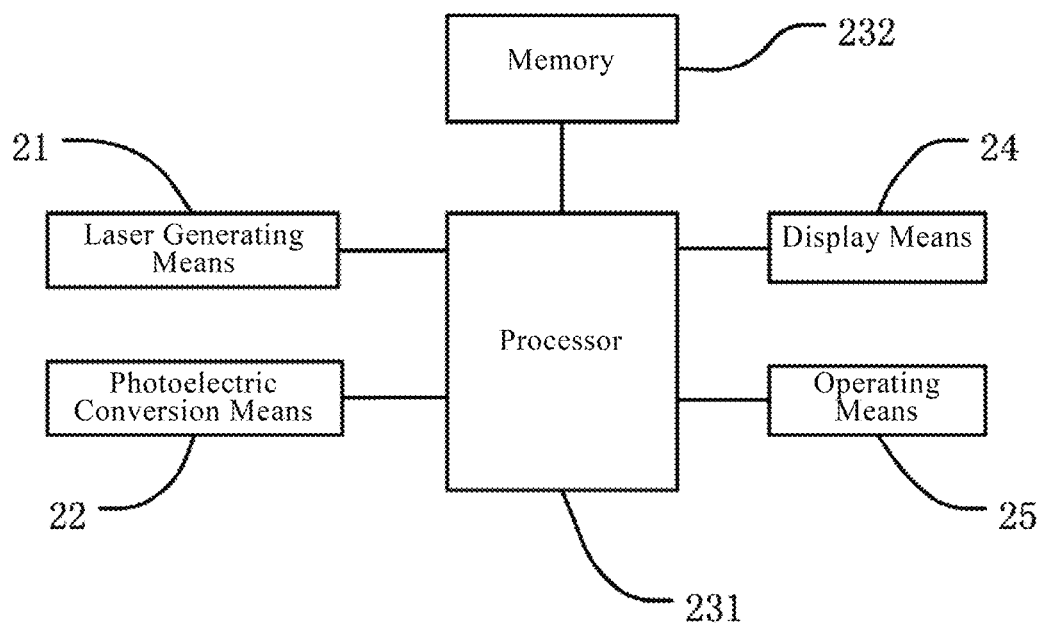
FIG. 5 is a structural block diagram of the circuit in Embodiment 1 of the invention.

As shown in FIG. 5, at least one processor 231 is provided on the circuit board 23. The processor 231 is connected to the laser generating means 21 for controlling the normal operation of the laser generating means 21. The processor 231 is connected to the photoelectric conversion means 22 for acquiring the feedback electric signal and calculating the distance from the object to be measured to the distance measuring device of the present embodiment. Alternatively, a memory 232 may be provided on the circuit board 23, the memory 232 is connected to the processor 231 for storing the distance from the object to be measured to the distance measuring device so that the user can check the reading record again from the display means 24 when the user forgets the reading.

In the present embodiment, the processor 231 issues a control signal instructing the laser generating means 21 to emit a laser beam as a measurement beam to the object to be measured. The measurement beam forms a reflection on the surface of the object to be measured, producing reflected light and a portion of the reflected light parallel to the measurement beam can be captured by the photoelectric conversion means 22 and converted into an electrical signal to be fed back to the processor 231. The inside of the processor 231 may be provided with a timer for recording the time point at which the laser beam is emitted from the laser generating means 21 and the time point at which the feedback electric signal is obtained. Based on the time difference between the two time points, it is possible to calculate the distance between the object to be measured and the distance measuring device. During the above mentioned time period, the laser beam travels back and forth between the object to be measured and the distance measuring device at the speed of light, and the half of the product of the time difference and the speed of light is the distance to be measured between the object to be measured and the distance measuring device.

In the present embodiment, the light emitting surface of the laser generating means and the light receiving surface of the photoelectric conversion means may be both provided on the outer surface of the shell (such as the left side face 13 of the shell), the laser generating means 21 emits a laser beam as a measurement beam from the light emitting surface 211, and photoelectric conversion means 22 captures the external reflected light through the light receiving surface 221. Since the laser beam is always perpendicular to the plane where the light emitting surface 211 is located, the light emitting surface 211 can be used to assist the user in aiming at the object to be measured; thus the laser beam can be directly irradiated to the object to be measured. In order to ensure the reflection effect, the laser beam is preferably directly irradiated to the plane on the object to be measured, and making the laser beam be vertically irradiated to the plane as much as possible, so that more light can be reflected back to the distance measuring device, making the measurement results more accurate.

If the light emitting surface and the light receiving surface are provided on the outer surface of the shell, it is prone to be worn during transportation, use and storage. After long-term use, the light feedback sensitivity and measurement accuracy of the rangefinder is reduced due to the wear, and the service life is reduced. For this reason, the present embodiment also provides the following technical solutions.

As shown in FIGS. 1 to 4, the shell 1 is provided with a laser beam emitting port 17 and a light receiving hole 18, and the laser beam emitting port 17 directly faces the light emitting surface 211, and the light receiving hole 18 directly faces the light receiving surface 221. Since the light emitting surface 211 and the light receiving surface 221 are adjacent to each other, the laser beam emitting port 17 and the light receiving hole 18 are also disposed adjacent to each other. In the present embodiment, the laser beam emitting port 17 and the light receiving hole 18 are both provided on the left side face 5 of the shell.

The light emitting surface 211 and the light receiving surface 221 are completely disposed inside the shell 1 instead of on the surface of the shell 1. The light emitting surface 211 and the light receiving surface 221 can be protected from abrasion, and the influences on the electrical device caused by the dust and the moisture in the surrounding environment can be reduced. It is possible to further improve the service life of the light emitting surface 211 and the light receiving surface 221 without affecting normal operations of the laser generating means 21 and the photoelectric conversion means 22, and to ensure the light feedback sensitivity and the measurement accuracy of the distance measuring device.

The laser generating means 21 emits a laser beam as a measurement beam through the laser beam emitting port 17, and the photoelectric conversion means 22 captures external reflected light through the light receiving hole 18. Since the laser beam is always perpendicular to the plane where the laser beam emitting port 17 is located, the laser beam emitting port 17 is used to assist the user in aiming at the object to be measured, so that the laser beam can be directly irradiated to the object to be measured, and in order to ensure the reflection effect, the laser beam is preferably directly irradiated to a plane on the object to be measured, and making the laser beam be vertically irradiated to the plane as much as possible, so that more light can be reflected back to the distance measuring device, making the measurement results more accurate.

In the present embodiment, the center point of the light emitting surface 211 is located on the same straight line as the center point of the light receiving surface 221, and the closer the distance between the light emitting surface 211 and the light receiving surface 221 and between the light receiving hole 18 and the laser beam emitting port 17 is, the smaller the error is. Theoretically speaking, if the center point of the light emitting surface 211 completely coincides with the center point of the light receiving surface 221, the error is minimum, but it is currently difficult to realize.

In the conventional case, the area of the light receiving surface 221 is 3 to 10 times the area of the light emitting surface 211. Since the laser beam that is emitted can be kept along a straight line, after the laser beam is reflected by the surface of the object to be measured, it is difficult to ensure sufficient intensity and amount of the light that can be returned along the original path back to the vicinity of the light emitting surface 211 if the object to be measured is not a mirror surface with excellent reflection effect, even if the laser beam can be irradiated vertically onto the object to be measured. Therefore, the area of the light receiving surface 221 may be appropriately enlarged to further improve the measurement accuracy and improve the feedback sensitivity.

Since the light emitting surface 211 and the light receiving surface 221 may be disposed in a side by side arrangement or in an up and down arrangement, the laser beam emitting port 17 and the light receiving hole 18 may thus also be disposed in a side by side arrangement or in an up and down arrangement. The laser beam emitting port 17 is slightly larger than the light emitting surface 211, and the light receiving hole 18 is slightly larger than the light receiving surface 221. Since the area of the light receiving surface 221 is normally 3 to 10 times the area of the light emitting surface 211, the area of the light receiving hole 18 is also 3 to 10 times the area of the laser beam emitting port 17.

In the present embodiment, the display means 24 is preferably a display screen provided on the outer surface of the shell 1 and connected to the processor 231 for displaying the distance from the object to be measured to the distance measuring device.

In the present embodiment, the operating means 25 is provided on the outer surface of the shell 1 and is connected to the processor 231 for transmitting at least one control instruction to the laser ranging device 21.

The operating means 25 includes an operation panel 251 and an operation circuit board 252. The operation panel 251 is preferably provided on the upper surface of the shell 1, or on the front surface or the rear surface of the shell 1. The operation panel 251 is used for inputting at least one control action, and each of the control actions corresponds to a control instruction. The operation circuit board 252 is disposed below the operation panel 251 and is connected to the processor 231. The operation circuit board 252 converts the at least one control action into at least one electrical signal and sends the electrical signal to the processor 231. Each of the electrical signals corresponds to a control instruction. In the present embodiment, the operation panel 251 is provided with three keys 253 corresponding to three control instructions respectively, namely, a start instruction, a close instruction, a storage instruction for starting the distance measuring device, closing the distance measuring device or storing the distance from the object to be measured to the distance measuring device. The user operates the operation panel 251, presses a certain button to input a control instruction, and the operation panel 251 simultaneously records a control action, and the operation circuit board 252 converts the control instruction inputted by the user using the key into an electric signal, and according to the key that is pressed, an electrical signal containing a control instruction is transmitted to the processor 231. The operation panel 251 may also be provided with other keys 253 to input more control instructions.

In order to facilitate user operation and use, the display means 24 and the operating means 25 of the present embodiment are preferably provided on the upper surface of the shell 1 (the outer surface of the top surface 15), and the user looks down and can readily see the operation panel 251 and operate the distance measuring means as well as read the readings of the distance to be measured. The display means 24 and the operating means 25 can be integrally designed, that is, adopting a touch screen, and an operation control function and a reading display function are realized at the same time. Due to the high cost of the touch screen, this scheme is still more or less limited in applications.

In the present embodiment, the power supply 26 may be a button battery, a rectangular battery or two parallel-arranged cylindrical batteries. The size of a button battery is small, taking up small space, and the distance measuring device can be provided in a smaller size. Rectangular cells, cylindrical batteries have greater battery power than the button battery, needing less times of battery replacement, which can reduce the cost in use, but the size thereof are larger, which makes it inconvenient to carry. Both of the rectangular battery and the cylindrical battery may be a rechargeable battery, thereby further reducing the cost in use.

The present embodiment also provides a fixed mounting plate (not shown), which can be connected and fixed to the shell 1 by means of a screw nut or the like, and the laser generating means 21, the photoelectric conversion means 22, the circuit board 23, the tapeline structure 3, etc. can be all mounted on the fixed mounting plate.

The technical effect of the first embodiment is to provide a laser ranging device capable of independently realizing the ranging function, which can effectively protect the light emitting surface of the laser generating means and the light receiving surface of the photoelectric conversion device as compared with conventional laser ranging device, reducing unnecessary wear, having good dustproof and waterproof effect, effectively prolonging the service life of components, and ensuring relatively high light feedback sensitivity and higher measurement accuracy even after long-term use.

Embodiment 2

The distance measuring device according to Embodiment 1 only has a laser ranging function and is more suitable for long distance ranging, and in a case where the distance to be measured is shorter, for example, when the distance to be measured is less than 1 m or 2 m, the error of the laser ranging device will be quite large and the measurement accuracy will be lower.

Figure 6:
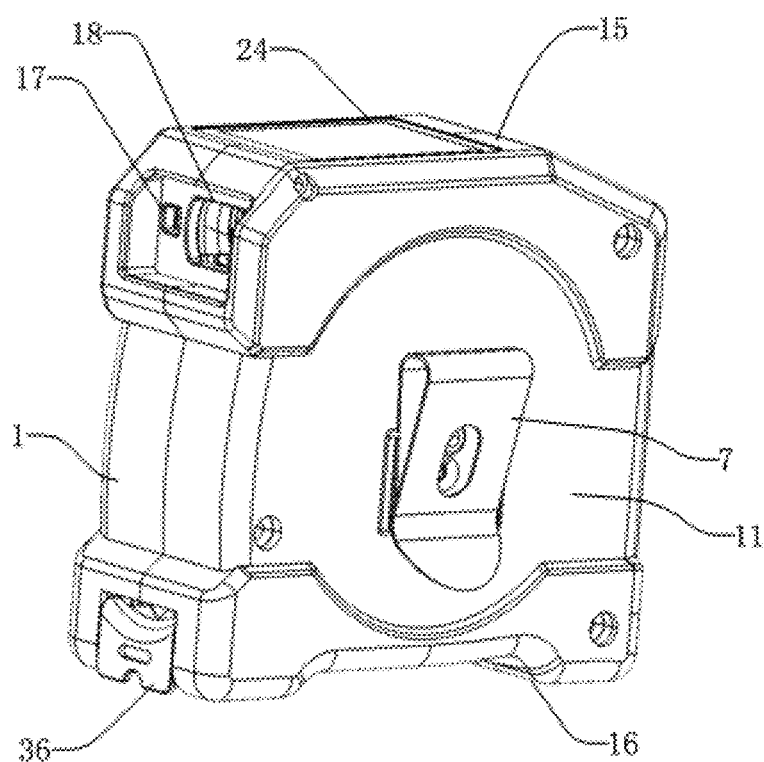
FIG. 6 is an overall schematic structural view of Embodiment 2 of the invention.
Figure 7:
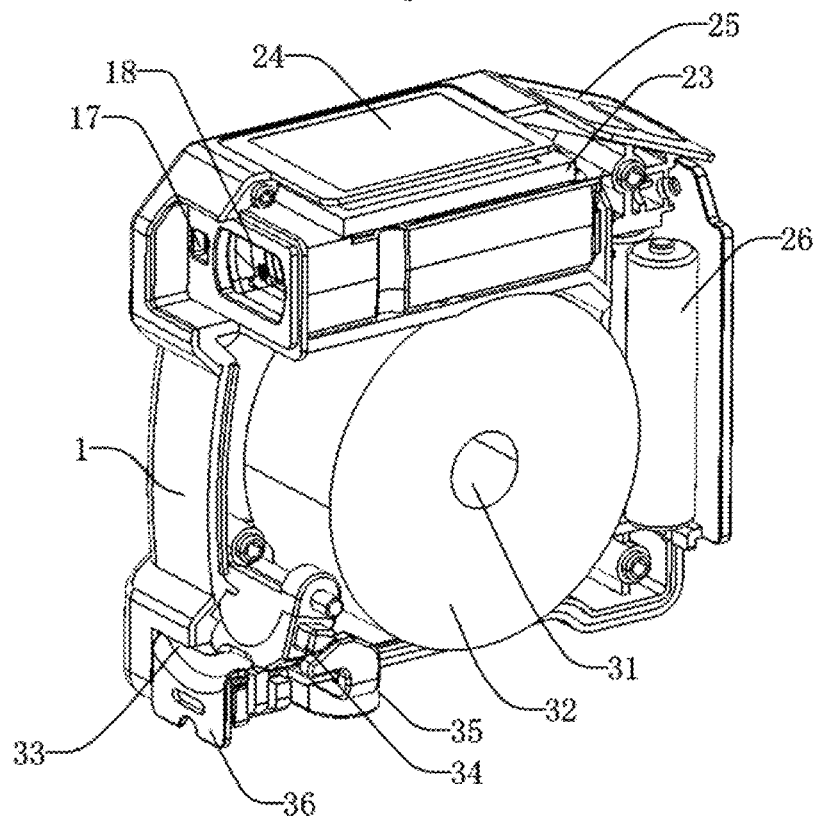
FIG. 7 is a schematic structural view of Embodiment 2 after the front side face of the shell is opened.
Figure 8:
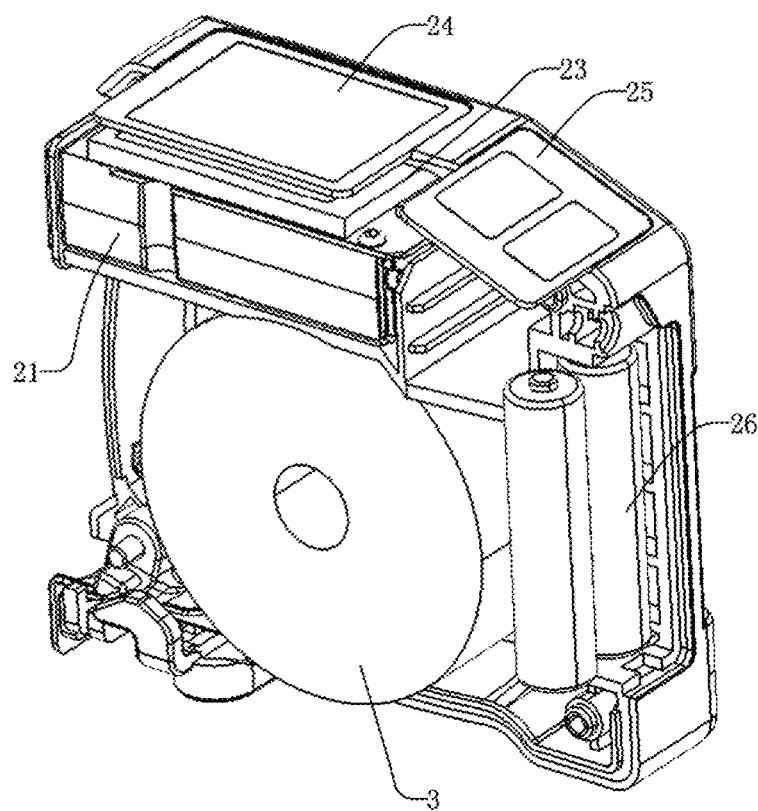
FIG. 8 is a schematic structural view of Embodiment 2 of the invention viewed from another angle after the front side face of the shell is opened.

In view of this, Embodiment 2 provides another technical solution, which includes all the technical solutions of Embodiment 1, and the distinguishing technical feature is characterized in that, as shown in FIGS. 6-8, a tapeline structure 3 is also provided in the shell 1. In the shell 1, the laser ranging device 2 and the tapeline structure 3 are provided at the same time, and the gap of the shell can be reduced to enhance the dustproof and waterproof effects.

As shown in FIGS. 6-8, the tapeline structure 3 includes a tapeline wheel 31, a tape 32, a tape outlet 33, a pressure piece 34, and a locking key 35. The tapeline wheel 31 is provided in the shell 1; the tape 32 is wound on the tapeline wheel 31 in whole or in part; one end of the tape 32 is fixedly connected to the tapeline wheel 31 and the other end is provided with a tape end portion 36. The tape outlet 33 is provided at the lower end of the outside wall of the shell 1, and the tape end portion 36 extends beyond the shell 1 through the tape outlet 33, and the pressure piece 34 is provided inside the shell 1 and near the tape outlet 33. When the tape 32 is pulled out of the shell 1, the pressure piece 34 can be used to press the tape 32 so that the length of the tape 32 outside the shell 1 is kept constant. The locking key 35 is provided on the outer surface of the shell 1 for controlling the pressure piece 34 to press or loosen the tape 33.

The tapeline structure 3 may also be any of the prior art tapelines. In the work, the tape 32 is pulled out of the shell 1 by the tape end portion 36 to perform the measurement. After the measurement, it is necessary to press down the locking key 35, in which the pressure piece 34 presses the tape 32 so that the length of the tape 32 outside the shell 1 remains constant so as to allow reading of the length of the tape 32. In the present embodiment, the locking key 35 is a key provided on the bottom surface 16 of the shell 1, and after the first pressing, the pressure piece 34 presses the tape 32; after reading the length value, and after pressing again, the pressure piece 34 releases the tape 32, and after the length of the tape 32 is read, the tape 32 is retracted into the interior of the shell 1.

The tapeline structure 3 is preferably as the following scheme: the width of the tape 32 is less than or equal to 2 cm, preferably 1 cm; the length of the tape 32 is less than or equal to 2 m, and the volume of the tape 32 wound on the tapeline wheel 31 is effectively reduced, the space occupied by the tape 32 in the distance measuring device is reduced, and the width of the distance measuring device is reduced. For the combination of the laser generating means 21 and the photoelectric conversion means 22, the measurement accuracy will be relatively higher, if the object to be measured is 2 m or more, so the tape length of the tape reaching 2 m will make the present embodiment applicable in various situations.

In the present embodiment, the circuit board 23 is located above the tapeline structure 3 and near the top portion of the shell 1, which can prevent the circuit board from being pressed by other components in the tapeline structure 3, and prevent the various components on the circuit board 23 from being damaged caused by being pressed.

As shown in FIGS. 6 to 7, in the present embodiment, the laser generating means 21 and the photoelectric conversion means 22 are located above the tapeline structure 3, and the laser generating means 21 and the photoelectric conversion means 22 are disposed in a side by side arrangement to appropriately increase the overall height of the distance measuring device. If the laser generating means 21 and the photoelectric conversion means 22 are disposed in an up and down arrangement, the distance measuring device would be too tall and inconvenient to carry. The laser generating means 21 and the photoelectric conversion means 22 may also be both located below the tapeline structure 3, which will not be further described here.

As shown in FIGS. 7-8, the power supply 26 is preferably two cylindrical or rectangular batteries having a thickness less than the shell 1, either vertically or obliquely provided on the left or right side of the tapeline structure 3, so as to appropriately increase the overall width of the distance measuring device. If the cylindrical batteries are provided above or below the tapeline structure 3, the height of the distance measuring device is further increased, so that the appearance of the distance measuring device is incongruous, making it inconvenient to carry and use the device.

In this embodiment, in order for full utilization of the interior space of the tapeline, the laser generating means 21, the photoelectric conversion means 22, the circuit board 23 and the power supply 26 are arranged along a radial edge of the tapeline structure 3. As shown, a tape width of the tapeline structure 3 is chosen as L. Preferably, L≥18 mm. Preferably, L is 18-33 mm. In this way, in the laser ranging device, a laser module made up of the laser generating means 21 and the photoelectric conversion means 22 has a width (measured along an axis of the tapeline structure) that is substantially the same as a width of the tapeline structure. In this way, the laser ranging device 2 coincides with the tapeline structure 3 in a vertical direction (a radial direction of the tapeline wheel 31 in the tapeline structure 3), rather than at opposing axial ends of the tapeline wheel 31 in the tapeline structure 3, resulting in a reduced overall width of the distance measuring device.

As shown in FIG. 6, the front side face 11 of the shell 1 is also provided with a clip 7 which allows the user to attach the distance measuring device on the belt on the waist by means of the clip 7 for easy carrying.

The technical effect of the second embodiment is to provide a distance measuring device in which the laser ranging device and the tapeline structure are arranged inside the same shell so that the distance measuring device has both a long distance ranging and a short distance ranging function, effectively enhancing the dustproof and waterproof effect at the same time. The thickness of the distance measuring device according to the second embodiment is similar to that of the conventional tapeline, and is convenient for hand gripping, and is convenient for the user to operate and use in the work.

Embodiment 3

The distance measuring device according to the second embodiment increases the height and the width of the distance measuring device to a certain extent, so that the occupancy area of the distance measuring device is relatively large and the device is inconvenient to carry.

Figure 9:
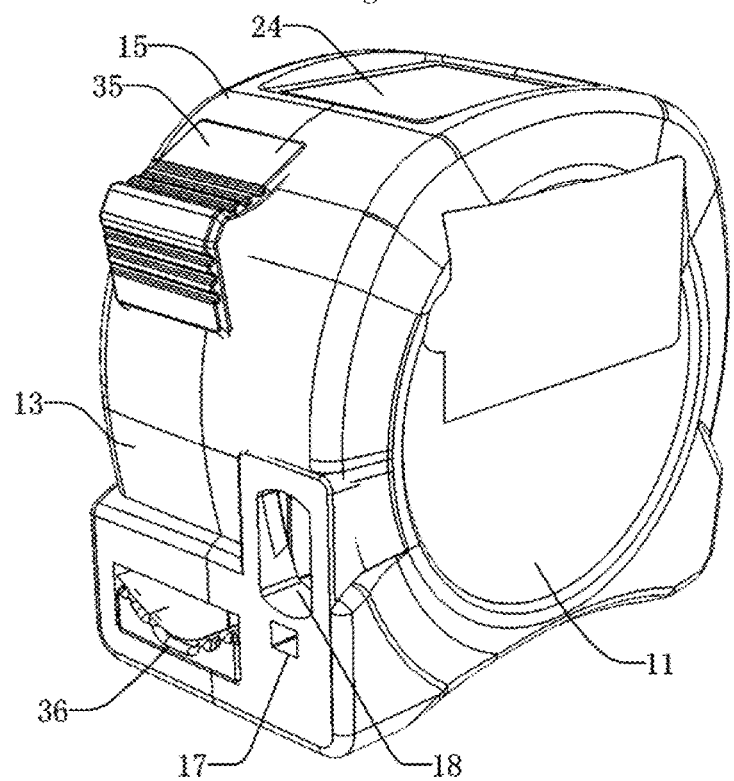
FIG. 9 is an overall schematic structural view of Embodiment 3 of the invention.

For this reason, Embodiment 3 provides another technical solution. Embodiment 3 includes most of the technical solutions of Embodiment 3, and the distinguishing technical feature is characterized in that, as shown in FIGS. 9-11, the power supply 26, together with the laser generating means 21 and the photoelectric conversion means 12, are simultaneously located in front of the tapeline structure 3, increasing the thickness of the distance measuring device to a certain extent and effectively reducing the height and width of the distance measuring device.

Figure 10:
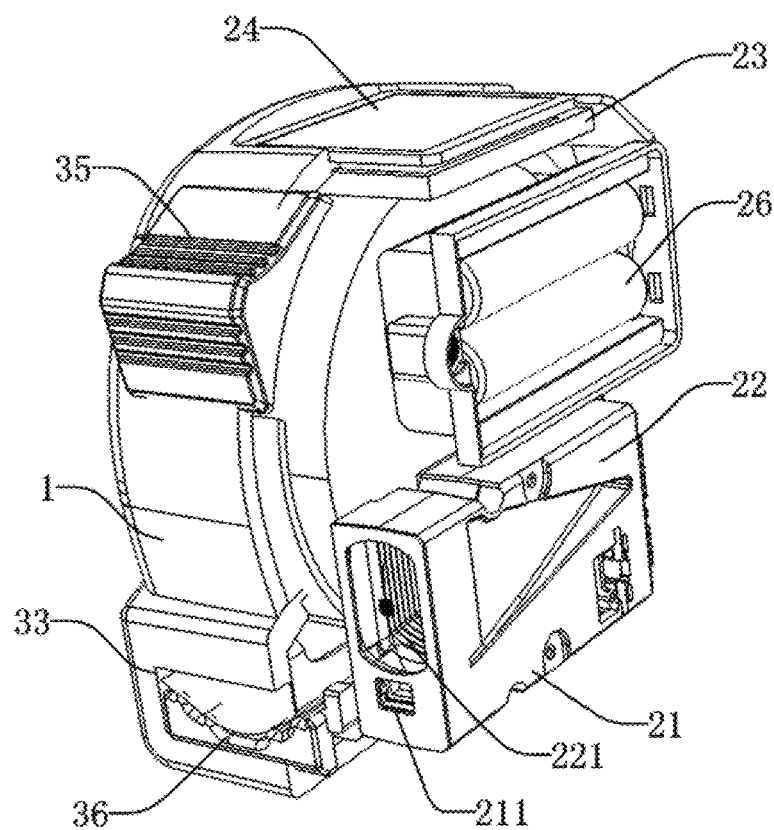
FIG. 10 is a schematic structural view of Embodiment 3 of the invention after the front side face of the shell is opened.
Figure 11:
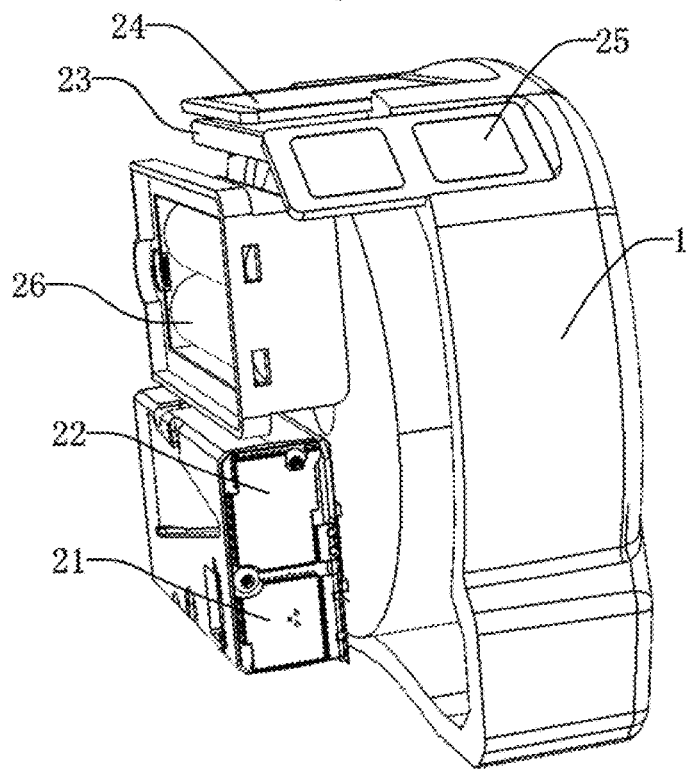
FIG. 11 is a schematic structural view of Embodiment 3 of the invention viewed from another angle after the front side face of the shell is opened.

Another distinguishing technical feature of Embodiment 3 relative to Embodiment 2 is that, as shown in FIGS. 10-11, the laser generating means 21 and the photoelectric conversion means 22 are located below the power supply 26, the power supply 26 is a cylindrical battery or a rectangular battery, the thickness of which is relatively small, so that the thickness of the distance measuring device will not be too large. Similarly, alternatively, the laser generating means 21 and the photoelectric conversion means 22 may also be located above the power supply 26.

Another distinguishing technical feature of Embodiment 3 relative to Embodiment 2 is characterized in that, as shown in FIGS. 10 to 11, the laser generating means 21 and the photoelectric conversion means 22 are disposed in an up and down arrangement, and the laser generating means 21 is located directly below the photoelectric conversion means 22, thereby appropriately increasing the overall thickness of the distance measuring device so that the thickness of the distance measuring device is not so large. If the laser generating means 21 and the photoelectric conversion means 22 are disposed in a side by side arrangement, the thickness of the distance measuring device will be too large, and it is difficult to be gripped by a hand and the operation is inconvenient.

Similarly, the power supply 26 together with the laser generating means 21 and the photoelectric conversion means 22 may be simultaneously located behind the tapeline structure 3, and the principle thereof is similar to that in the foregoing case and will not be described here.

As shown in FIGS. 9 and 10, the locking key 35 is a sliding key provided on the left side face 13 or the right side face 14 of the shell 1. The locking key 35 can be slid back and forth to effect the pressing or releasing of the tape 32. The locking key 35 may also be a key provided on the bottom surface 16 of the shell 1 in Embodiment 2.

The display means 24 and the operating means 25 of the present embodiment are preferably provided on the upper surface of the shell 1 (the outer surface of the top surface 15) in order to facilitate the operation and use by the user. Once looking down, the user can readily operate the device, and read the distance to be measured. Since the thickness of the distance measuring device described in Embodiment 1 is larger than that of the distance measuring device described in Embodiment 2, the display means 24 can be wider and larger, the display of font is larger and clearer, which further improves the user experience of the reading process.

The technical effect of Embodiment 3 is to provide such a distance measuring device that the distance measuring device has both a long distance ranging and a short distance ranging function, and the laser ranging device and the tapeline structure are arranged in the same shell, further reducing the overall volume, the height and the width of the product. The height and width of the distance measuring device described in Embodiment 3 are similar to those of the conventional tapelines, making it easier for the user to carry, and to operate and use in the work.

Embodiment 4

The distance measuring device according to Embodiment 2 increases the height and the width of the distance measuring device to a certain extent, so that the distance measuring device occupies a relatively large area and is inconvenient to carry. The distance measuring device according to Embodiment 3 increases, to a certain degree, the thickness of the distance device, and the users will hold it in their hands, making the operation inconvenient.

Figure 12:
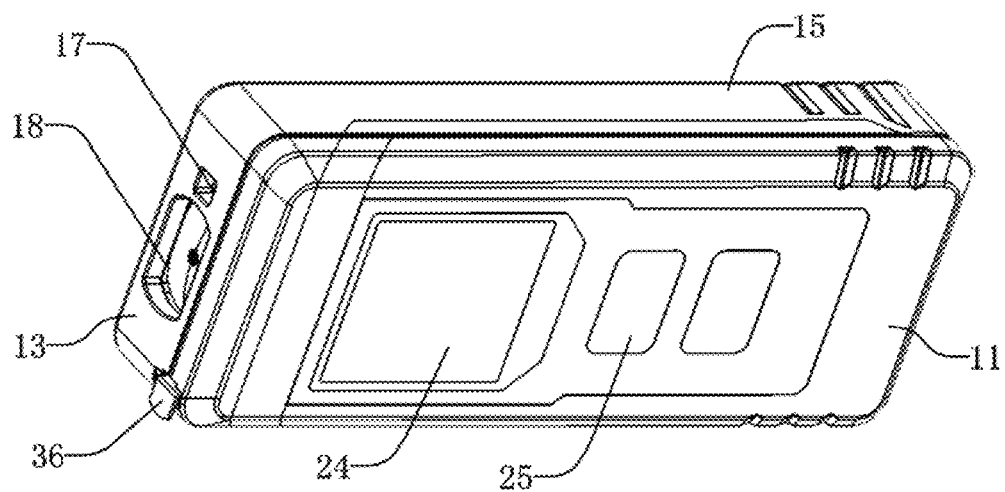
FIG. 12 is an overall schematic structural view of Embodiment 4 of the invention.

For this reason, Embodiment 4 provides another technical solution. Embodiment 4 includes most of the technical solutions of Embodiment 3, and the distinguishing technical feature is characterized in that, as shown in FIGS. 12 to 14, the power supply 26 is located behind the tapeline structure 3 to reduce the height or width of the distance measuring device.

Figure 13:
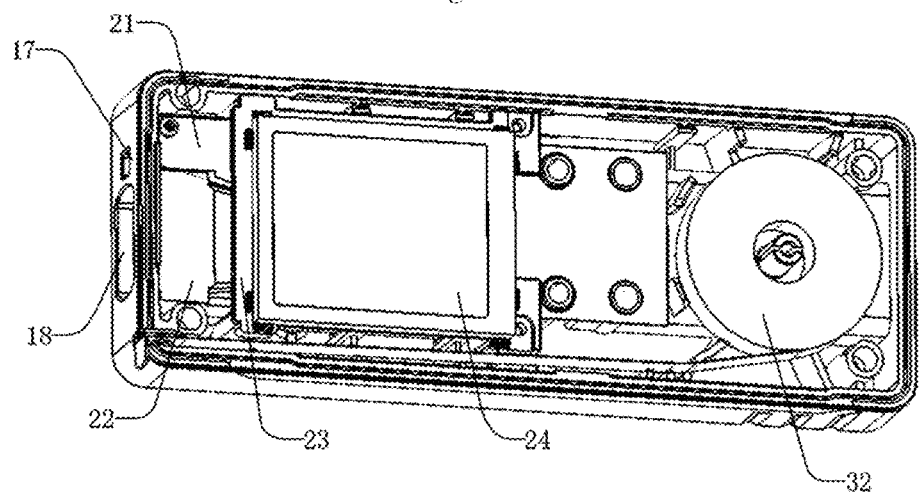
FIG. 13 is a schematic structural view of Embodiment 4 of the invention after the front side face of the shell is opened.
Figure 14:
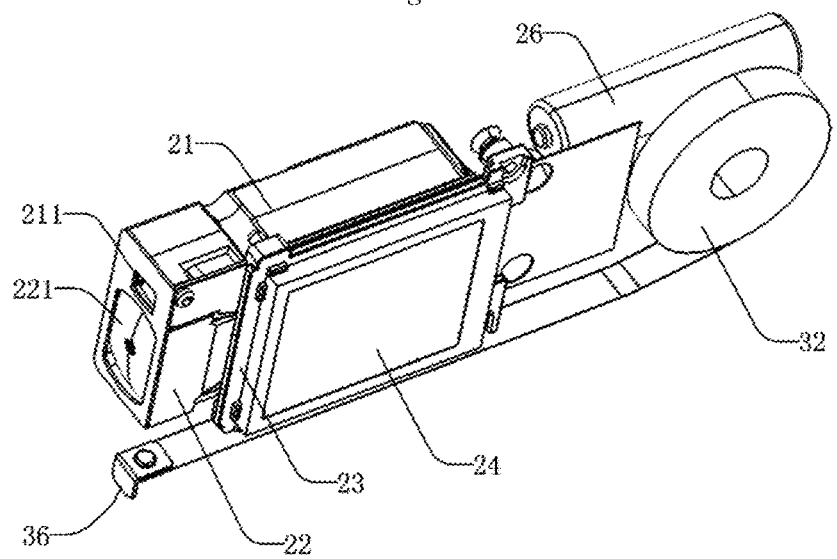
FIG. 14 is a schematic structural view of Embodiment 4 of the invention after the shell is removed.

Another distinguishing technical feature of Embodiment 4 relative to Embodiment 3 is characterized in that, as shown in FIGS. 13 to 14, the laser generating means 21 and the photoelectric conversion means 22 are located on the left side of the tapeline structure 3; the power supply 26 is a cylindrical battery or a rectangular battery of a smaller diameter, having a relatively smaller thickness, so that the thickness of the distance measuring device is not so large.

Another distinguishing technical feature of Embodiment 4 relative to Embodiment 3 is characterized in that, as shown in FIGS. 13 to 14, the circuit board 23 and the display means 24 are vertically disposed on the left side of the tapeline structure 3; the laser generating means 21 and the photoelectric conversion means 22 are located behind the circuit board 23, and the display means 24 is located in front of the circuit board 23.

The display screen in the display means 24 and the operation panel 251 of the operating means 25 are provided on the front surface of the shell 1 (outer surface of the front side face 11). Since the area of the front side face 11 and the rear side face 12 of the display means are relatively large, the display screen of the display means 24 and the keys of the operating means 25 can be provided larger, making the operation more convenient and the display clearer. Circuit board 23 and the display means 24 are vertically provided to save more space and reduce the width of the distance measuring device.

The laser generating means 21 and the photoelectric conversion means 22 are disposed in an up and down arrangement, and the laser generating means 21 is located just below the photoelectric conversion means 22, thereby limiting the thickness of the entire distance measuring device. If the laser generating means 21 and the photoelectric conversion means 22 are disposed in a side by side arrangement, the thickness of the distance measuring device will be too large, and it is difficult to be gripped by hands and the operation is inconvenient.

Similarly, alternatively, the power supply 26 may be located in front of the tapeline structure 3, the laser generating means 21 and the photoelectric conversion means 22 may be located on the right side of the power supply 26, and the circuit board 23 and the display means 24 may be vertically provided on the right side of the tapeline structure 3. The display screen in the display means 24 and the operation panel 215 of the operating means 25 may be provided on the rear surface of the shell 1 (outer surface of the rear side face 12).

The technical effect of Embodiment 4 is to provide a distance measuring device having functions of long distance ranging and short distance ranging; and setting the laser ranging device and the tapeline structure in the same shell further reduces the overall volume, the height and the thickness of the product; the height and the thickness of the distance measuring device described in Embodiment 4 may be smaller than the ordinary tapeline, making it more convenient to be carried by users; and the display means and the operating means of the distance measuring device described in Embodiment 4 are relatively large, facilitating operation and reading by users.

Embodiment 5

In Embodiments 2-4, the laser ranging device and the tapeline structure are arranged in the same shell, and the volume is significantly larger than that of the ordinary tapeline, the space occupied is relatively large, and it is inconvenient to be carried to a certain extent. For the user, in some special occasions, the user only needs to use the tapeline function or laser ranging function, without the need to use multi-functional laser ranging device. In addition, in Embodiments 2-4, the number of components in the shell is larger, the assembly line is long, the process is difficult, and the production efficiency is low.

Figure 15:
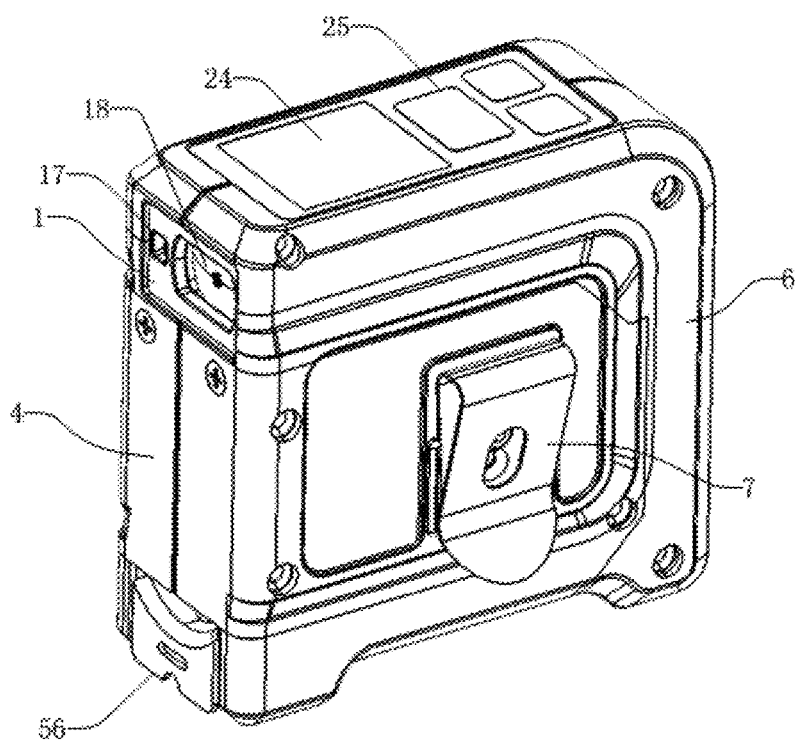
FIG. 15 is an overall schematic structural view of Embodiment 5 of the invention.
Figure 16:
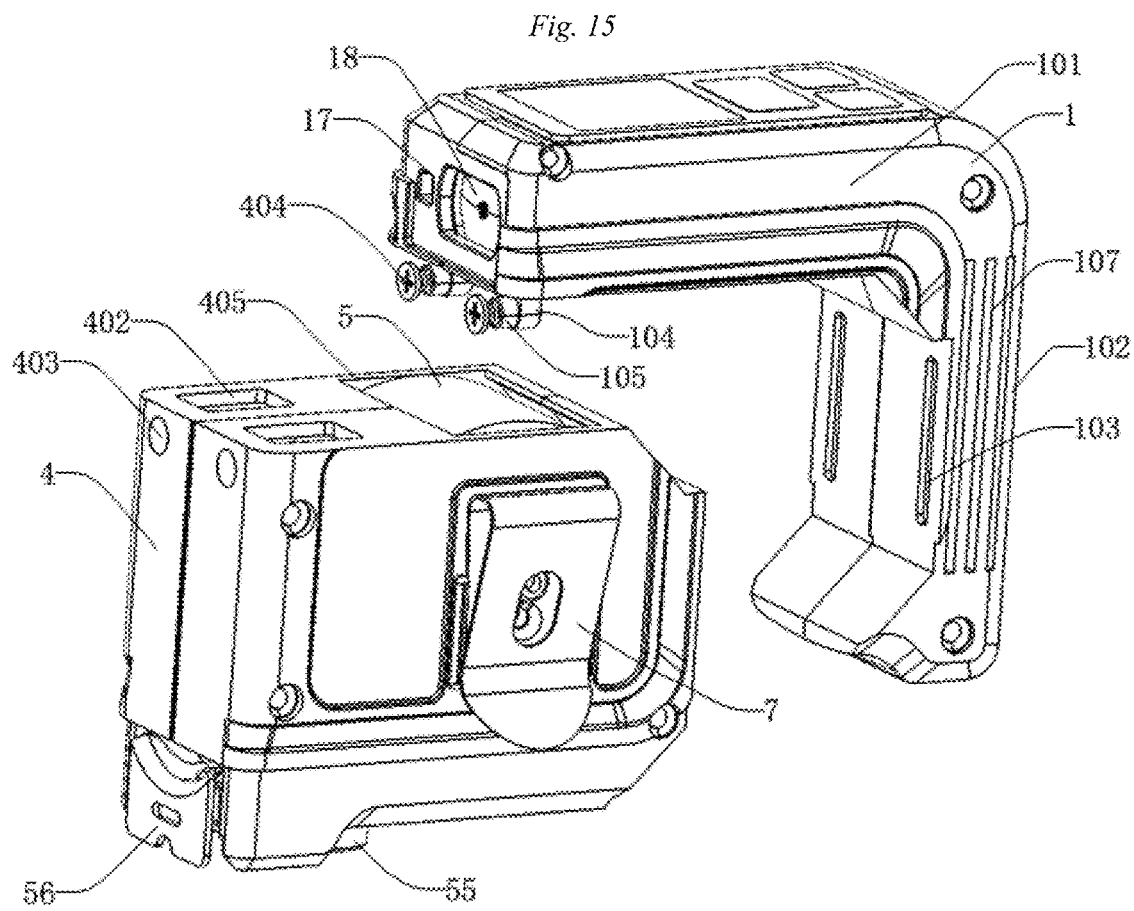
FIG. 16 is an exploded schematic structural view of Embodiment 5 of the invention.

In view of this, Embodiment 5 provides another solution, where Embodiment 5 includes all the technical solutions of Embodiment 1 and the distinguishing technical feature is characterized in that, as shown in FIGS. 15 to 16, the present embodiment may also include a second tapeline structure 5 provided inside the second shell 4, and the second shell 4 is detachably connected to the shell 1.

The connection between the second shell 4 and the shell 1 may be respectively provided with connecting means corresponding to each other, for example, a plurality of bayonets are designed on one side of the shell 1, a plurality of buckles corresponding to the bayonets are designed on one side of the second shell 4; when they are engaged with each other, they can be integrally fixed together and can have both short distance measurement and long distance measurement functions. The second shell 4 and the shell 1 may be connected in an up and down, left and right or front and rear relation.

Figure 19:
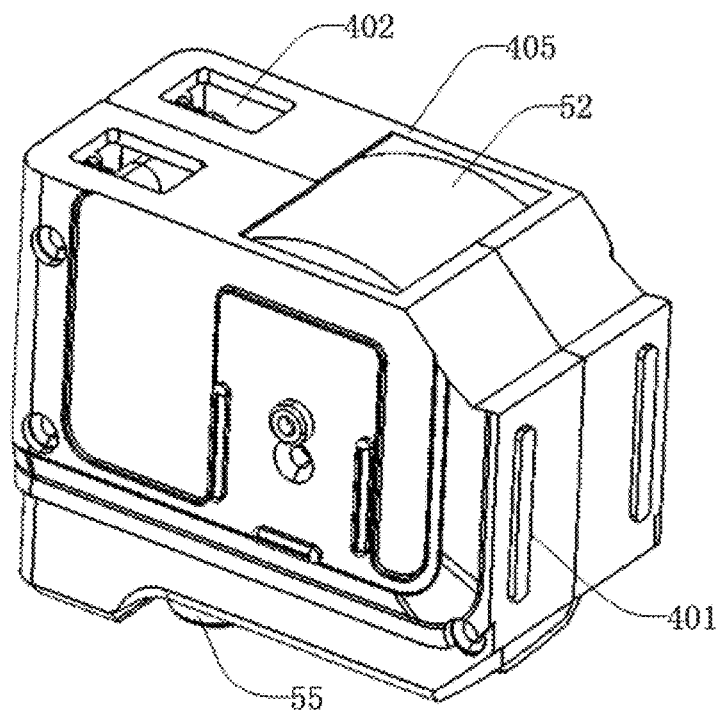
FIG. 19 is a schematic structural view of the second shell in Embodiment 5 of the invention.
Figure 20:
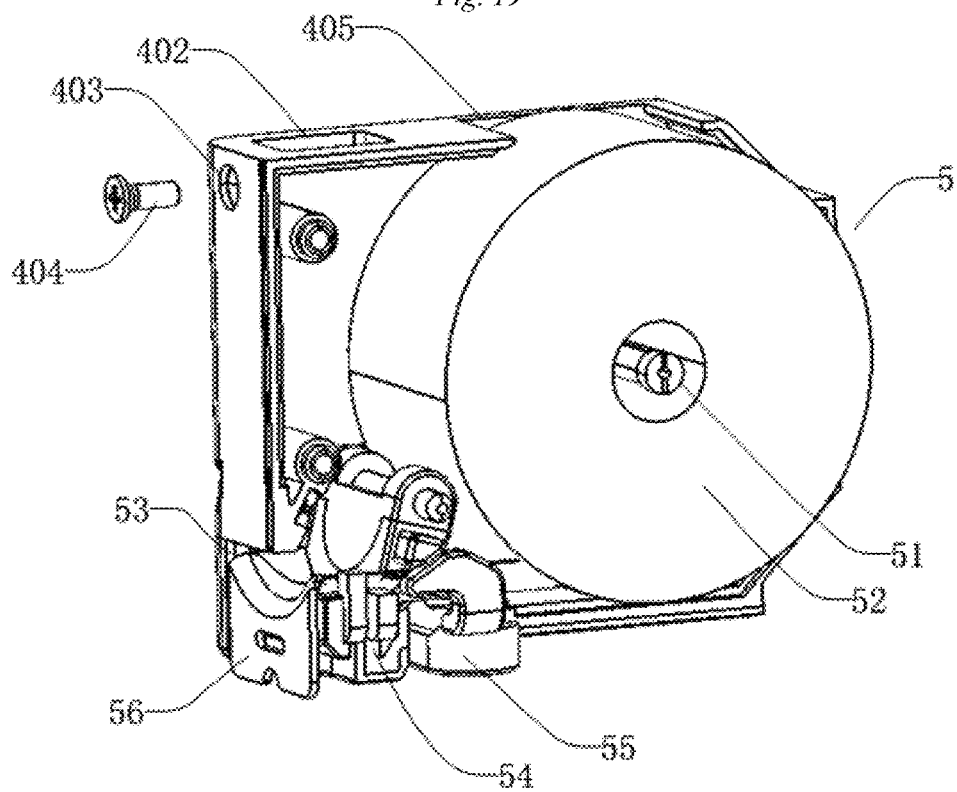
FIG. 20 is a schematic structural view of Embodiment 5 of the invention after the front side face of the second shell is opened.

As shown in FIGS. 19-20, the second tapeline structure 5 includes a second tapeline wheel 51, a second tape 52, a second tape outlet 53, a second pressure piece 54, and a second locking key 55. The second tapeline wheel 51 is provided inside the second shell 4, the second tape 52 is entirely or partially wound on the second tapeline wheel 51, and one end of the second tape 52 is fixedly connected to the second tapeline wheel 51, and a second tape end 56 is provided at the other end. The second tape outlet 53 is provided at the lower end of the outer side wall of the second shell 4, the second tape end 56 extends beyond the second shell 4 through the second tape outlet 53, and the second pressure piece 54 is provided inside the second shell 4 and near the second tape outlet 53. When the second tape 52 is pulled out of the second shell 4, the second pressure piece 54 may be used to press the second tape 52 such that the length of the second tape 52 outside the second shell 4 is kept constant; and the second locking key 55 is provided on the outer surface of the second shell 4 for controlling the second pressure piece 54 to press or loosen the second tape 53.

The interior of the second tapeline structure 5 may be any of the prior art tapelines. In the work, the second tape 52 is pulled out of the second shell 4 by means of the second tape end 56 to complete the measurement, and after the measurement, the second locking key 55 needs to be pressed or toggled, the second pressure piece 54 therein presses the second tape 52 so that the length of the second tape 52 outside of the second shell 4 remains constant so as to facilitate reading the indicated number of the length of the second tape 52.

The second locking key 55 may be a sliding key provided on the left side face or the right side face of the second shell 4, and the second tape 52 may be pressed or loosened by sliding the second locking key 55 forward and backward. The second locking key 55 may be a button (not shown) provided on the bottom surface of the second shell 4, and after the first pressing, the second pressure piece 54 presses the second tape 52; after reading the indicated number of the length, the second pressure piece 54 loosens the second tape 52 after the button is pressed again.

As shown in FIG. 16, the front side face of the second shell 4 is provided with a clip 7 which allows the user to attach the distance measuring device on the belt on the waist by means of the clip 7 for easy carrying.

Figure 17:
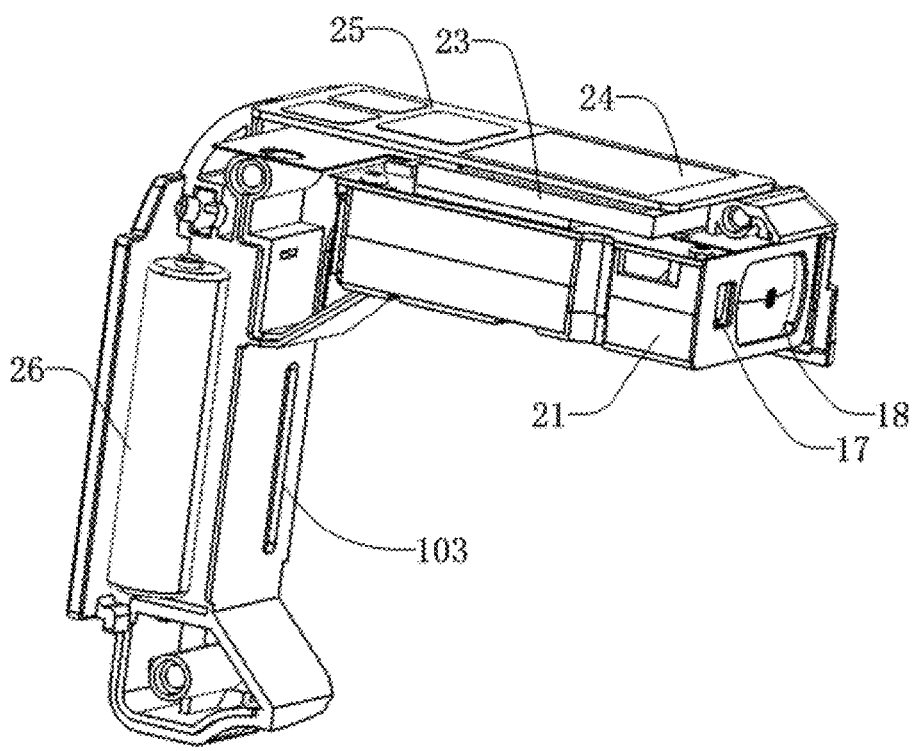
FIG. 17 is a schematic structural view of Embodiment 5 after the back side face of the shell is opened.
Figure 18:
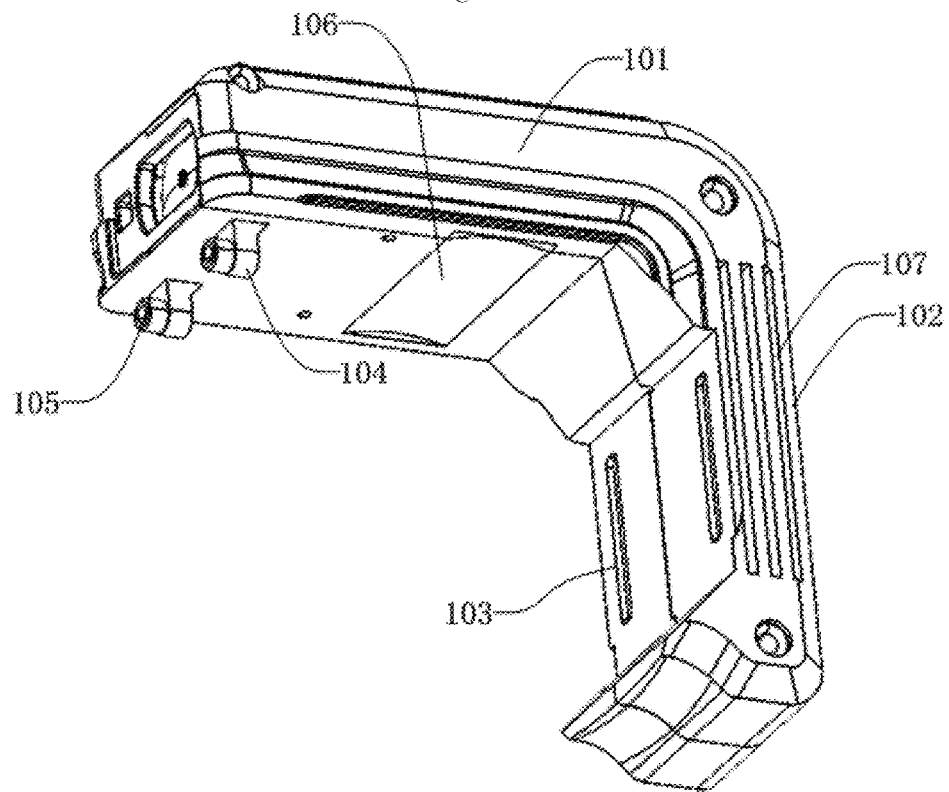
FIG. 18 is a schematic structural view of the left lower side face of the shell in Embodiment 5 of the invention.

As shown in FIGS. 16 to 18, in the present embodiment, the shell 1 is an approximately inverted L-shape, similar to the "┐" shape, the front side face 11 and the rear side face 12 of the shell 1 are approximately inverted L-shape. The shell 1 includes a horizontal portion 101 and a vertical portion 102, the horizontal portion 101 is horizontally provided on the upper portion of the shell 1; the vertical portion 102 is located at the lower portion of the shell 1, and the upper end of the vertical portion 102 is the right end of the horizontal portion 101; the shell 1 is an inverted L-shape, and there is a certain space at the lower left of the shell, which can accommodate the second shell 4, and the second shell 4 is detachably connected to the lower left of the shell 1.

The shell 1 includes at least one first snap slot 103 which is recessed on the left side face of the vertical portion 102 of the shell 1; the second shell 4 includes at least one first strip 401, and the first strip 401 protrudes from the right side face of the second shell 4; when the second shell 4 is connected to the shell 1, the first strip 401 is engaged with the first snap slot 103. In the present embodiment, two vertically-provided first snap slots 103 and two vertically-provided first strips 401 are preferred. When the second shell 4 is connected to the lower left of the shell 1, the first strip 401 is engaged with the first snap slot 103 and acts as a stopper, so that the second shell 4 and the shell 1 remain relatively fixed.

The shell 1 includes at least one connecting member 104, each of which projects downwardly from the bottom surface of the horizontal portion 101 of the shell 1; the connecting member 104 is located near the left side face of the shell 1; each connecting member 104 is provided with a horizontally oriented nut 105, and the nut 105 faces the left side of the shell 1. The second shell 4 includes at least one connecting through hole 402, at least one screw hole 403 and at least one screw 404. Each connecting through hole 402 is vertically penetrated through the top surface of the second shell 4 and its position is corresponding to the position of the connecting member 104. The screw hole 403 is horizontally penetrated though the left side face of the second shell 4. When the second shell 4 is connected to the shell 1, the connecting member 104 passes through the connecting through hole 402; each nut 105 corresponds to a screw hole 403, and the nuts 105 and the screw holes 403 corresponding to each other are located on the same straight line; each screw 404 is passed through a screw hole 403 and is fixed to the nut 105 corresponding to the screw hole 403. In the present embodiment, two connecting members 104 and two connecting through holes 402 are preferred. When the second shell 4 is connected to the lower left of the shell 1, the two connecting members 104 are inserted into the two connecting through holes 402, the two nuts 105 are opposed to the two screw holes 403, the two screws 404 are inserted into the nut 105 from the screw holes 403 on the left side face of the second shell 4, so that the two are fixed to each other.

The second shell 4 includes a rectangular through hole 405 vertically extending through the top surface of the second shell 4 and located above the second tapeline wheel. The shell 1 comprises an arcuate groove 106 recessed on the bottom surface of the shell 1 and located above the rectangular through hole 405. When the second shell 4 is connected to the shell 1, the upper portion of the second tape 52 wound on the second tapeline wheel 51 passes through the rectangular through hole 405 and is placed in the arcuate groove 106. When the second tape 52 is fully wound on the second tapeline wheel 51, a tapeline disk is formed with a relatively large volume, and the rectangular through hole 405 and the arcuate groove 106 are provided so as to minimize the volume of the distance measuring device to facilitate carrying and use.

In the present embodiment, the shell 1 and the second shell 4 can be relatively fixed only by two sets of screws and nuts as a connecting member, and the advantage is that the removal and installation are convenient and the user can easily detach the two as desired and can only carry or use a part of or the assembled whole part therein; the deficiency lies in that the shell 1 and the second shell 4 are relatively fixed only by the two sets of screws and nuts, and the connection structure is simple and not strong and reliable enough, and it is possible to cause damage to the connection structure upon hitting or dropping, making the two separate and cannot be connected again. For this reason, the present embodiment further provides the following technical solutions.

As shown in FIG. 15, the distance measuring device according to the present embodiment may further include a shell outer casing 6 which is a "concave" shape in a transverse direction; when the second shell 4 is connected to the shell 1, the shell outer casing 6 is coated on the outer surface of the shell 1 and the second shell 4. The shell outer casing 6 may be made of hard material (such as hard plastic, stainless steel, etc.), or elastic material (such as rubber, etc.) may be used so that the combination of the second shell 4 and the shell 1 is more stable, so that the two are not easily separated from each other and at the same time can also play a protective role.

Figure 21:
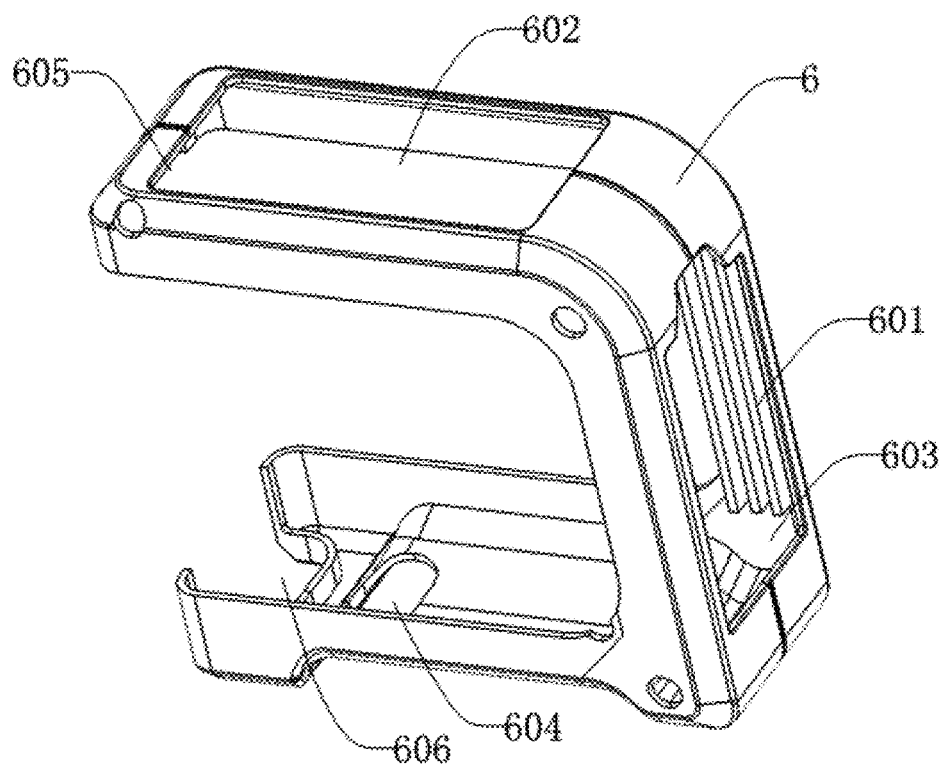
FIG. 21 is a schematic structural view of the outer casing of the shell in Embodiment 5 of the invention.
Figure 22:
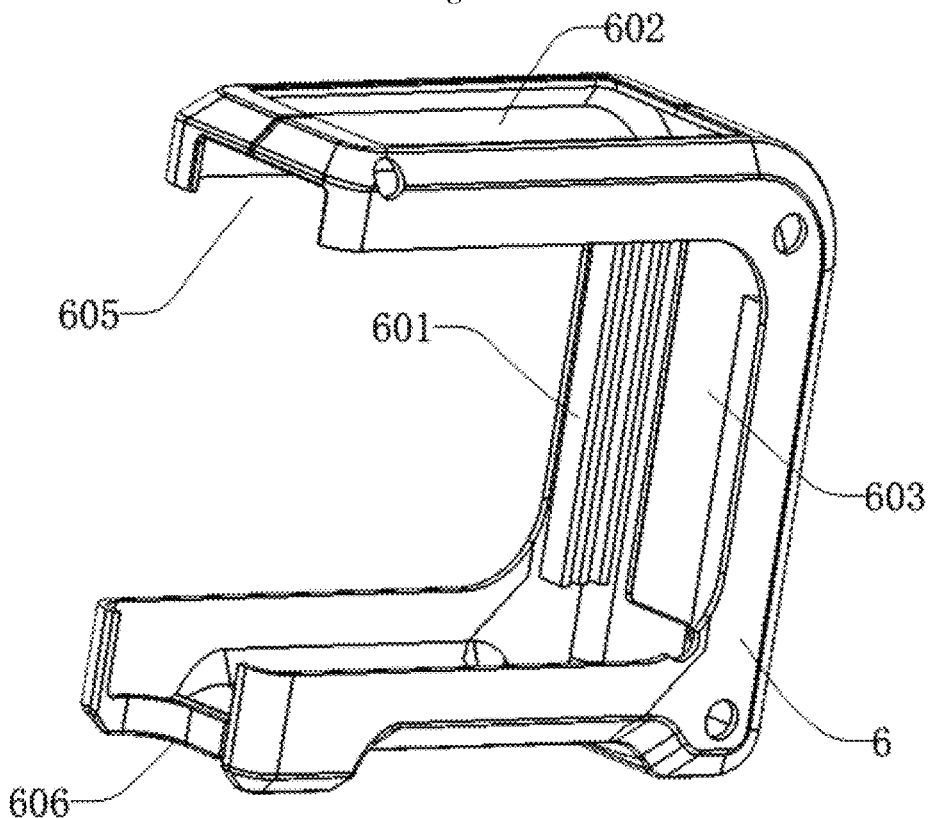
FIG. 22 is a schematic structural view of the outer casing of the shell in Embodiment 5 of the invention viewed from another angle.

As shown in FIG. 18, the shell 1 includes at least one second snap slot 107 which is recessed into the front side face and the rear side face of the vertical portion 102 of the shell 1. As shown in FIGS. 21 and 22, the shell outer casing 6 includes at least one second strip 601 projecting from the inner side face of the shell outer casing 1 and corresponding to the second snap slot 107. When the shell outer casing 6 is coated on the outer surface of the shell 1, the second strip 601 is engaged to the second snap slot 107 so that the shell 1 and the shell outer casing 6 are relatively fixed.

The shell 1 and the shell outer casing 6 are provided with a plurality of corresponding screw holes (not shown) respectively. After the shell outer casing 6 is coated on the outer surface of the shell 1, the shell outer casing 6 is fixed to the shell 1 by means of a plurality of screws so that the second shell 4 and the shell 1 are less likely to be disengaged from each other, so that the combination of the two is more stable. This structure can protect the shell 1 and the shell outer casing 6 better because of the large number of fasteners, but it is generally not advisable for the user to separate the shell 1 and the second shell 4 to use due to the inconvenience of detaching.

As shown in FIGS. 21 and 22, the shell outer casing 6 includes a first outer casing through hole 602, a second outer casing through hole 603, a third outer casing through hole 604, a first outer casing notch 605, and a second outer casing notch 606. The first outer casing through hole 602 passes through the top surface of the shell outer casing 6, corresponding to the display means 24 and the operating means 25, whereby the user can perform the control operation and the data reading. The second outer casing through hole 603 penetrates through the right side face of the shell outer casing 6, corresponding to the power supply 26, and the box cover of the battery box is located where the power supply 26 is exposed at the outer wall of the shell 1, and whereby the battery can be replaced by the user. The third outer casing through hole 604 passes through the bottom surface of the shell outer casing 6 corresponding to second locking key 55, whereby the user can lock the tape. The first outer casing notch 605 is provided on the left side face of the upper portion of the shell outer casing 6 and corresponds to the laser generating means 21 and the photoelectric conversion means 22; the second outer casing notch 606 is provided on the left side face of the lower portion of the shell outer casing 6, corresponding to the second tape outlet 53 so as to ensure that the shell outer casing 6 does not affect the normal operation and use of the laser ranging device and the tapeline structure.

The technical effect of Embodiment 5 is to provide a distance measuring device comprising a detachable laser ranging device and a tapeline structure, both of which can be operated independently, and the user can separate the two or combine them into one as needed to carry or use. When the two are fixed to each other as a whole, it can be applied to both long distance ranging and short distance ranging. The distance measuring device according to Embodiment 5 designs the product as two modules: a laser ranging device and a tapeline structure, which can be produced separately and then assembled into a whole. Such a modular design can effectively improve the production efficiency of the product.

Embodiment 6

As shown in FIGS. 23 to 29, Embodiment 6 provides a distance measuring device with laser ranging and tapeline-based distance measuring functions, in which a laser ranging device 2 and a third tapeline structure 620 are mounted within a single housing 610. The third tapeline structure 620 is separately assembled in the housing 610 as a standalone component.

Figure 23:
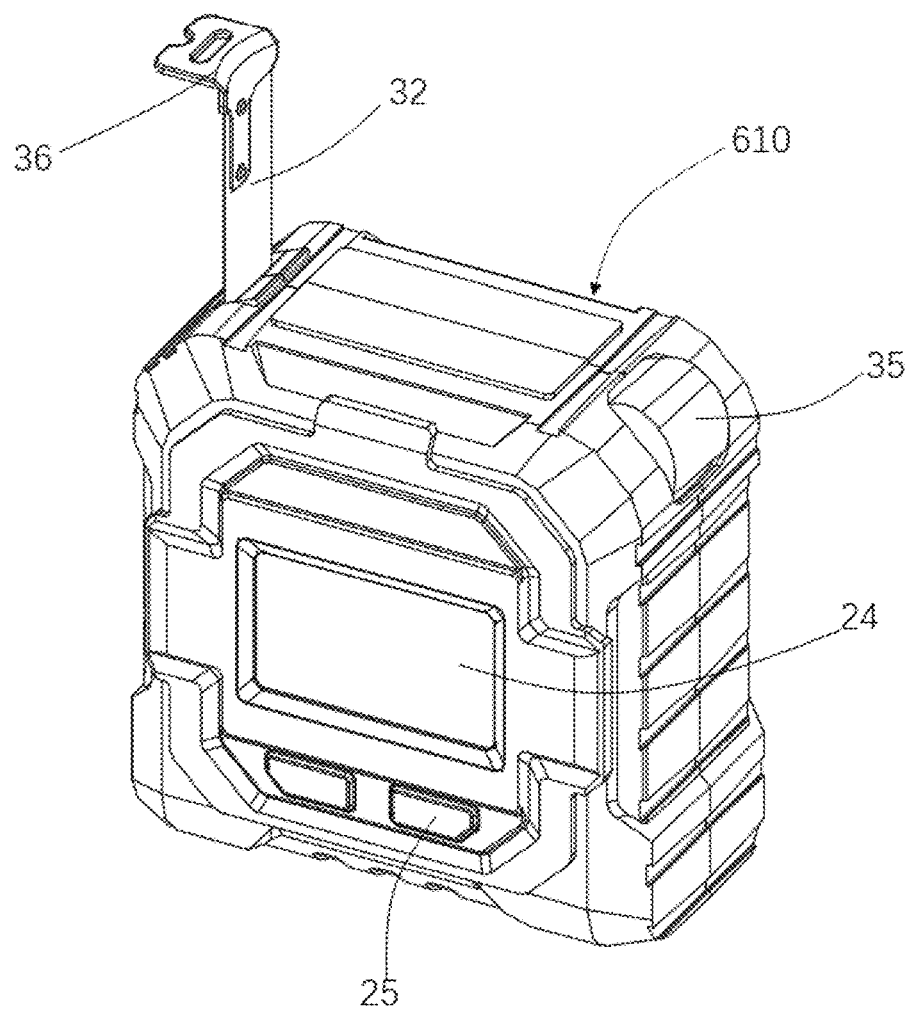
FIG. 23 is an overall schematic structural view of a distance measuring device according to Embodiment 6 of the present invention.
Figure 24:
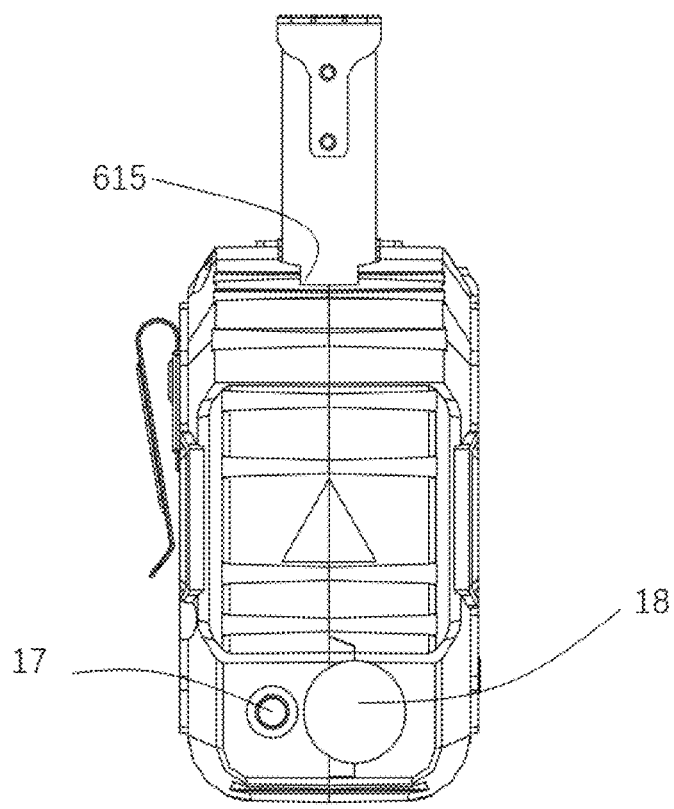
FIG. 24 is a side view of the distance measuring device according to Embodiment 6 of the present invention.
Figure 25:
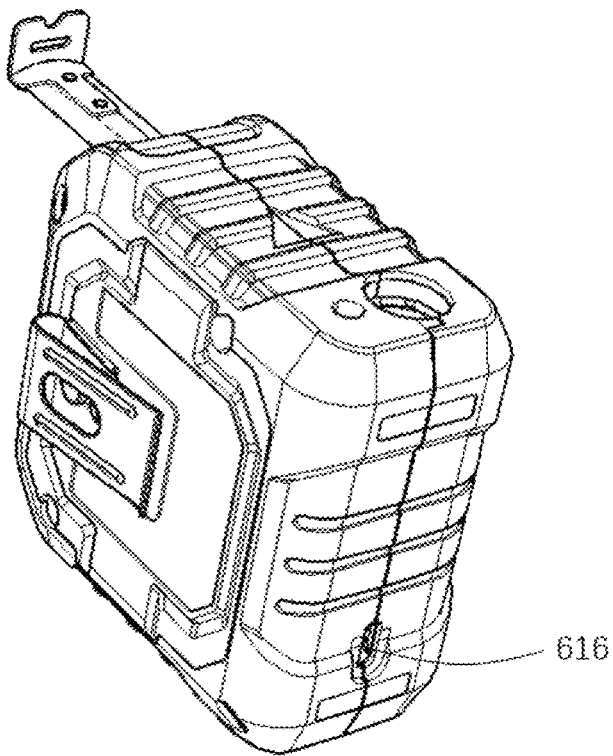
FIG. 25 is a schematic structural view of a backside of the distance measuring device according to Embodiment 6 of the present invention.
Figure 26:
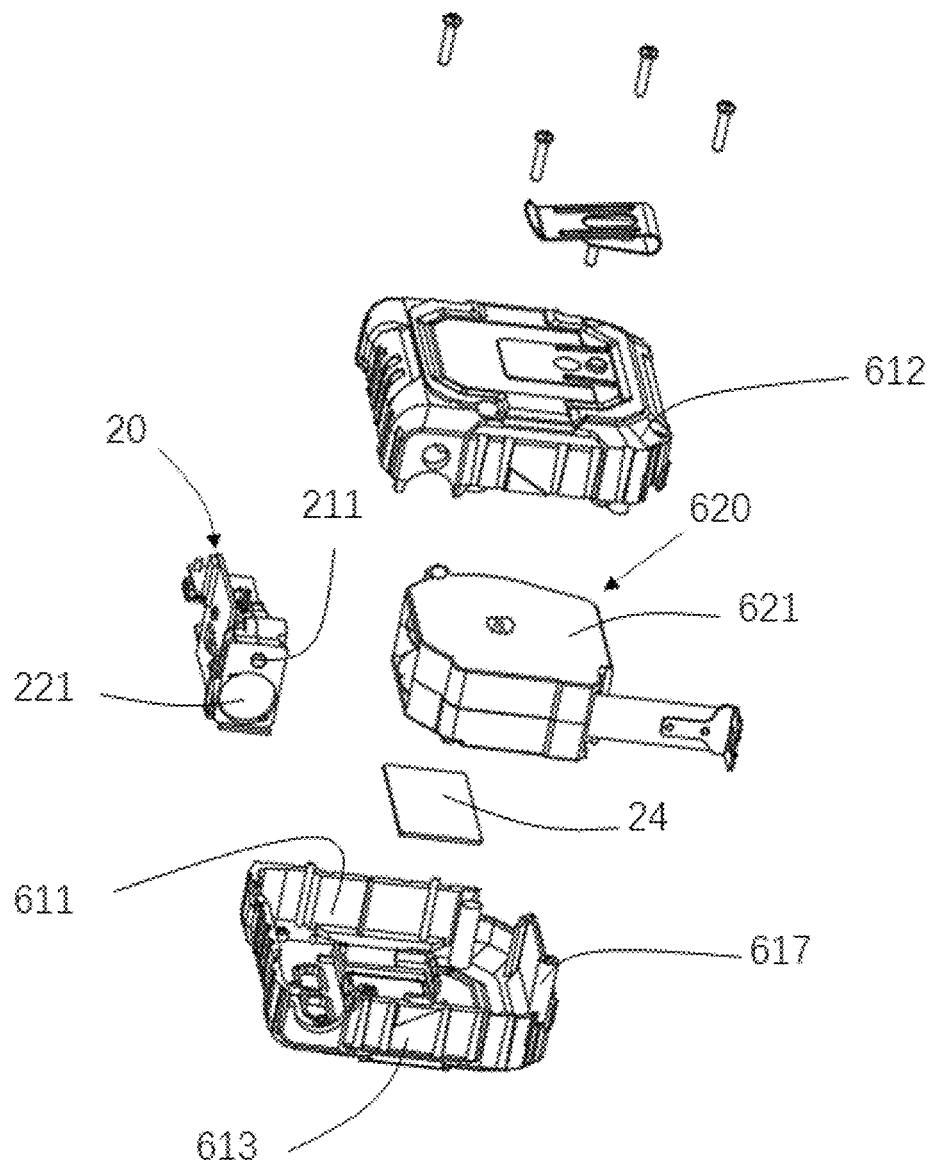
FIG. 26 is an exploded schematic view of the distance measuring device according to Embodiment 6 of the present invention.
Figure 27:
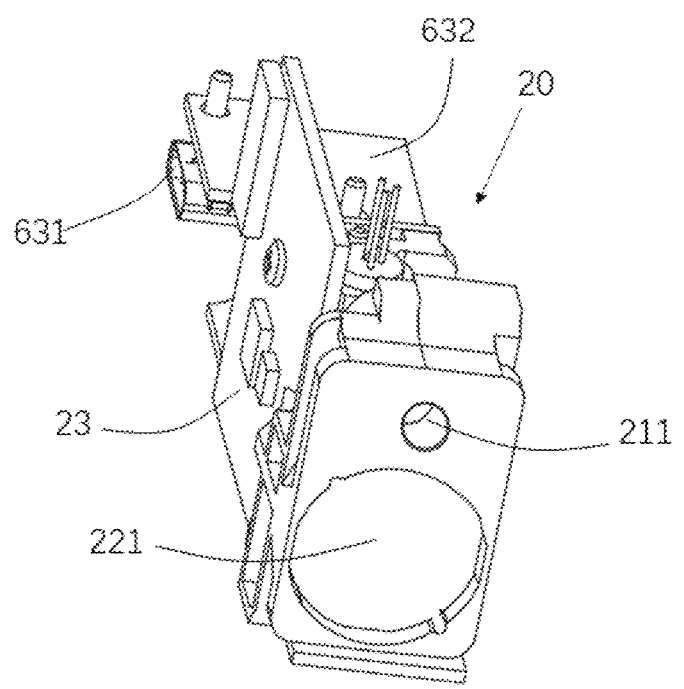
FIG. 27 is a schematic structural view of a laser module according to Embodiment 6 of the present invention.

As shown in FIGS. 23 and 26, the distance measuring device of Embodiment 6 includes the housing 610, which defines an accommodating space 611 therein. The laser ranging device 2 and the third tapeline structure 620 are arranged in the accommodating space 611. As shown in FIGS. 26 and 27, the laser ranging device 2 includes a laser generating means 21, a photoelectric conversion means 22, a circuit board 23, a display means 24, an operating means 25 and a power supply. The laser ranging device 2 may be implemented as the same as that of Embodiment 1. In some implementations, the power supply is integrated in a laser module 20 made up of the laser generating means 21 and the photoelectric conversion means 22. The power supply may be implemented as a rechargeable battery 632. The laser module 20 is provided with a charging port 631, which may be chosen as a USB or type-C charging port. In some implementations, wireless charging may be provided, for example, using an induction coil.

Figure 28:
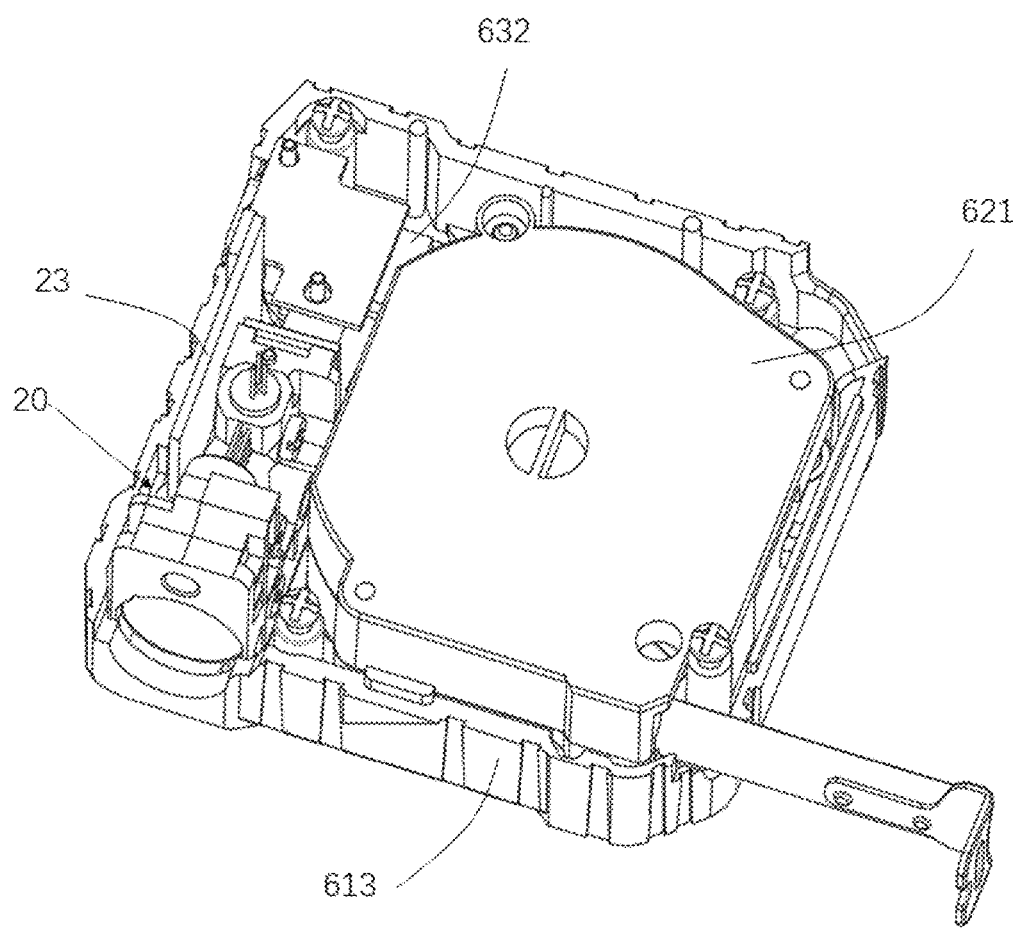
FIG. 28 is a schematic structural view of the interior of the distance measuring device according to Embodiment 6 of the present invention.
Figure 29:
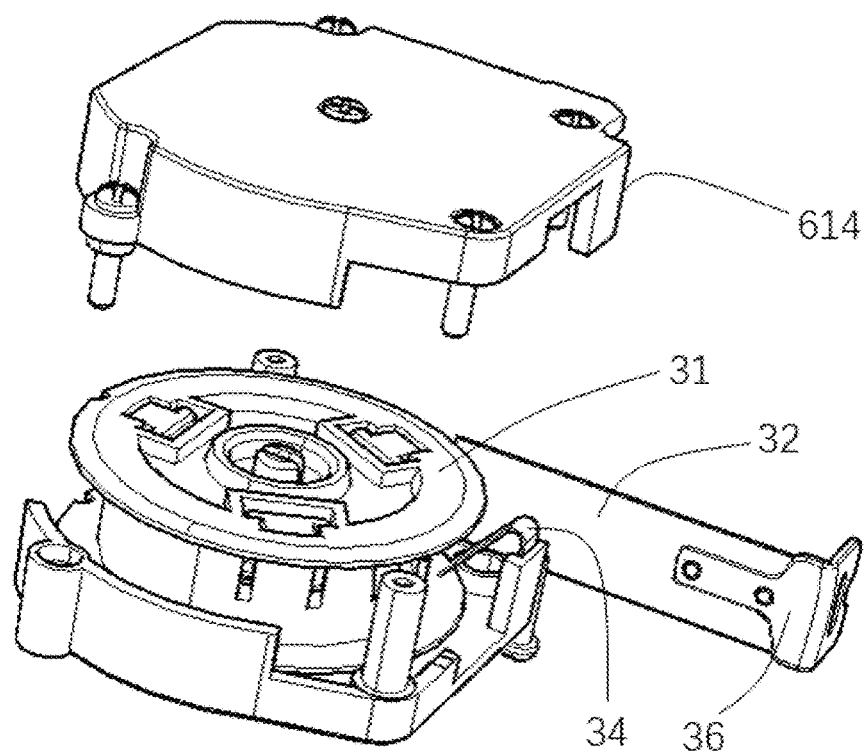
FIG. 29 is an exploded schematic view of a tapeline structure according to Embodiment 6 of the present invention.

The third tapeline structures 620 includes the features of those of Embodiments 2 to 5, except that, in each of the tapeline structures of Embodiments 2 to 5, the various components are separately mounted in the shell 1 or 4, while in Embodiment 6, as shown in FIGS. 28 and 29, the third tapeline structure 620 is integrated in a tapeline casing 621, and they are together assembled as a whole in the accommodating space 611 in the housing 610. As shown in FIGS. 23 and 29, the third tapeline structure 620 includes a tapeline wheel 31, a tape 32, a pressure piece 34 and a locking key 35. The tapeline wheel 31 is disposed in the tapeline casing 621, and the tape 32 is entirely or partially wound on the tapeline wheel 31. One end of the tape 32 is fixedly connected to the tapeline wheel 31, and the other end defines a tape end portion 36. The tapeline casing 621 is provided therein with a first tape outlet 614, and the housing 610 is provided therein with a second tape outlet 615. The tape end portion 36 extends out of the tapeline casing 621 through the first tape outlet 614, and extends out of the housing 610 through the second tape outlet 615. The locking key 35 is provided on an outer surface of the housing 610 and used to control the pressure piece 34 to press or release the tape 32. In some implementations, the locking key 35 is provided around the pressure piece 34, as in the tapeline structures of Embodiments 2 to 4. In some implementations, the locking key 35 is provided at a location of the housing 610 in opposition to the pressure piece 34. The locking key 35 is connected to the pressure piece 34 through a transmission mechanism. When the locking key 35 is pressed down, the motion is transmitted to the transmission mechanism, causing the transmission mechanism to actuate the pressure piece 34 to press or release the tape 32.

The third tapeline structure 620 is mounted within the housing 610, and the laser ranging device 2 is disposed in a space delimited between an edge of the third tapeline structure 610 and an inner side of the housing 610. This can maximize reasonable spatial utilization of the housing 610 and reduce the overall size of the distance measuring device. In some implementations, as shown in FIG. 28, the laser module 20 of the laser ranging device 2 is provided at a radial edge location of the third tapeline structure 620 (in a radial direction of the tapeline wheel 31), and in the outer surface of the housing 610, there are provided a laser beam emitting port 17 aligned with a light emitting surface 211 of the laser generating means 21, a light receiving hole 18 aligned with a light receiving surface 221 of the photoelectric conversion means 22 and a first through hole 616 matching the charging port 631 (see FIG. 25). The display means 24 and the operating means 25 are provided on an axial end face of the third tapeline structure 620 (in an axial direction of the tapeline wheel 31), and a second through hole and a third through hole are provided in a side wall of the housing 610 opposing the display means. The second through hole is aligned with the display means 24, and the third through hole is aligned with the operating means 25. This can facilitate a user's viewing of the display means and operation. Preferably, a transparent protective plate for protecting the display means 24 is disposed over the second through hole. The operating means 25 is implemented as a press button passing through the third through hole.

Referring to FIG. 26, at least one locating post 617 is provided in the housing 610. The locating post 617 may extend through the tapeline casing 621 of the third tapeline structure 620. This enables rapid location of the third tapeline structure 620 during its mounting, followed by fixing the third tapeline structure 620 in the housing 610 using fasteners.

In some implementations, referring to FIG. 26, the housing 610 includes a first housing portion 612 and a second housing portion 613. When joined together, the first housing portion 612 and the second housing portion 61 make up the housing 610 defining the accommodating space 611. The first housing portion 612 and the second housing portion 613 may be joined together using fasteners along an axial direction of the third tapeline structure 620, or along a radial direction of the third tapeline structure 620.

In this embodiment, since the tapeline structure is mounted in the housing 610 as a whole, it may be prefabricated and then assembled with the distance measuring device, resulting in increased assembly efficiency of the distance measuring device. Through arranging the laser ranging device and the third tapeline structure in the housing in a reasonable manner, the distance measuring device is capable of both long distance ranging and short distance ranging and can be conveniently carried and easily operated and used in work by the user.

Embodiment 7

As shown in FIGS. 30 to 33, Embodiment 7 provides a distance measuring device with both laser ranging and tapeline-based distance measuring functions, in which a laser ranging device 2 and a fourth tapeline structure 720 are mounted within a single housing.

Figure 30:
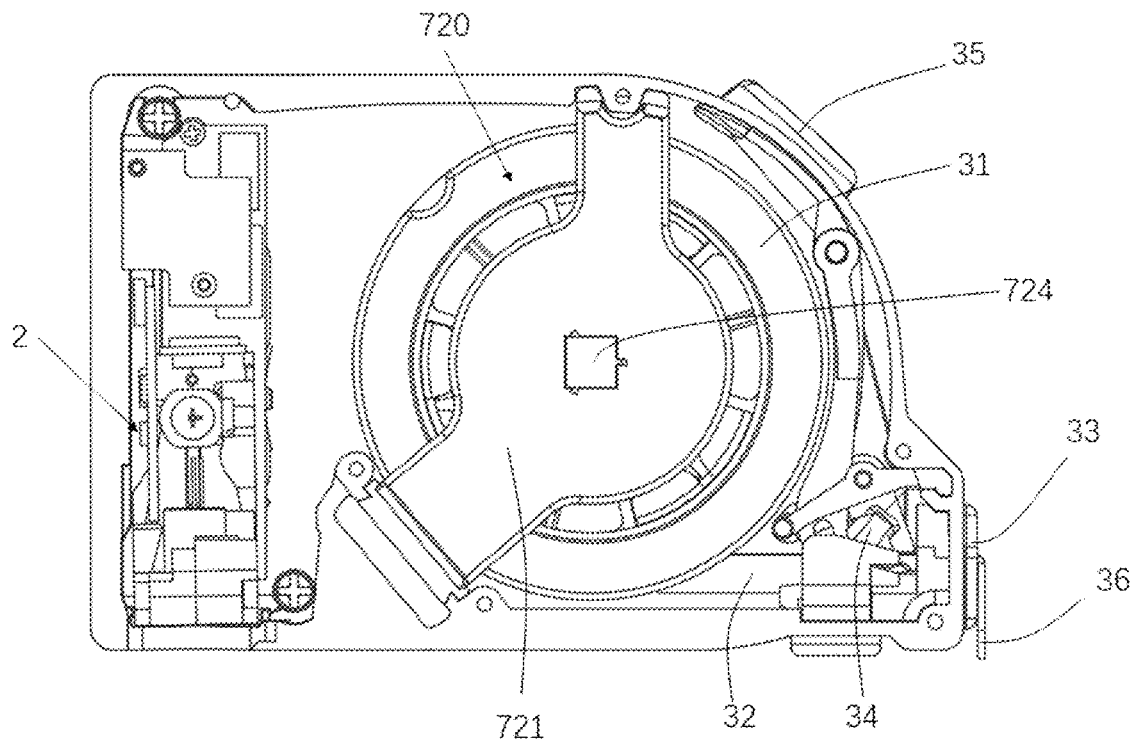
FIG. 30 is a schematic view of the interior of a distance measuring device according to Embodiment 7 of the present invention.

As shown in FIG. 30, the fourth tapeline structure 720 is substantially the same as the tapeline structures of Embodiments 2 to 4 and also includes a tapeline wheel 31, a tape 32, a tape outlet 33, a pressure piece 34 and a locking key 35. The tapeline wheel 31 is disposed in the housing, and the tape 32 is entirely or partially wound on the tapeline wheel 31. One end of the tape 32 is fixedly connected to tapeline wheel 31, and the other end defines a tape end portion 36. The tape outlet 33 is provided in a lower portion of an outer side wall of the housing, and the tape end portion 36 extends out of the housing through the tape outlet 33. The pressure piece 34 is disposed in the housing in the vicinity of the tape outlet 33. When the tape 32 is pulled out of the housing, the pressure piece 34 can be used to press the tape 32 so that the length of the tape 32 outside the housing is kept constant. The locking key 35 is provided on an outer surface of the housing in order to control the pressure piece 34 to press or release the tape 33.

Figure 31:
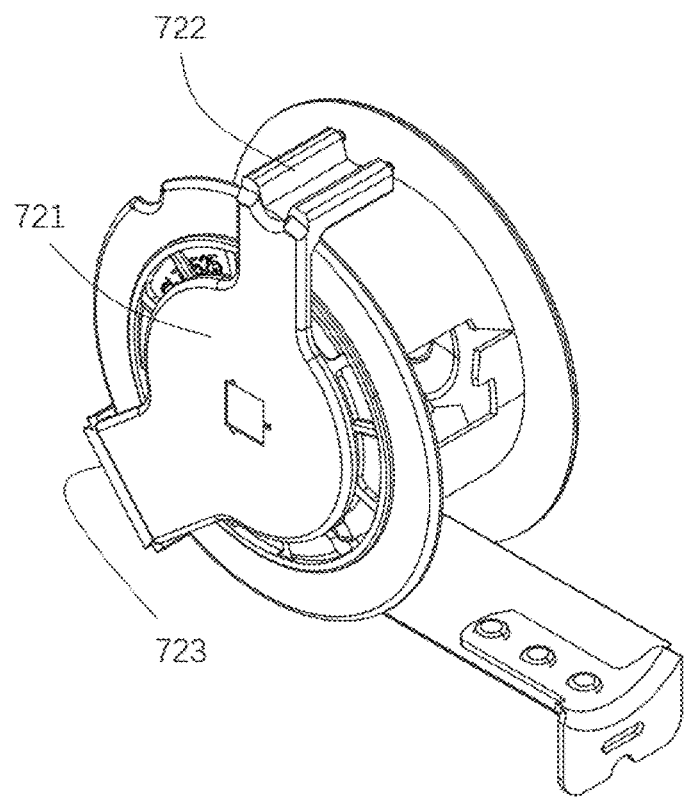
FIG. 31 is a schematic structural view of a tapeline structure according to Embodiment 7 of the present invention.
Figure 32:
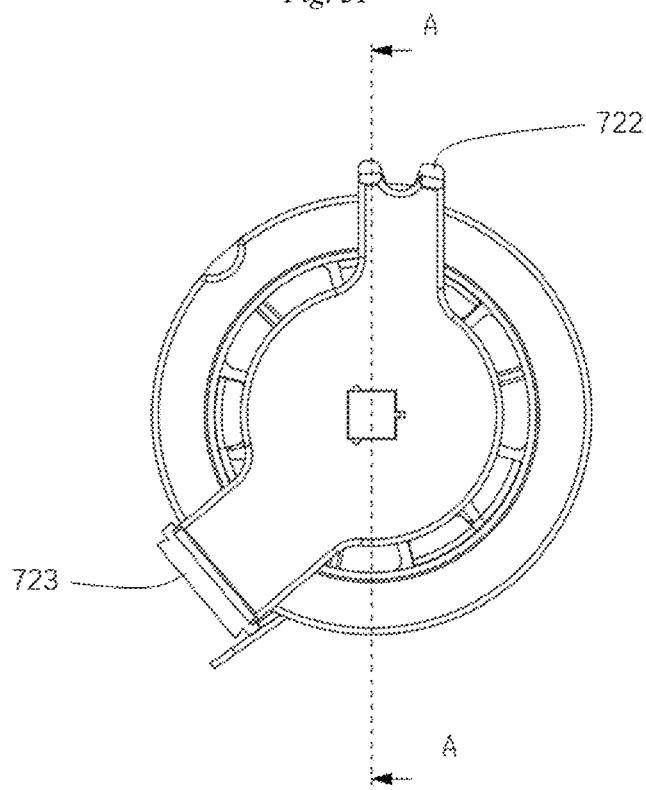
FIG. 32 is a front view of the tapeline structure according to Embodiment 7 of the present invention.
Figure 33:
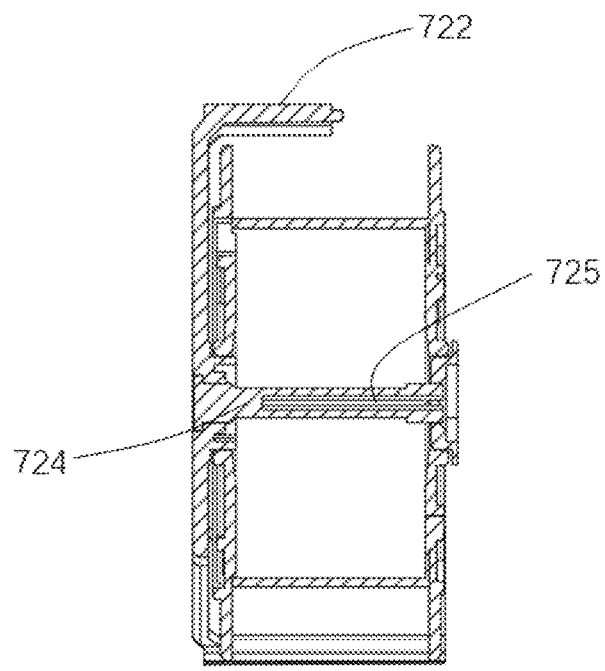
FIG. 33 is a schematic cross-sectional view of the tapeline structure according to Embodiment 7 of the present invention.

Referring to FIGS. 30 and 31, Embodiment 7 differs from Embodiments 2 to 4 in that the fourth tapeline structure 720 further includes a locating member 721. A rotating shaft 724 of the tapeline wheel 31 is connected to the locating member 721, and the locating member 721 further includes at least one locating portion arranged at a circular circumferential edge of the tapeline wheel 31. The locating member 721 is fixed in the housing, and the tapeline wheel 31 is connected to the locating member 721 so that the tapeline wheel 31 is rotatably fixed in the housing. In some implementations, the locating member 721 includes a first locating portion 722 and a second locating portion 723. A line connecting the first locating portion 722 and the rotating shaft 724 forms an angle of greater than 90° with a line connecting the second locating portion 723 and the rotating shaft 724. In some implementations, as shown in FIGS. 32 and 33, the locating member 721 is provided thereon with a raised engagement portion 724, which is inserted into the rotating shaft 725 of the tapeline wheel 31, thereby coupling the locating member 721 to the tapeline wheel 31. The locating member 721 enables rapid assembly of the fourth tapeline structure 720.

The laser ranging device 2 may be disposed at a radial edge location of the fourth tapeline structure 720, as in Embodiment 6. Reference can be made to the description of Embodiment 6 for more structural details. It would be appreciated that Embodiments 2 to 4 may alternatively adopt the tapeline structure arrangement of this embodiment.

Embodiment 8

Figure 34:
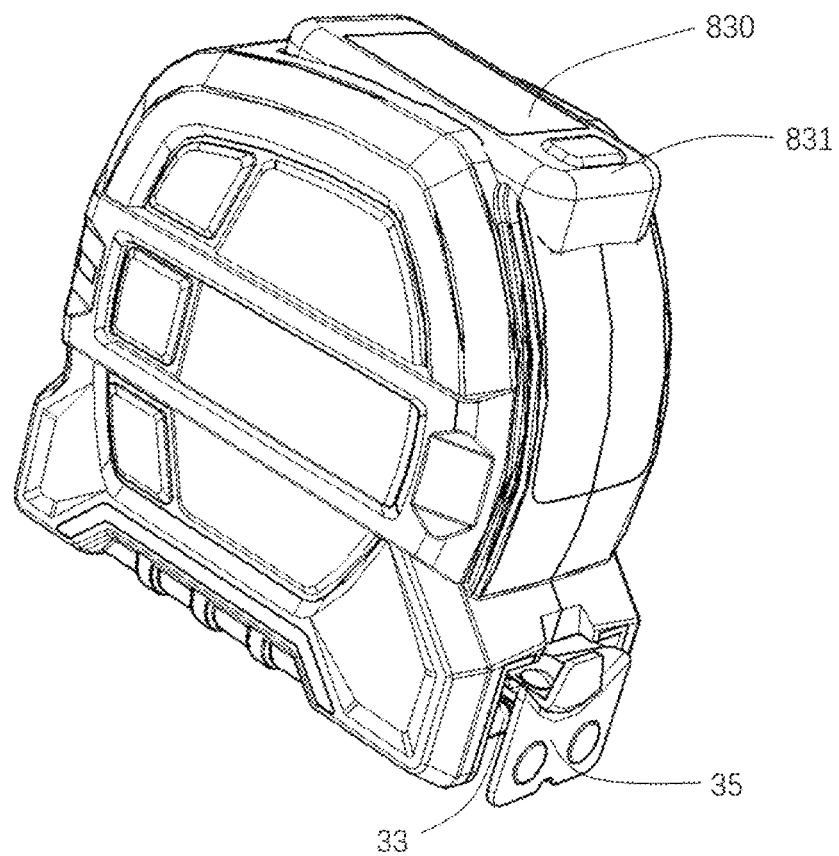
FIG. 34 is a schematic structural view of a distance measuring device according to Embodiment 8 of the present invention.
Figure 35:
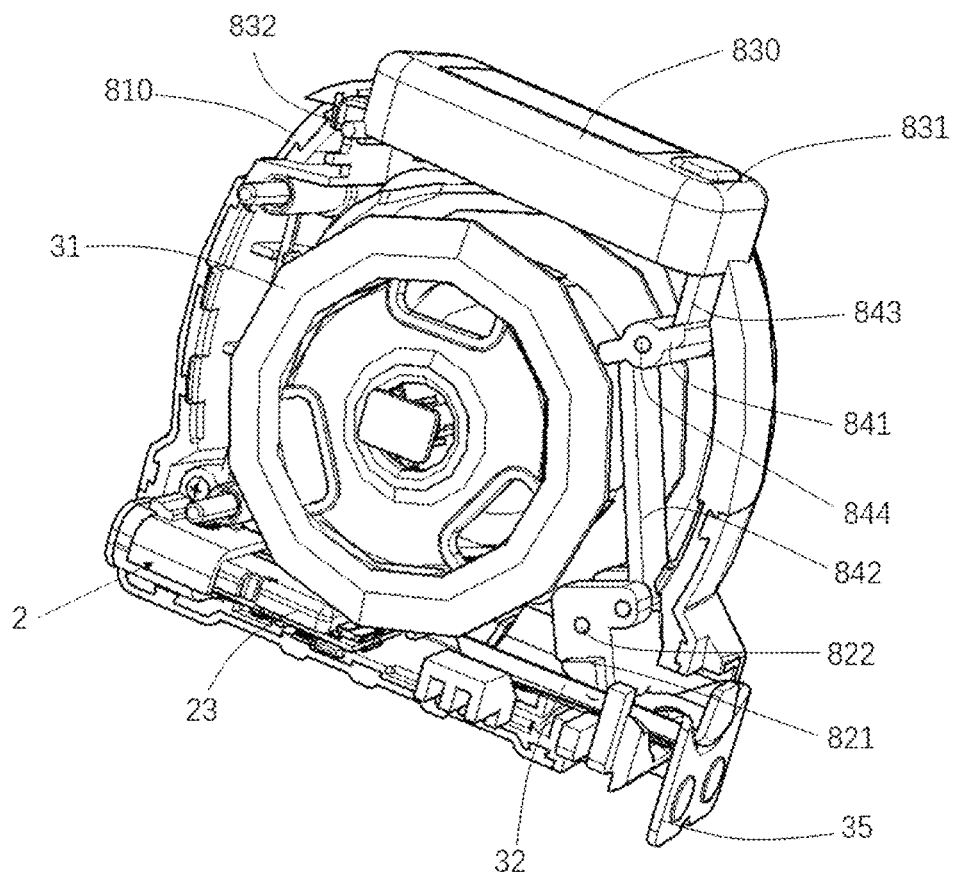
FIG. 35 is a schematic structural view of the interior of the distance measuring device according to Embodiment 8 of the present invention.
Figure 36:
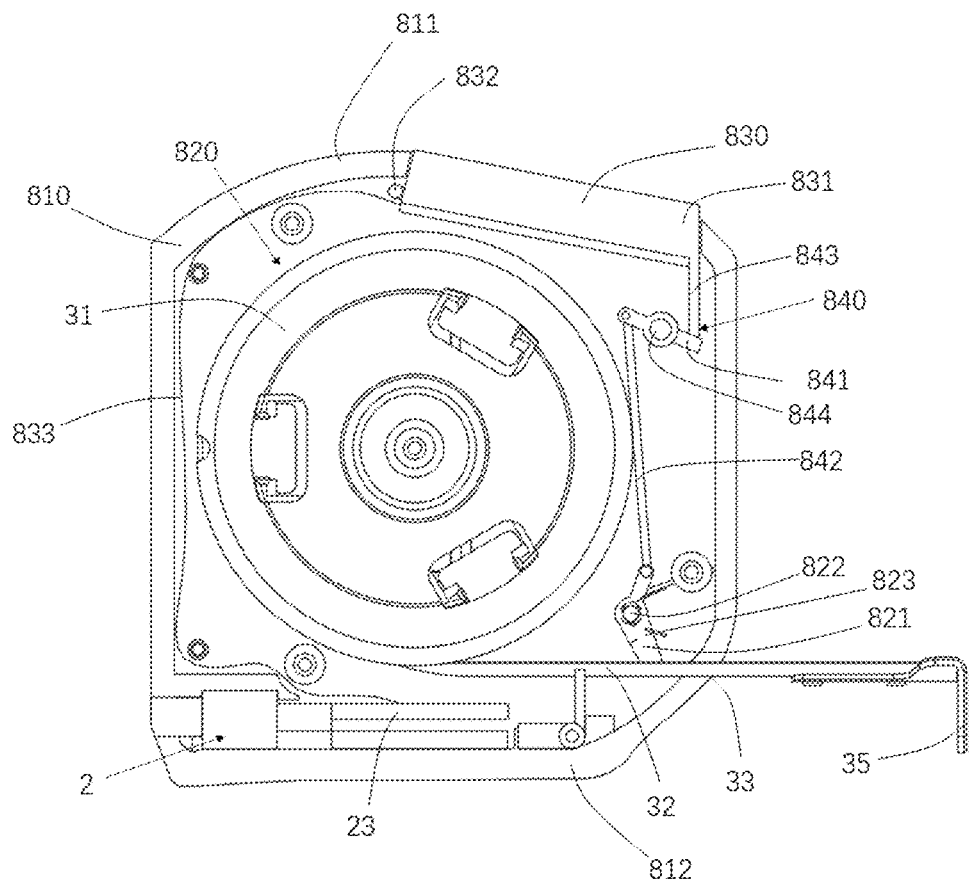
FIG. 36 is a schematic structural plan view of the interior of the distance measuring device according to Embodiment 8 of the present invention.

As shown in FIGS. 34 to 36, Embodiment 8 provides a distance measuring device with both laser ranging and tapeline-based distance measuring functions, in which a laser ranging device 2 and a fifth tapeline structure 820 are mounted within a single housing 810. In this embodiment, a display means 830 can also serve as a locking key of the tapeline structure.

As shown in FIGS. 35 and 36, the distance measuring device includes a fifth tapeline structure 820 and a laser ranging device 2, both mounted in the housing 810. The fifth tapeline structure 820 includes a tapeline wheel 31, a tape 32, a tape outlet 33 and a pressure piece 821. The tapeline wheel 31 is rotatably disposed in the housing 820, and the tape 32 is entirely or partially wound on the tapeline wheel 31. One end of the tape 32 is fixedly connected to tapeline wheel 31, and the other end defines a tape end portion 35. The tape outlet 33 is provided in an outer side wall of the housing 810, and the tape end portion 35 extends out of the housing 810 through the tape outlet 33. The pressure piece 821 is disposed in the housing 810 in the vicinity of the tape outlet 33. When the tape 32 is pulled out of the housing 810, the pressure piece 821 can be used to press the tape 32 so that the length of the tape 32 outside the housing 810 is kept constant. The display means 830 is disposed on the outer side wall of the housing 810. One end of the display means serve as a push end 831, which is coupled to the pressure piece 821 through a transmission mechanism 840. When the push end 831 is pressed down, the pressure piece 821 will be driven to move to cause the pressure piece 821 to unlock the tape 32. That is, the pressure piece 821 does not press the tape 32 any longer, and the tape 32 can therefore be stowed.

Another end of the display means 830 opposing the push end 831 is pivotably coupled to the housing 810 through a first rotating shaft 832. When the push end 831 is pressed, the display means 830 can pivot about the first rotating shaft 832 relative to the housing 810. The push end 831 is connected to the pressure piece 821 through the transmission mechanism 840.

In some implementations, the location of the display means 830 on the housing 810 opposes that of the tape outlet 33. That is, the display means 830 is located on a first side wall 811 of the housing 810 which extends along a radial direction of the tapeline wheel 31, and the tape outlet 33 is located on a second side wall 812 opposing the first side wall 811. The transmission mechanism 840 includes a first rotating element 841 and a connecting rod 842. The first rotating element 841 is fixedly connected at one end thereof to the push end 831 so as to be movable therewith. Preferably, an extension 843 is provided at the push end 831 such as to extend from the push end 831 to the first rotating element 841, thereby connecting the first rotating element 841 to the push end 831. The other end of the first rotating element 841 is hinged to one end of the connecting rod 842. A middle portion of the first rotating element 841 is rotatably connected to the housing 810 through a second rotating shaft 844. The other end of the connecting rod 842 is coupled to the pressure piece 821. When pressed, the push end 831 actuates the first rotating element 841. As a result, one end of the first rotating element 841 rotates, and the other end of the first rotating element 841 rotates in the opposite direction, thus pulling the connecting rod 842. Thus, the pressure piece 821 is caused to move away from and thus unlock the tape 32.

In some implementations, a middle portion of the pressure piece 821 is movably connected to the housing 810 through a third rotating shaft 822. One end of the pressure piece 821 is hinged to the connecting rod 842, and the other end may be brought into contact with the tape 32. When pulled by the connecting rod 842 at one end, the pressure piece 821 pivots about the third rotating shaft 822 so that the other end thereof moves away from and unlocks the tape 32. In some implementations, a resilient element 823 is disposed within the housing in order to apply a resilient force to the pressure piece 821, which biases the pressure piece 821 in a direction allowing it to lock the tape 32. After the push end 831 is not pressed any longer, the external force exerted by the connecting rod 842 on the pressure piece 821 disappears, and the pressure piece 821 then returns, under the action of the resilient element 823, to the position where it locks the tape 32. Preferably, the resilient element 823 is a torsion spring disposed over the third rotating shaft 822. It would be appreciated that another resilient element such as a tension spring, a compression spring, a resilient tab or the like may be alternatively used.

In this embodiment, under normal circumstances, the pressure piece 821 locks the tape under the action of the resilient element 823. In this way, self-locking is provided. Unlocking can be achieved by pressing the push end 831. Moreover, the display means 830 serves as a push component for unlocking the tape. That is, the push component and the display means 830 are integrated as a single piece, resulting in a reduction in the number of components.

The laser ranging device 2 may be arranged in the housing 810 in a reasonable way, as actually needed. For example, it may be arranged in the same manner as in any of Embodiments 2 to 4 and Embodiments 6 to 7. However, it is to be noted that the display means 830 is arranged according to this embodiment. A transmission line 833 for signal communication is provided between the display means 830 and a circuit board 23. For example, as shown, a laser module in the laser ranging device 2 is disposed at a radial edge location of the fifth tapeline structure 820, preferably on the same side as the tape outlet 33 and on the opposite side to the display means 830. The transmission line 833 is disposed between the display means 830 and the laser module to connect the circuit board 23 in the laser ranging device 2 to the display means 830.

Embodiment 9

In Embodiments 2 to 4 and 6 to 8, the laser ranging device and the tapeline structure are arranged within a single housing. In Embodiment 5, the laser ranging device and the tapeline structure are arranged in separate housings, which are then joined together. As shown in FIGS. 37 to 40, in this embodiment, a laser ranging device and a tapeline structure are disposed in separate housings, which are joined together, however, in a different manner from that of Embodiment 5.

Figure 37:
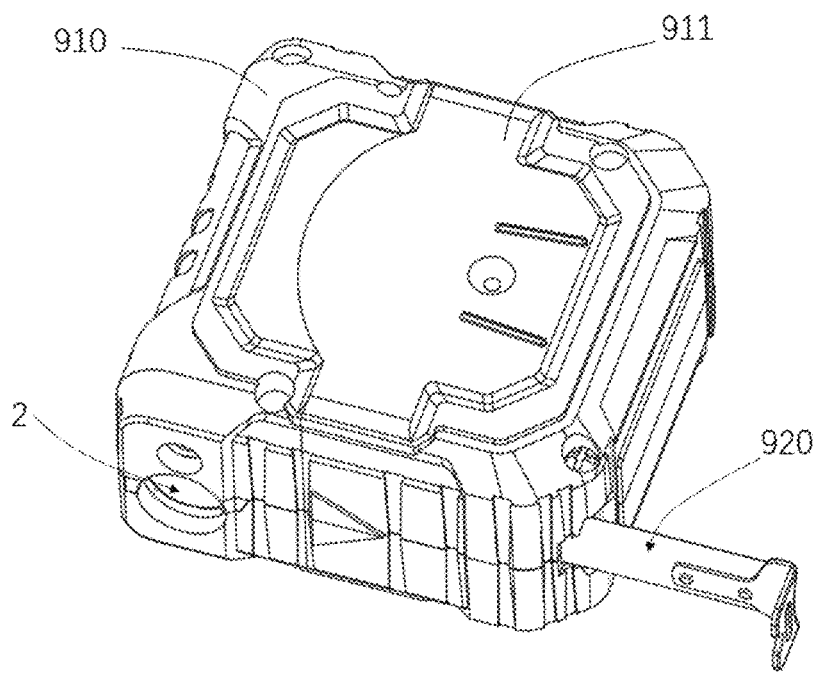
FIG. 37 is a schematic structural view of a distance measuring device according to Embodiment 9 of the present invention.

As shown in FIG. 37, the laser ranging device 2 is provided in a first housing 910, and the sixth tapeline structure 920 in a second housing 911. The laser ranging device 2 is implemented in the same way as in Embodiment 1 or 6, and the sixth tapeline structure 920 may be implemented as the tapeline structure in any of Embodiments 2 to 8. Therefore, further description thereof is omitted here.

The first housing 910 and the second housing 911 are detachably joined together into a single assembly by a connecting structure 930. Moreover, the first housing 910 and the second housing 911 may be separated as actually needed, allowing the laser ranging device or the tapeline structure to be used individually.

Figure 38:
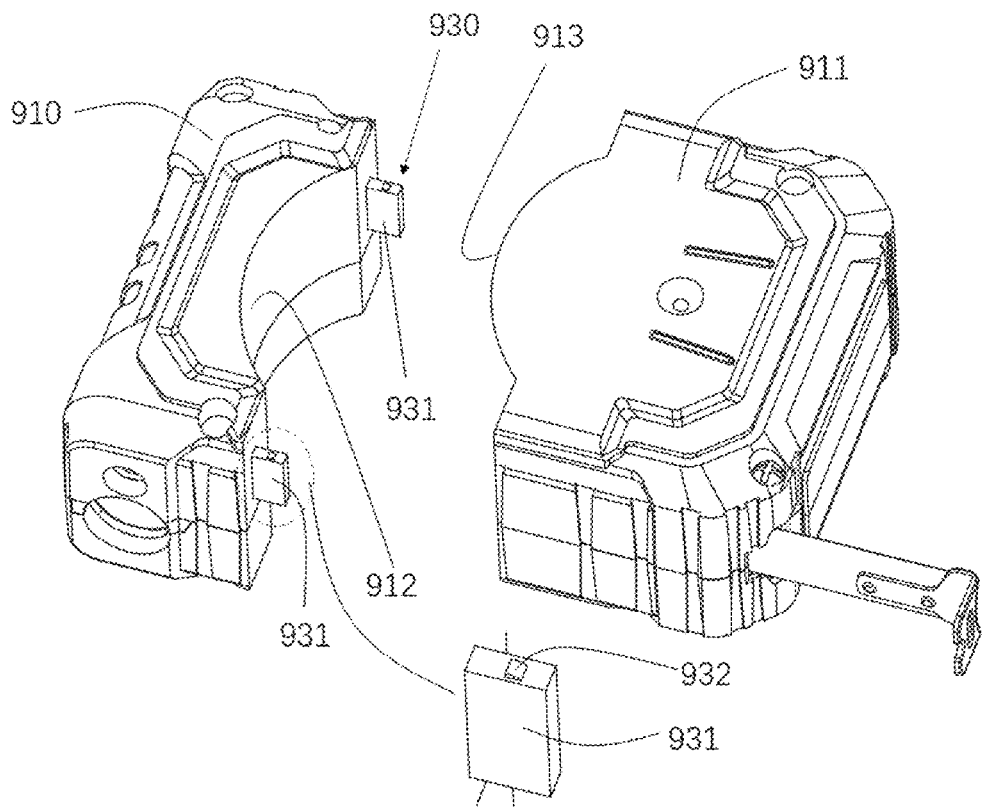
FIG. 38 is an exploded schematic view of the distance measuring device according to Embodiment 9 of the present invention, showing an arcuate recessed portion and an arcuate raised portion.

In some implementations, as shown in FIG. 38, the second housing 911 has an arcuate raised portion 913 on its side facing the first housing 910. A radius of the arcuate raised portion 913 matches a radius of a tapeline wheel 31 in the second housing 911. The first housing 910 has an arcuate recessed portion 912 on its side facing the second housing 911. The size of the arcuate recessed portion 912 matches that of the arcuate raised portion 913. When the first housing 910 is joined to the second housing 911, the arcuate raised portion 913 snugly fits in the arcuate recessed portion 912. In some implementations, the connecting structure 930 includes a connecting protrusion 931 projecting from the first housing 910 toward the second housing 911 and a connecting recess recessed downwardly from an outer surface of the second housing 911. The first housing 910 and the second housing 911 can be joined together by inserting the connecting protrusion 931 into the connecting recess. At least one arcuate stud 932 may be provided on a side surface of the connecting protrusion 931, and a hole for mating with the stud 932 may be defined in a side surface of the connecting recess. The stud 932 may be received in and engage with the hole, enhancing connection strength between the connecting protrusion 931 and the connecting recess and making the joint between the first housing 910 and the second housing 911 firmer.

Figure 39:
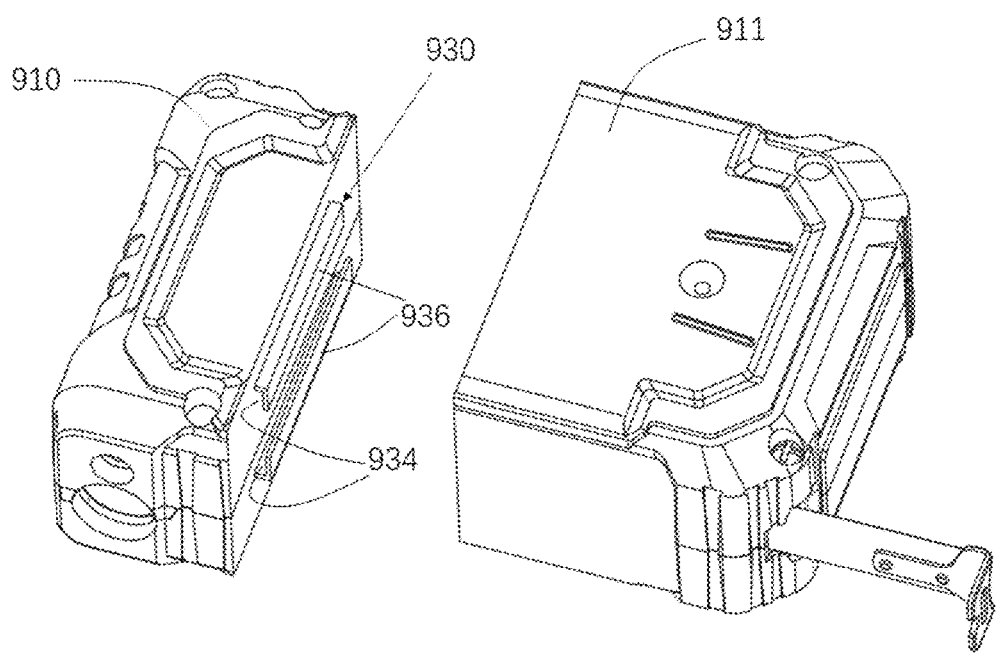
FIG. 39 is an exploded schematic view of the distance measuring device according to Embodiment 9 of the present invention, showing connecting slide channels.
Figure 40:
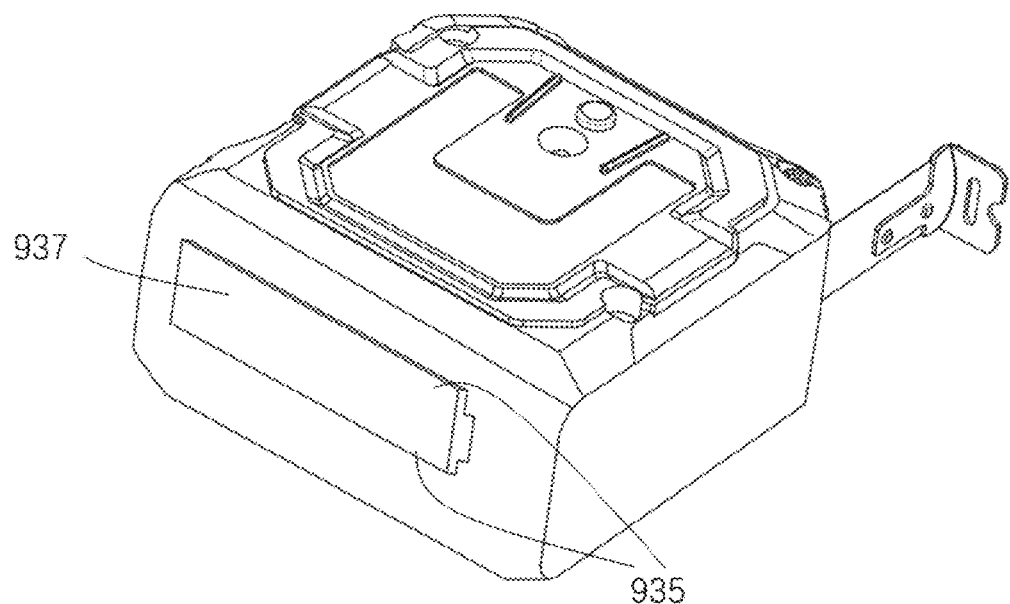
FIG. 40 is a schematic view of a second shell in the distance measuring device according to Embodiment 9 of the present invention, showing fins.

In some implementations, as shown in FIGS. 39 and 40, both the second housing 911 and the first housing 910 have flat joint surfaces. A connecting slide channel 934 is provided on a side surface of the first housing 910 facing the second housing 911, and a fin 935 is provided on a corresponding side surface of the second housing 911. The fin 935 can slide into the connecting slide channel 934, thereby joining the first housing 910 and the second housing 911 together. Specifically, on the side surface of the first housing 910 facing the second housing 911, at least one elongate first connecting sheet 936 is provided so as to define the connecting slide channel 934 together with the side surface of the first housing 910 therebetween. On the corresponding side surface of the second housing 911, a second connecting sheet 937 is provided along a lengthwise direction thereof. The second connecting sheet 937 defines, on at least one side thereof, the fin 936 that can slide into the connecting slide channel 934 from one end thereof. Preferably, two first connecting sheets 936 are provided and placed in opposition to each other to define a pair of connecting slide channels 934, and the second connecting sheet 937 defines fins 936 at both sides, which can slide into the respective connecting slide channels 934.

In this embodiment, the laser ranging device and the tapeline structure can be conveniently assembled together or disassembled from each other. Thus, as actually needed, the laser ranging function and the tapeline function can be performed independently from each other, or the two are assembled to be carried and used together. When the two are secured to each other, the device can be suitably used for both long distance ranging and short distance ranging. The distance measuring device of Embodiment 9 is designed as the two modules: the laser ranging device and the tapeline structure. The modules can be fabricated separately and then assembled together. Such a modular design allows the product to be produced with effectively increased efficiency. In comparison with Embodiment 5, the connecting structure 930 employed in Embodiment 9 enables easier assembly and disassembly.

Embodiment 10

Figure 41:
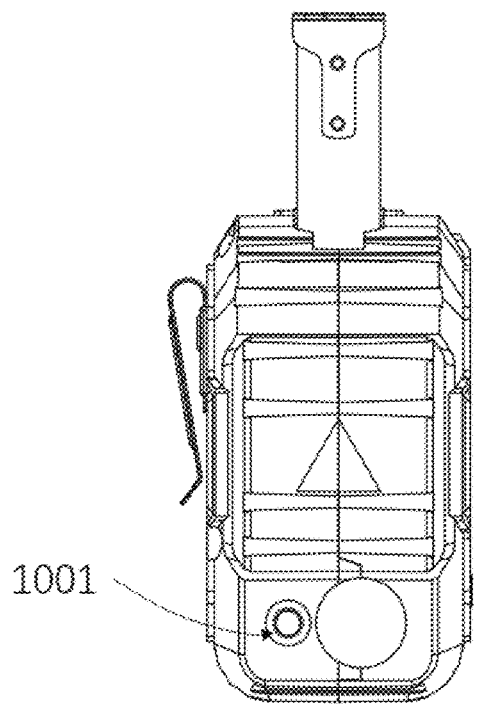
FIG. 41 is a schematic structural view of a distance measuring device according to Embodiment 10 of the present invention, showing a laser ranging device.
Figure 42:
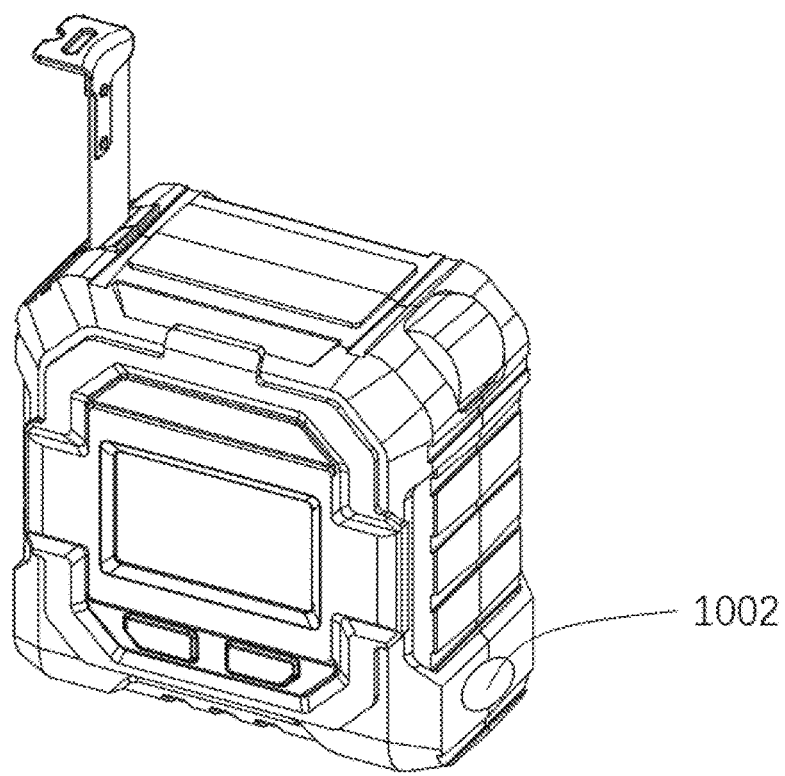
FIG. 42 is a schematic structural view of the distance measuring device according to Embodiment 10 of the present invention viewed from another angle, showing a second device.

In each of the distance measuring devices of Embodiments 1 to 9, the laser ranging device has only the laser ranging function. As shown in FIGS. 41 to 42, Embodiment 10 provides a distance measuring device including a laser ranging device and a tapeline structure, which are joined together. The laser ranging device of Embodiment 10 has the same laser ranging function as that of each of the distance measuring devices of Embodiments 1 to 9. In addition, it has a second function, which may be a cross projection function, a line projection function or the like. As the laser ranging function is implemented in the same way as in Embodiments 1 to 9, it needs not be described in further detail here.

As shown in FIGS. 41 and 42, the laser ranging function is provided at one end of a laser module in Embodiment 10. That is, the laser module includes the laser ranging device 1001, which is implemented in the same way as in Embodiments 1 to 9. At the other end of the laser module, there is provided a second device 1002 capable of providing a second function. For example, the second device may be implemented as any one or more of a laser spot projector, a laser line projector or a laser cross projector. In this way, the laser module has multiple functions. It would be appreciated that other functions may also be integrated, such as an infrared temperature measuring function. That is, the second device may be implemented as a temperature measuring device for providing a temperature measuring function. The second device may incorporate other functional modules, as actually needed. These functional modules may be implemented as conventional ones known in the art.

Embodiment 11

Figure 43:
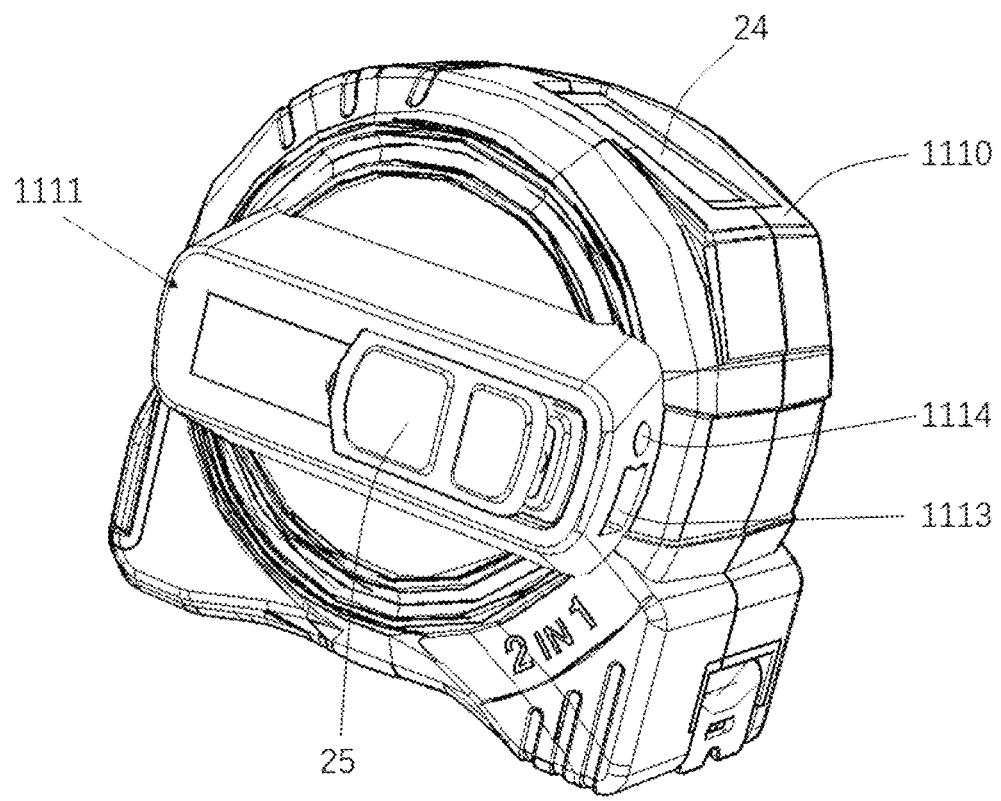
FIG. 43 is a schematic structural view of a distance measuring device according to Embodiment 11 of the present invention.
Figure 44:
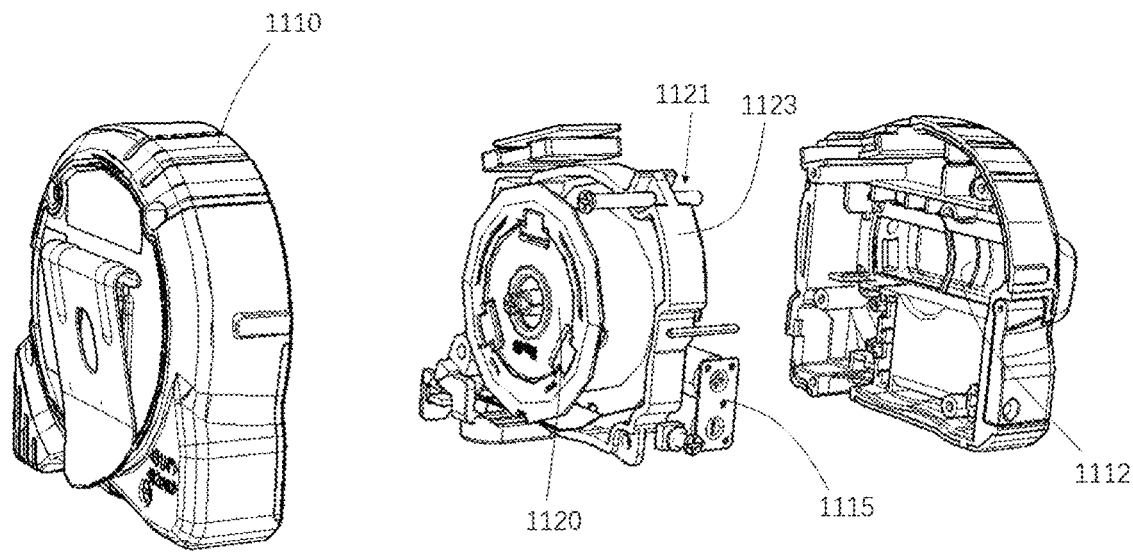
FIG. 44 is an exploded schematic view of FIG. 43.
Figure 45:
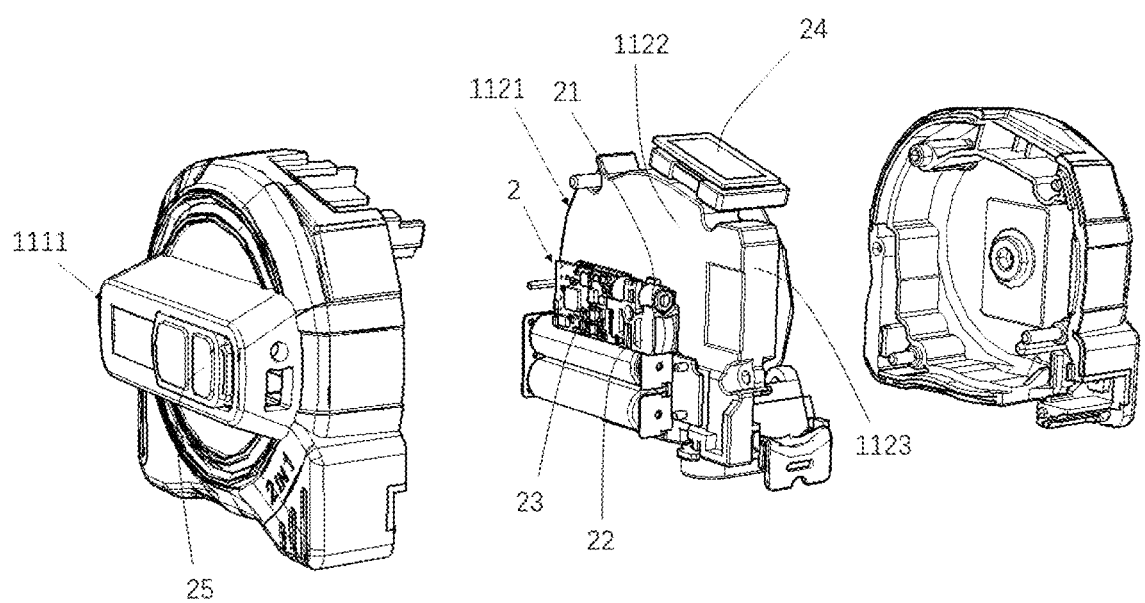
FIG. 45 is a schematic view of FIG. 44 viewed from another angle.

As shown in FIGS. 43 to 45, Embodiment 11 provides a distance measuring device with laser ranging and tapeline-based distance measuring functions, in which a laser ranging device 2 and a seventh tapeline structure 1120 are mounted in a single housing 1110. The seventh tapeline structure 1120 may be structured in the same as in any of Embodiments 2 to 4, 6, 7 and 8, and mounted in the housing 1110 in the same manner as in any of Embodiments 2 to 4, 6, 7 and 8. For example, as in Embodiments 2 to 4, components of the seventh tapeline structure 1120 may be separately mounted in the housing 1110. Alternatively, as in Embodiment 6, the seventh tapeline structure 1120 may be mounted as a whole in the housing 1110. Still alternatively, as in Embodiment 7, it may be mounted in the housing 1110 with the aid of a locating member.

As in any of the preceding embodiments, the laser ranging device 2 includes a laser generating means 21, a photoelectric conversion means 22, a circuit board 23, a display means 24, an operating means 25 and a power supply. However, differing from the foregoing embodiments, the laser generating means 21, the photoelectric conversion means 22 and the circuit board 23 are provided as a single laser module on an axial end face of the seventh tapeline structure 1120, and the power supply is also provided on the axial end face of the seventh tapeline structure 1120 either above or under the laser generating means 21 and the photoelectric conversion means 22. Between the seventh tapeline structure 1120 and the laser module, there is provided a spacer 1121, which separates the seventh tapeline structure 1120 from the laser module. Preferably, the spacer 1121 includes a base portion 1122 and an annular portion 1123 projecting from an edge of the base portion 1122. The annular portion 1123 and the base portion 1122 delimit an accommodating space, in which the seventh tapeline structure 1120 is received. The laser module and the power supply are provided on a side surface of the base portion 1122 facing away from the seventh tapeline structure 1120. The housing 1110 defines, on a side wall thereof facing the laser generating means 21 and the photoelectric conversion means 22, a raised portion 1111 which is raised outwardly and defines a second accommodating space 1112 for holding the laser module. As in the preceding embodiments, a light receiving hole 1113 and a laser beam emitting port 1114 are provided at one end of the raised portion 1111.

The operating means 25 is provided on another side wall of the raised portion 1111. Preferably, the operating means 25 includes a press button, and a press button slot is provided in a side wall of the raised portion 1111 facing away from the housing 1110. The press button passes through the press button slot and is then connected to the circuit board 23.

The display means 24 is provided at a radial edge location of the seventh tapeline structure 1120. Preferably, the display means 24 is supported by the annular portion 1123 of the spacer 1121. A slot for passage of the display means 24 therethrough is provided in a corresponding side wall of the housing 1110.

The power supply may be selected as a cylindrical batter, and a side wall portion of the housing 1110 corresponding to the power supply defines a battery hatch 1115. Through opening the battery hatch 1115, the battery can be replaced rapidly. It would be appreciated that a rechargeable battery may be alternatively used, and accordingly, the battery hatch 1115 may be replaced with a charging port. Alternatively, a battery having a different shape may be used, such as a square battery, a button-shaped battery or the like.

Embodiment 12

With the distance measuring device of each of Embodiments 2 to 11, when using the tapeline structure to measure a distance, the operator has to read a numerical value marked on the tape as a measurement of the distance. In contrast, according to this embodiment, a tapeline structure is provided with a sensing component for obtaining a distance measurement of the tapeline structure and then outputting it to a display means, on which the measurement is then displayed. This can increase measurement accuracy of the tapeline structure. According to this embodiment, the sensing component may be provided on any of the tapeline structures of Embodiments 2 to 11, rather than only on that shown in FIGS. 46 to 49.

How the distance measuring device of this embodiment operates will be described in detail below in the context of the sensing component being provided on the tapeline structure shown in FIGS. 46 to 49 as an example.

Figure 46:
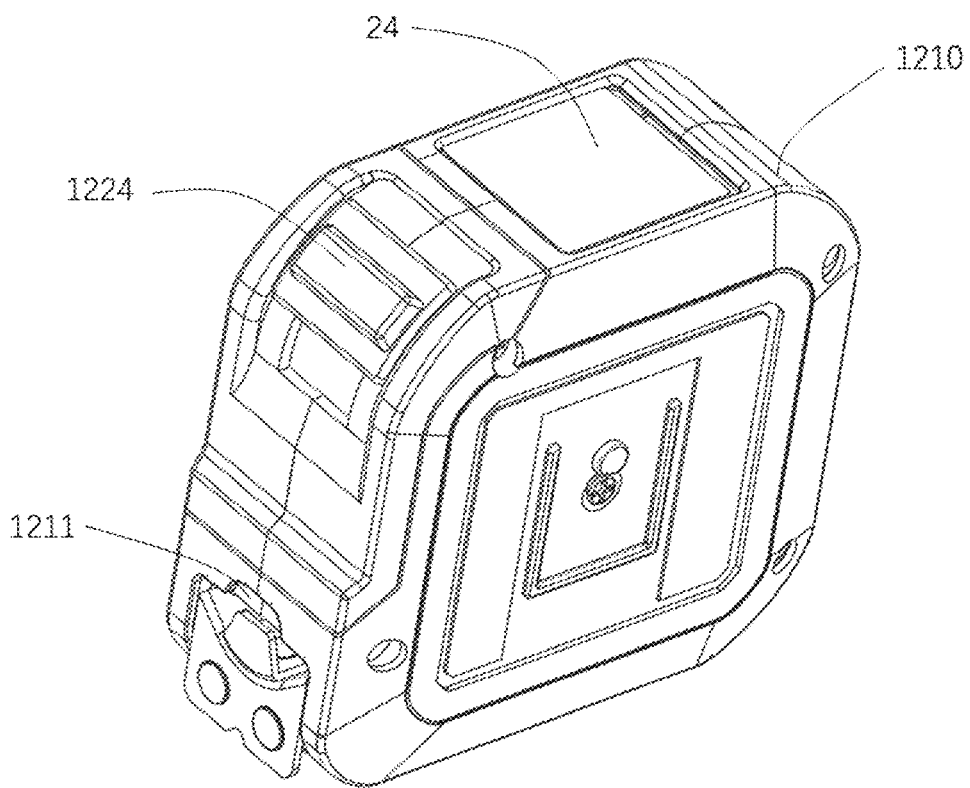
FIG. 46 is a schematic structural view of a distance measuring device according to Embodiment 12 of the present invention.
Figure 47:
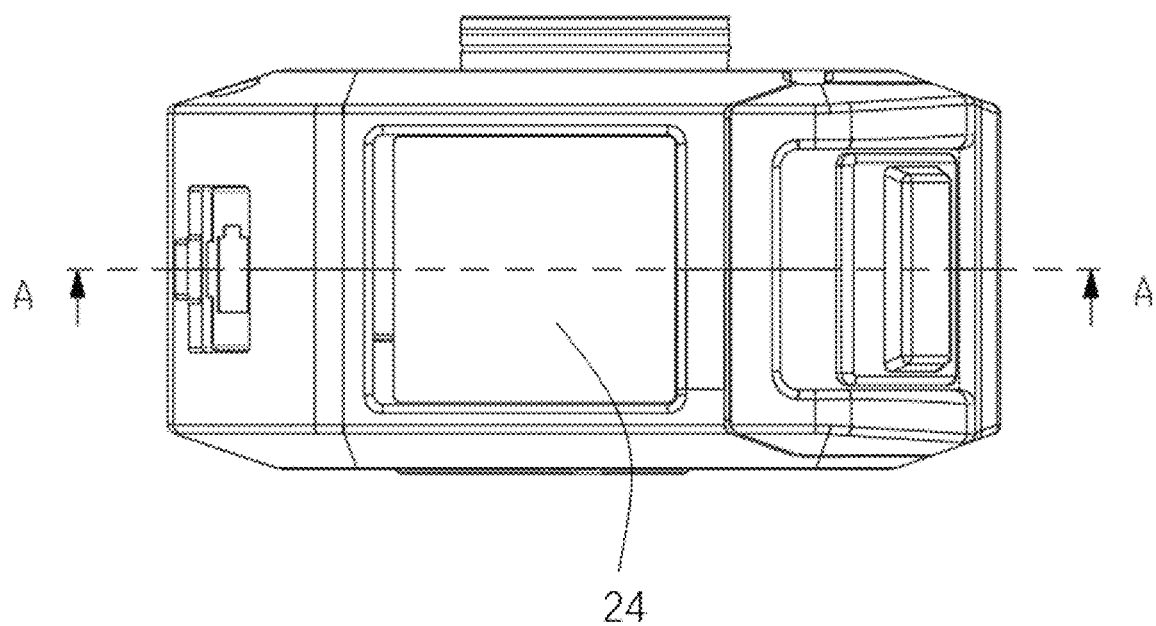
FIG. 47 is a top view of FIG. 46.
Figure 48:
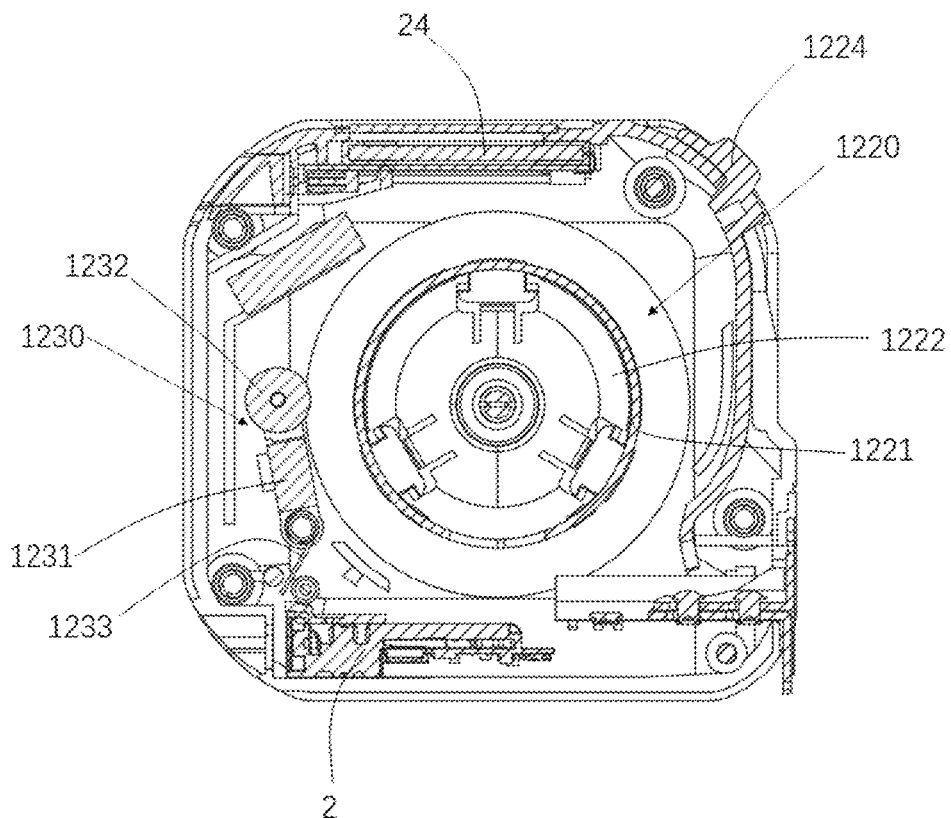
FIG. 48 is a schematic cross-sectional view of FIG. 47 taken along A-A.
Figure 49:
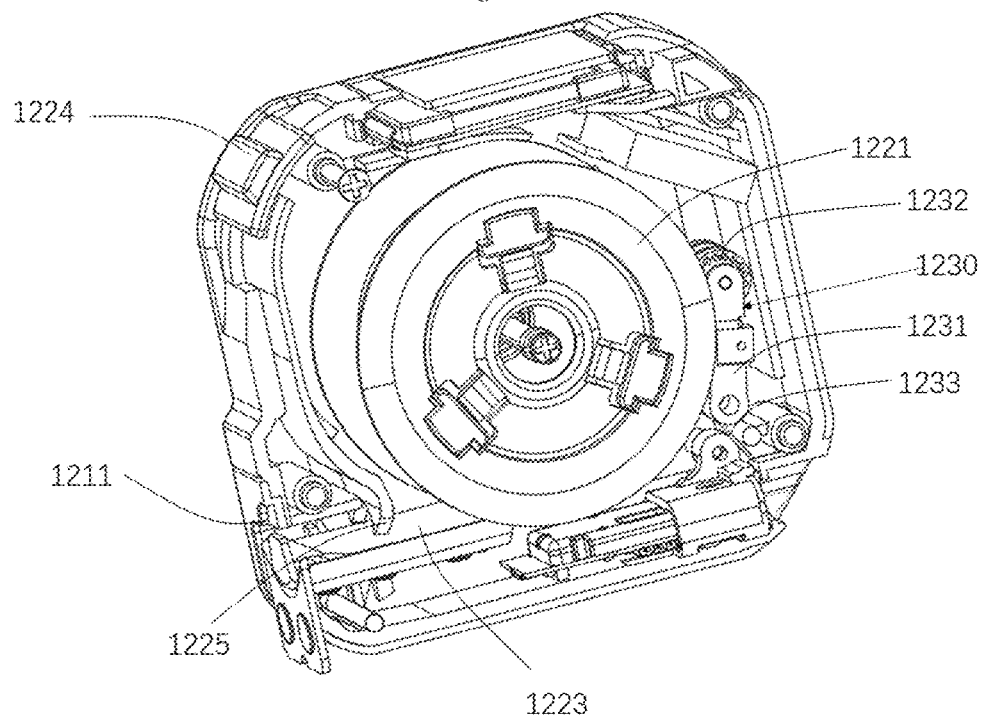
FIG. 49 is a schematic structural view of the interior of Embodiment 12.

As shown in FIGS. 46, 48 and 49, the distance measuring device of this embodiment includes a laser ranging device 2 and the eighth tapeline structure 1220. As shown in FIG. 48, the laser ranging device 2 and the eighth tapeline structure 1220 are mounted in a single housing 1210. The eighth tapeline structure 1220 includes a support frame 1221, on which a tapeline wheel 1222 is disposed. A tape 1223 is entirely or partially wound on tapeline wheel 1222. The laser ranging device 2 is disposed at a radial edge location of the tapeline structure 1220. The housing 1210 is provided with a tape locking button 1224 and a tape exit port 1211. The tape 1223 extends at one end out of the tape exit port 1211, and the tape locking button 1224 is configured to be pressed to lock the tape 1223. The tape locking button 1223 may be arranged at a proper location of the housing 1210. For example, as shown in FIG. 49, the tape locking button 1224 is provided on a side of the housing 1210 opposing the tape exit port 1211 and is connected to a pressure piece 1225. When the tape locking button 1224 is pressed, the pressure piece 1225 is driven to move toward and lock the tape 1223. The sensing component 1230 is provided at a radial edge location of the support frame 1221 and electrically connected to the display means 24. As a result of pulling the tape 1223 out, the tapeline wheel 1221 rotates, and the sensing component 1230 can sense a displacement distance of the tape 1223, from which a length of the tape 1223 that has been pulled out can be derived by calculation as a measurement of the tapeline structure 1220. Preferably, the sensing component 1230 may be chosen as a Hall sensing component. Specifically, the Hall sensing component includes a connecting member 1231 and a roller 1232 for sensing a displacement distance of the tape 1223. The roller 1232 is disposed at one end of the connecting member 1231 so as to be in contact with the tape 1223 wound on the tapeline wheel 1222. The other end of the connecting member 1231 is connected to the housing 1210 by a resilient member 1233. The resilient member 1233 is configured to apply a torque to the connecting member 1231, which biases the roller 1232 toward the tapeline wheel 1222, thereby ensuring that the roller 1231 is always in contact with the tape 1223 wound on the tapeline wheel 1222. As the tape 1223 is being increasingly pulled out, a length of the tape 1223 wound on the tapeline wheel 1222, and hence a diameter of the tapeline wheel 1222, increasingly decreases. At this time, under the action of the resilient member 1233, the roller 1232 is always kept in contact with the tape 1223 wound on the tapeline wheel 1222, so it can accurately sense a displacement distance of the tape 1223, enabling the tapeline structure 1220 to obtain an accurate measurement. Examples of the resilient member 1233 may include, but are not limited to, torsion springs, tension springs, compression springs and resilient tabs. The sensing component 1230 may be arranged at another location where it can be brought into contact with the tape 1223 than that shown in FIG. 49.

It would be appreciated that the sensing device of this embodiment is not limited to being used only in the distance measuring device of FIGS. 46 to 49. Instead, it may also be integrated in the tapeline structure of any of Embodiments 2 to 11.

One or two display means 24 may be provided. In case of two display means, one of the display means is used to display a measurement of the laser ranging device 2 thereon, and the other is used to display a measurement of the tapeline structure 1220 thereon. The two display means may be integrated as a single piece.

In some other implementations, only one display means 24 may be included. This display means 24 displays both a measurement of the laser ranging device 2 and a measurement of the tapeline structure 1220 thereon. Specifically, in case of one display means 24 being used, the distance measuring device may have multiple operating modes.

In a first operating mode, a switch (not shown) of the distance measuring device can be used to switch it between laser ranging and distance measuring by the tapeline structure. When the distance measuring device is switched to laser ranging, a measurement of the tapeline structure is not displayed on the display means 24, and only a laser ranging measurement is displayed thereon. When the distance measuring device is switched to tapeline-based distance measuring, a laser ranging measurement is not displayed on the display means 24, and only a measurement of the tapeline structure is displayed thereon.

In a second operating mode, the distance measuring device may be configured so that, when it is ON or OFF, a measurement of the tapeline 1223 is displayed on the display means 24 in response to the tape 1223 being pulled out. If laser ranging is desired, the switch may be manipulated to switch the device to the laser ranging. As a result, a laser ranging measurement is displayed on the display means 24. When the distance measuring device is low in power, the tapeline structure 1220 can be still used normally for measuring.

Figure 50:
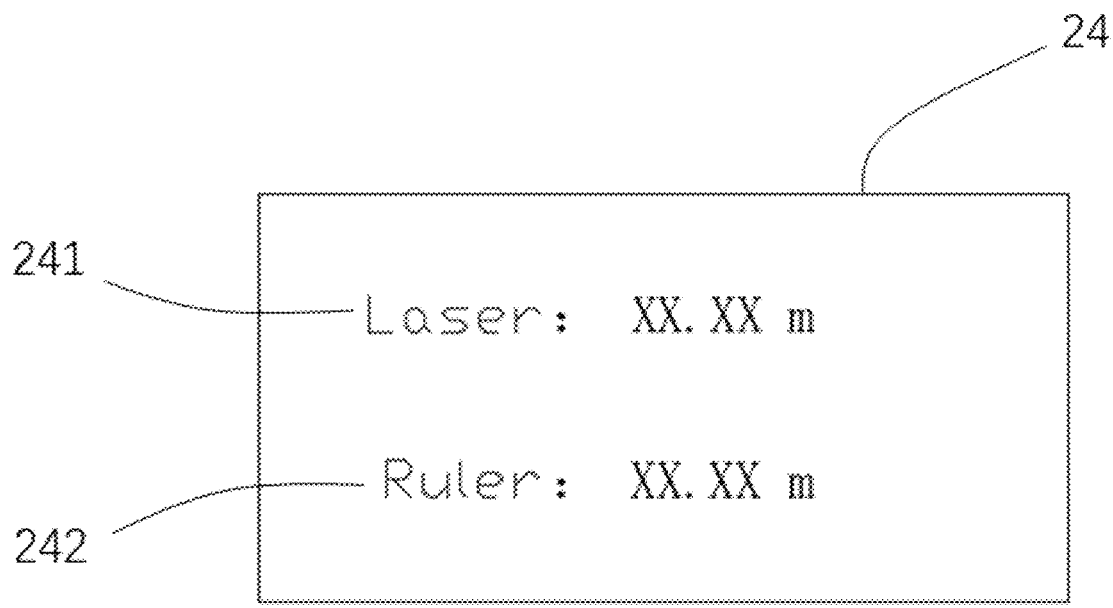
FIG. 50 schematically illustrates measurements displayed on a display means in Embodiment 12.

In a third operating mode, both laser ranging and tapeline-based distance measuring measurements can be displayed on a single display means 24. That is, as shown in FIG. 50, a screen of the display means 24 may be divided into two sections, with the laser ranging measurement 241 being displayed on one section and the tapeline's measurement 242 on the other.

It would be appreciated that, according to this embodiment, operating modes may be configured as actually needed, rather than limited to the above three.

Figure 51:
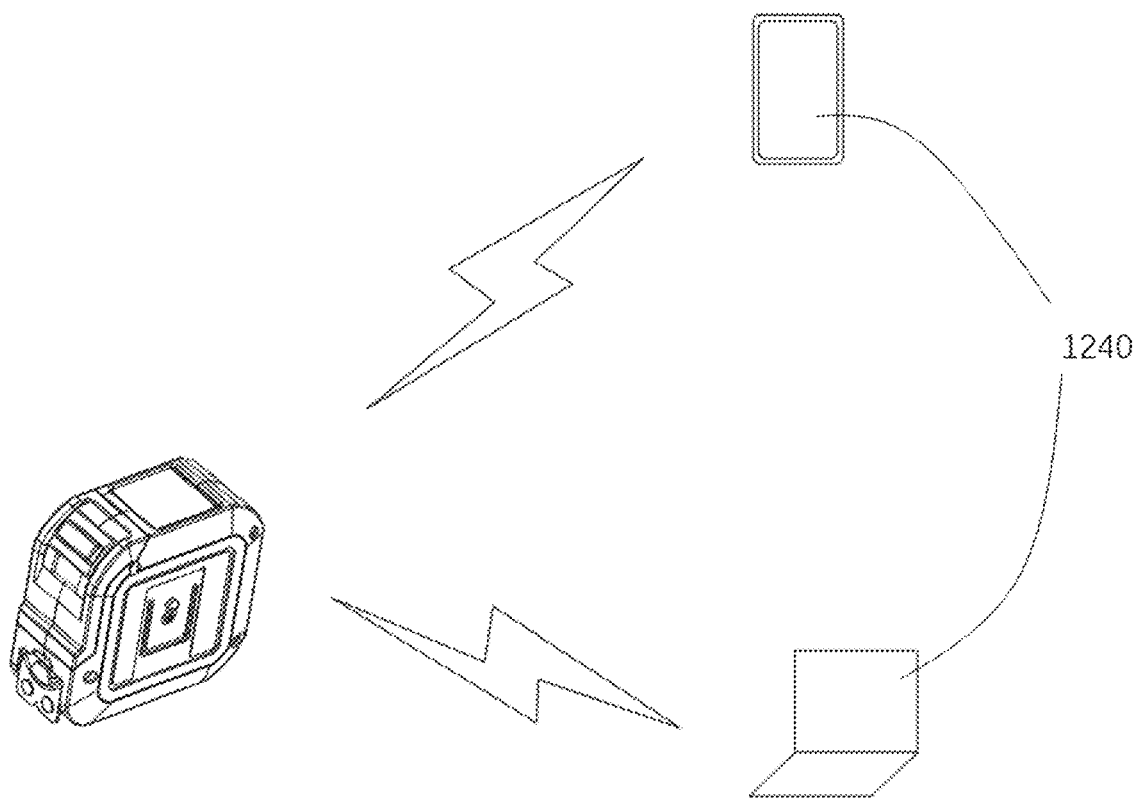
FIG. 51 schematically illustrates communication carried out between the distance measuring device and a terminal in Embodiment 12.

Further, as shown in FIG. 51, the distance measuring device of this embodiment further includes a communication module (not shown), which is able to communicate with a terminal 1240 in a wireless way to transmit measurements of the distance measuring device to the terminal 1240. The measurements may be displayed and stored on the terminal 1240. The terminal 1240 may be implemented as a mobile phone, a computer or another device. For example, a mobile phone running a corresponding application may be used as the terminal, and a Bluetooth connection may be established between the distance measuring device and the mobile phone. Measurements including laser ranging and tapeline-based distance measuring measurements may be displayed on an interface of the application.

Data transmission between the distance measuring device and the terminal may be either conducted in real time or triggered by a press button. That is, a trigger press-button may be provided on the distance measuring device, and data transmission may be carried out between the distance measuring device and the terminal when the trigger press-button is pressed down.

This embodiment not only enables accurate reading of measurements of the tapeline structure, without possible numerical errors that may arise from manual reading, but also allows the measurements to be transmitted to and stored in a terminal for numerical analysis.

Embodiment 13

Figure 52:
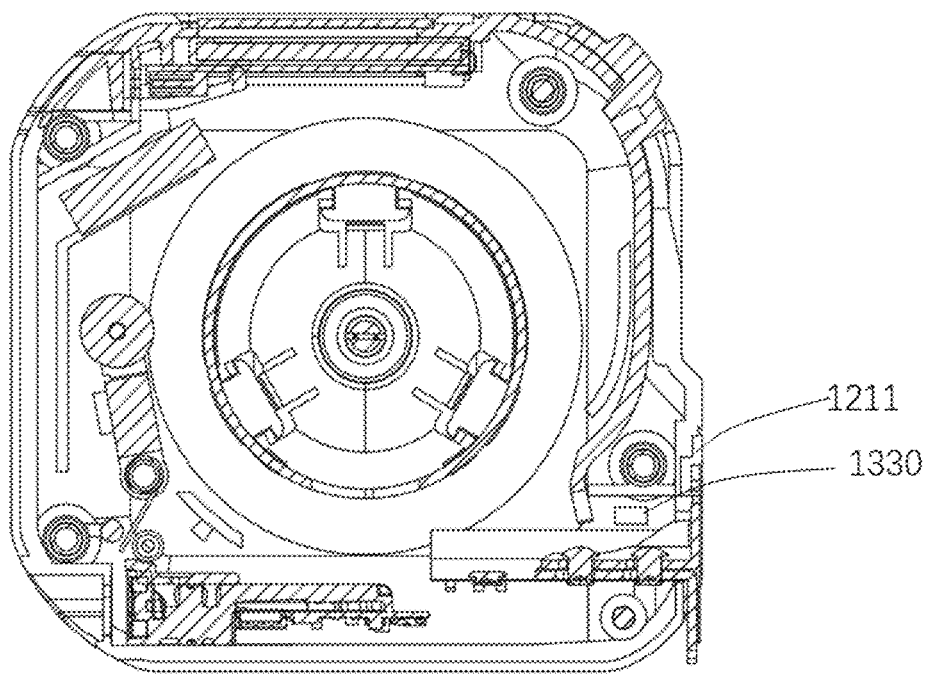
FIG. 52 is a schematic structural view of the interior of Embodiment 13.
Figure 53:
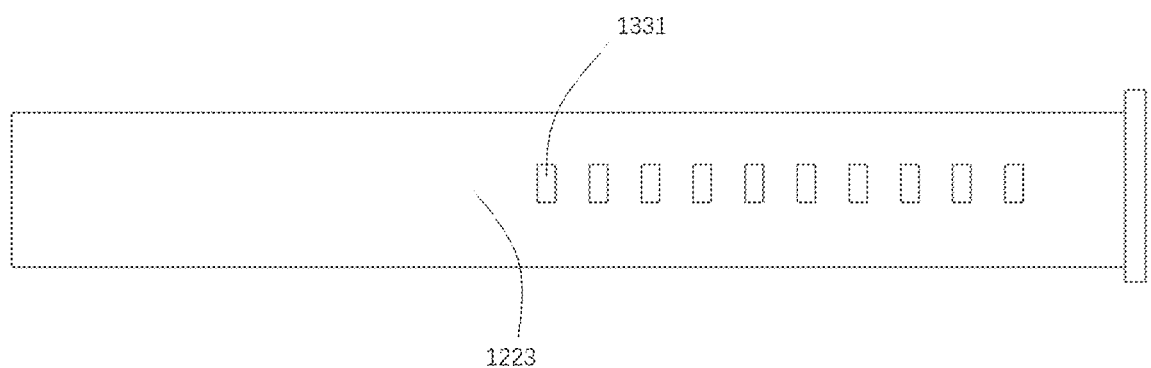
FIG. 53 is a schematic view of a tape in Embodiment 13.

This embodiment has a structure that is essentially the same as that of Embodiment 12, except that a different sensing component from that of Embodiment 12 is used in this embodiment. As shown in FIGS. 52 and 53, the sensing component of this embodiment includes marking codes 1331 provided on a tape 1223 and a marking code identification component 1330 arranged within a housing. Preferably, the marking code identification component 1330 is disposed around a tape exit port 1211, and the marking codes 1331 are uniformly arranged on the tape 1223 along a lengthwise direction thereof. As the tape 1223 is being increasingly pulled out through the tape exit port 1211, the marking code identification component 1330 can obtain a length of the tape 1223 that has been pulled out through identifying the marking codes 1331 thereon, which is then converted to a measurement of the tapeline structure. It would be appreciated that, similar to Embodiment 12, the marking codes 1331 and the marking code identification component 1330 of this embodiment may also be applicable to any of Embodiments 2 to 11.

The tape 1223 may be graduated with numerical values as is conventional, which can be read by an operator. In order to extend the life span of the tape, its surface may be covered with a film (not shown), which protects the marking codes 1331 against abrasion and wearing.

Preferably, the marking code 1331 and the marking code identification component 1330 of this embodiment may be provided along with the Hall sensing component of Embodiment 12. In this way, two numerical values can be obtained and then corrected, and a value obtained from the correction may be taken as a measurement of the tape 1223, resulting in even higher reading accuracy.

Embodiment 14

This embodiment is a modification of Embodiment 7. In Embodiment 7, as shown in FIG. 31, the tapeline wheel 31 is mounted on the locating member 721 in the fourth tapeline structure 720 and the locating member 721 is then mounted within the housing, thus achieving the mounting of the tapeline structure. Moreover, the locating member 721 includes the first locating portion 722 and the second locating portion 723. This embodiment modifies the locating member 721 of FIG. 31 by adding a locating portion thereto, as detailed below.

Figure 54:
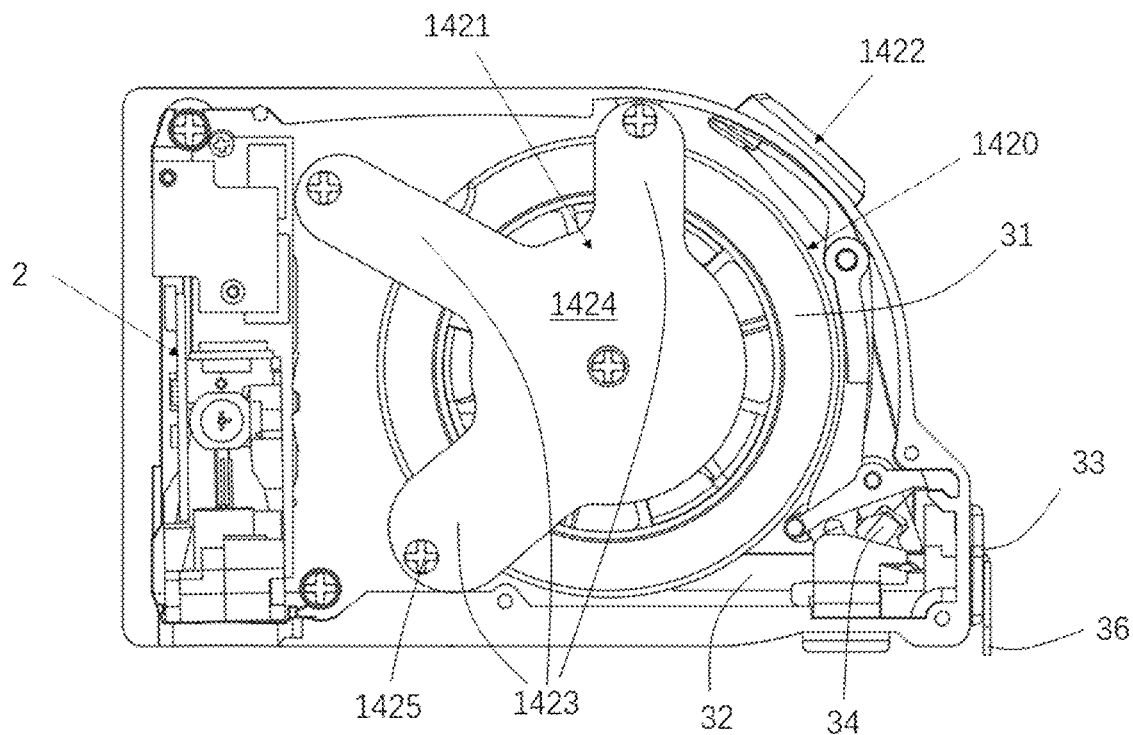
FIG. 54 is a schematic structural view of a distance measuring device according to Embodiment 14.
Figure 55:
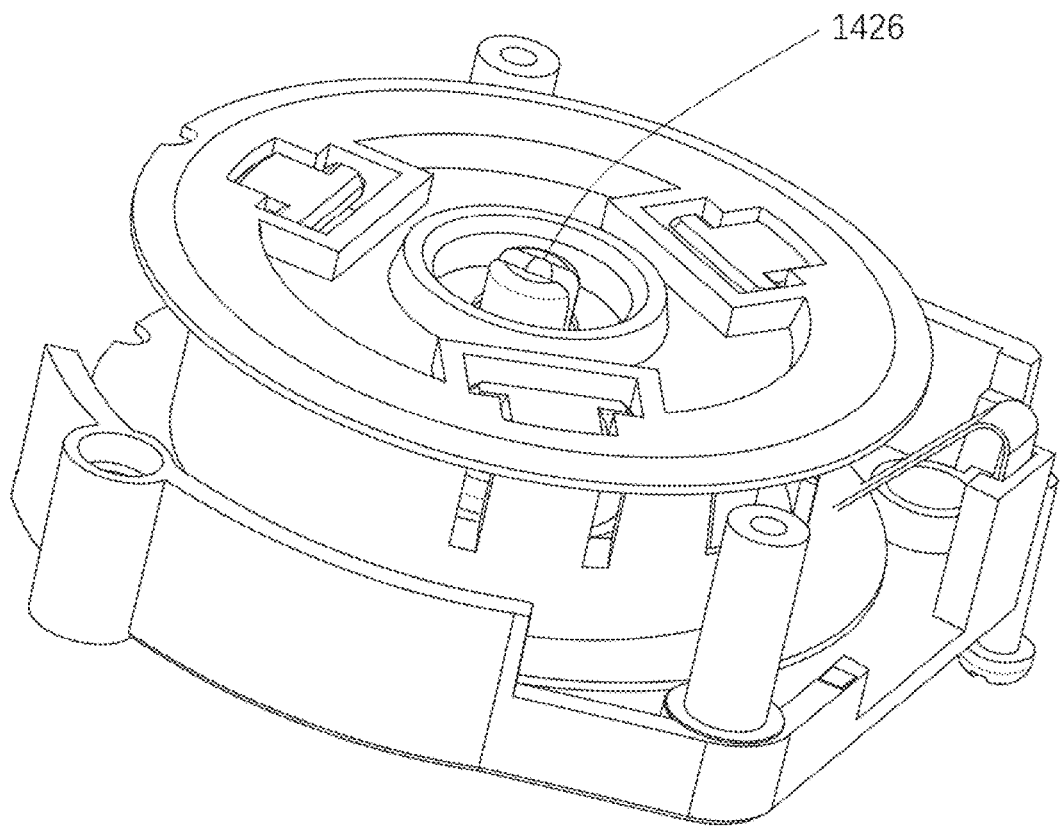
FIG. 55 shows the structure of a shaft shank in Embodiment 14.

As shown in FIGS. 54 to 55, this embodiment provides a distance measuring device with both laser ranging and tapeline-based distance measuring functions, in which a laser ranging device 2 and a ninth tapeline structure 1420 are mounted in a single housing. Except for a locating member 1421, the ninth tapeline structure 1420 is the same as that of each preceding embodiment. That is, the ninth tapeline structure may include a tapeline wheel 31, a tape 32, a tape outlet 33, a pressure piece 34 and a locking means 1422. The tapeline wheel 31 is disposed within the housing, and the tape 32 is entirely or partially wound on the tapeline wheel 31. The tape 32 is fixedly connected to the tapeline wheel 31 at one end and defines a tape end portion 36 at the other end. The tape outlet 33 is provided in a lower portion of an outer side wall of the housing, and the tape end portion 36 extends out of the housing through the tape outlet 33. The pressure piece 34 is disposed in the housing around the tape outlet. When the tape 32 is pulled out from the housing, the pressure piece 34 can be used to tightly press the tape 32 so that a length of the tape 32 outside the housing is kept constant. The locking means 1422 is disposed on an outer surface of the housing and is used to cause the pressure piece 34 to press or release the tape 32. It would be appreciated that the locking means may be implemented either as the locking key 35 of Embodiment 7, or as the locking structure of Embodiment 8 (the structure that utilizes the display means to unlock the tape).

As shown, the locating member 1421 is fixed in the housing, and the tapeline wheel 31 is rotatably coupled to the locating member 1421. The locating member 1421 includes three locating portions 1423, each extending outwardly from a body 1424 of the locating member 1421 and connected to the housing by a fastener. For example, one end of each locating portion 1423 is fixed to the housing by a screw 1425. In this way, the locating member 1421 is fixed within the housing.

As in Embodiment 7, the tapeline wheel 31 may be connected to the locating member 1421 through an engagement portion 724 and thereby mounted within the housing. In some implementations, as shown in FIG. 55, a protruding shaft shank 1426 is provided on the housing at a central location of the locating member 1421, but is not directly connected to the locating member 1421. The tapeline wheel 31 is fitted over the shaft shank 1426 as to be rotatable around the shaft shank 1426. The shaft shank 1426 may be integrally formed with the housing. That is, the shaft shank 1426 may form part of the housing. In other words, the shaft shank 1426 and the housing constitute a single piece. As shown in FIG. 55, the shaft shank 1426 may be alternatively implemented as a separate component in the form of a stepped shaft. In this case, one end of the shaft shank 1426 is restricted with respect to the housing through a portion of the stepped shaft, and the other end of the shaft shank 1426 is coupled to the locating member 1421 by a screw.

It would be appreciated that the number of locating portions 1423 in the locating member 1421 may be determined as actually needed. It may be any number that is at least one and is not limited to two as in Embodiment 7, or three as in this embodiment.

With the locating member 1421, the tapeline structure can be quickly assembled in the housing while ensuring robust operation of the tapeline.

The laser ranging device 2 may be disposed at a radial edge location as in Embodiments 6 to 7. Reference can be made to the above description of Embodiment 6 for more details in this regard. It would be appreciated that the arrangement for the tapeline structure may also be employed in any of Embodiments 2 to 4.

Presented above are merely a few preferred embodiments of the present invention. Those of ordinary skill in the art can make many improvements and modifications to the foregoing embodiments without departing from the spirit of the present invention. Accordingly, all and any such improvements and modifications are intended to also fall within the scope of the present invention.

The invention claimed is:

1. A distance measuring device, comprising:
 a first housing having an accommodating space; and
 a laser ranging device provided in the accommodating space of the first housing; and
 a tapeline structure, the tapeline structure integrated with the laser ranging device into one piece,
 wherein the laser ranging device comprises a laser module and a power supply connected to the laser module;
 wherein the laser module comprises:
 a laser generating means for emitting a measurement beam to an object to be measured;
 a photoelectric conversion means for receiving a reflected beam reflected from the object to be measured and converting it into at least one feedback electric signal; and
 a circuit board provided thereon with at least one processor;
 wherein the tapeline structure is provided in the first housing, and the laser module is provided on an end face in an axial direction of the tapeline structure;
 wherein a raised portion is provided on the end face in the axial direction, and the raised portion defines a second accommodating space for accommodating the laser module.

2. The distance measuring device of claim 1, wherein the power supply is a rechargeable battery, the laser ranging device is provided thereon with a charging port, the first housing provided therein with a through hole matching the charging port.

3. The distance measuring device of claim 1, wherein the tapeline structure comprises:
 a tapeline wheel provided in the first housing;
 a tape entirely or partially wound on the tapeline wheel, one end of the tape fixedly connected to the tapeline wheel, the other end thereof provided with a tape end portion;
 a first tape outlet provided in a side wall of the first housing, the tape end portion extending out of the first housing through the first tape outlet;

a pressure piece for pressing the tape so that a length of the tape outside the first housing is kept constant; and a locking key provided on an outer surface of the first housing and used to control the pressure piece to press or loosen the tape.

4. The distance measuring device of claim 1, wherein the laser ranging device further comprises:

a display means and an operating means, the display means and the operating means both disposed on the end face in the axial direction or at an edge in a radial direction of the tapeline structure.

5. The distance measuring device of claim 1, wherein the first housing comprises a first housing portion and a second housing portion, the first housing portion joined to the second housing portion to form the first housing defining the accommodating space.

6. The distance measuring device of claim 1, wherein the laser ranging device further comprises a second device, wherein the second device is any one or more selected from a laser spot projector, a laser line projector, a laser cross projector and a temperature measuring device.

7. A distance measuring device, comprising:

a first housing having a first accommodating space;

a second housing having a second accommodating space;

a laser ranging device provided in the first accommodating space; and a tapeline structure provided in the second accommodating space;

the first housing is detachably connected to the second housing through a connecting structure, wherein a first side of the first housing facing toward the second housing is an arcuate recessed portion, a second side of the second housing facing toward the first housing is an arcuate raised portion in engagement with the arcuate recessed portion; the connecting structure comprises a connecting protrusion provided on the first side and a connecting recess provided on the second side, and the connecting protrusion is inserted in the connecting recess; or a first side surface of the first housing facing toward the second housing is a flat surface, a second side surface of the second housing facing toward the first housing is a flat surface; the connecting structure comprises a connecting slide channel provided on the first side surface and a fin which is provided on the second side surface and slidable into the connecting slide channel.

8. The distance measuring device of claim 7, wherein the laser ranging device comprises a laser module and a power supply connected to the laser module;

the laser module comprises:

a laser generating means for emitting a measurement beam to an object to be measured;

a photoelectric conversion means for receiving a reflected beam reflected from the object to be measured and converting it into at least one feedback electric signal; and a circuit board provided thereon with at least one processor.

\* \* \* \* \*